(12) United States Patent
Ganahl

(10) Patent No.: US 11,510,528 B2
(45) Date of Patent: Nov. 29, 2022

(54) CONTAINER WITH HEATING/COOLING ASSEMBLY AND REMOVABLE POWER SOURCE MODULES

(71) Applicant: Joseph Ganahl, Honolulu, HI (US)

(72) Inventor: Joseph Ganahl, Honolulu, HI (US)

( * ) Notice: Subject to any disclaimer, the term of this patent is extended or adjusted under 35 U.S.C. 154(b) by 580 days.

(21) Appl. No.: 16/050,614

(22) Filed: Jul. 31, 2018

(65) Prior Publication Data

US 2018/0333007 A1 Nov. 22, 2018

Related U.S. Application Data

(63) Continuation-in-part of application No. 15/716,862, filed on Sep. 27, 2017, now Pat. No. 10,863,851.

(Continued)

(51) Int. Cl.
*A47J 41/00* (2006.01)
*B65D 81/38* (2006.01)
(Continued)

(52) U.S. Cl.
CPC ........ *A47J 41/005* (2013.01); *A47G 19/2288* (2013.01); *A47J 31/005* (2013.01);
(Continued)

(58) Field of Classification Search
CPC ........ A47G 19/2288; A47G 2019/2238; A47G 2200/143; A47G 19/12; A47G 2200/16; A47G 2200/18; A47J 31/005; A47J 31/04; A47J 31/5253; A47J 41/005; A47J 41/0083; A47J 41/0094; A47J 43/0716; A47J 43/046; A47J 43/0766; A47J 43/085; A47J 43/0722; A47J 43/0727; A47J 43/0772; A47J 43/0777; A47J 43/042; A47J 43/06;
(Continued)

(56) References Cited

U.S. PATENT DOCUMENTS

| | | | | |
|---|---|---|---|---|
| 4,487,509 A | * | 12/1984 | Boyce | A47J 43/046 366/199 |
| 7,648,264 B2 | * | 1/2010 | Breviere | A47J 43/0716 366/205 |

(Continued)

OTHER PUBLICATIONS

MiiXR, PROMiXX, https://web.archive.org/web/20170223104432/ https://www.kickstarter.com/projects/promixx/miixr-can-your-sports-bottle-shaker-or-blender-do (Year: 2017).*

*Primary Examiner* — Chris Q Liu
(74) *Attorney, Agent, or Firm* — Edmond DeFrank

(57) ABSTRACT

The embodiments disclose an attachable battery base module configured for powering at least one attachable application module coupled to the attachable battery base module, wherein the attachable battery base is configured for powering the at least one attachable application module, a heating module attachment with a temperature control module coupled to the attachable battery base module configured for heating and/or boiling a liquid, a cooling module attachment with the temperature control module coupled to the attachable battery base module configured for cooling a liquid and wherein the temperature control module includes a temperature maintenance mode, wherein the temperature maintenance mode is configured for maintaining a preset, predefined or user preselected desired temperature when the desired temperature is reached.

3 Claims, 53 Drawing Sheets

Related U.S. Application Data

(60) Provisional application No. 62/454,763, filed on Feb. 4, 2017.

(51) Int. Cl.

| | | |
|---|---|---|
| *A47J 31/00* | (2006.01) | |
| *A47J 43/07* | (2006.01) | |
| *A47G 19/22* | (2006.01) | |
| *A47J 31/04* | (2006.01) | |
| *A47J 31/52* | (2006.01) | |

(52) U.S. Cl.
CPC ............ *A47J 31/04* (2013.01); *A47J 43/0716* (2013.01); *B65D 81/3837* (2013.01); *A47G 2019/2238* (2013.01); *A47G 2200/143* (2013.01); *A47J 31/5253* (2018.08); *A47J 41/0083* (2013.01); *A47J 41/0094* (2013.01)

(58) Field of Classification Search
CPC .................... A47J 43/07; A47J 43/0761; A47J 2043/0449; A47J 27/004; A47J 31/0576; A47J 31/0626; A47J 36/06; A47J 36/2438; A47J 42/56; A47J 43/27; A47J 19/027; A47J 2043/0738; A47J 2201/00; A47J 31/521; A47J 36/2466; A47J 36/2472; A47J 41/0072; A47J 43/0788; A47J 43/082; B65D 81/3837

USPC .......... 219/432, 436, 439, 442; 99/510, 492, 99/348, 337, 483, 302 R, 342, 513, 432, 99/439, 442

See application file for complete search history.

(56) References Cited

U.S. PATENT DOCUMENTS

| | | | |
|---|---|---|---|
| 8,042,990 B2 * | 10/2011 | Pryor, Jr. ............ | A47J 43/0766 366/601 |
| 8,122,821 B2 * | 2/2012 | Sands .................... | A47J 43/046 366/205 |
| 2004/0100862 A1 * | 5/2004 | Arroubi .............. | A47J 43/0716 366/206 |
| 2006/0198241 A1 * | 9/2006 | Krishnachaitanya ........................ | A47J 43/0722 366/205 |
| 2008/0223963 A1 * | 9/2008 | Mally .................... | A47J 43/042 241/36 |
| 2008/0273420 A1 * | 11/2008 | Ferk .................... | A47J 43/0777 366/314 |
| 2011/0149677 A1 * | 6/2011 | Davis .................... | A47J 43/0716 366/205 |
| 2011/0199852 A1 * | 8/2011 | Martin .................... | A47G 19/12 366/113 |
| 2016/0296899 A1 * | 10/2016 | Hoare ............... | B01F 15/00389 |

* cited by examiner

50

50

CONTAINER WITH HEATING/COOLING ASSEMBLY AND REMOVABLE POWER SOURCE MODULES

CROSS REFERENCE TO RELATED APPLICATION

The present application is a continuation-in-part made under 35 U.S.C. § 119(e) to currently pending non-provisional patent application Ser. No. 15/716,862, having a filing date of Sep. 27, 2017, by Ganahl.

FIELD OF THE INVENTION

The present invention is generally directed to a portable container for storing a beverage or other liquid content, and more specifically, to a beverage container with a heating temperature control assembly and one or more removable attachable power source modules. The power source modules can be used to provide power to the heating assembly in order to controllably heat and or cool the temperature of the contents of the beverage container.

BACKGROUND OF THE INVENTION

The need to hydrate is essential to human nature and carrying liquid allows hydration in diverse elements and conditions. An additional need exists to heat and/or boil liquids in a portable container that can easily be carried and which the contents can be consumed directly from the container. This can provide significant benefit for lifesaving, water purification, preparation of freeze dried food and warming liquids in cold weather, as just an example. A further need exists to keep liquids cool for comfortable drinking.

For instance, it is common to travel with coffee, tea or other hot beverage, however, often times, it is difficult to maintain the temperate of the hot beverage for an extended period of time. While there are many insulated travel mugs and like containers, most do not offer the ability to heat or cool the liquid within the container or otherwise expose the liquid to a heating/cooling element on-the go.

Furthermore, in many instances, there is a need for boiling water, especially while camping, hiking or during other like outdoor activities. For example, boiling water can help remove contaminants for purposes of providing a safe potable liquid to drink. However, oftentimes, preparation of food items, including, but not limited to freeze dried food commonly brought on long-term camping or hiking activities, requires the addition of an amount of boiling water. In order to boil water in such a setting, users will often need to assemble a camp stove or camp fire in order to provide the necessary heat.

Accordingly, there is a need in the art for a portable beverage container or travel mug that includes a heating assembly for selectively heating the contents of the container. It would be beneficial if the proposed heating assembly is able to maintain the temperate of the contents at a selected or predetermined temperature ranges, for example, in order to maintain the temperature of a hot beverage for extended periods of time. In addition, it would be beneficial if the proposed heating assembly is also able to boil the contents of the container for a period of time, for example, in order to either reduce contaminants contained therein and/or for providing boiling water to prepare food items.

It would also be beneficial if the proposed beverage container or travel mug includes a simple device that allows for low cost production and is in the form of a compact size to maximize adoption and usage of the device and methods across a wide range of applications.

Further advantages of the proposed beverage container or travel mug may include one or more heating/COOLING elements powered via an onboard battery and/or one or more alternative power sources through external sources such as an AC or DC power cable. It would also be beneficial if the proposed beverage container includes a cap with dual openings, one adapted for cold drinking/pouring, and another adapted for hot liquid drinking. OR A LOW PROFILE INSULATED CAP FOR DRINKING ONLY.

SUMMARY OF THE INVENTION

Accordingly, the present invention is generally directed to a container, such as a travel mug or other portable container adapted to at least temporarily retain liquid or other contents therein. The device and method for a water/liquid modular container and heating/cooling system provided herein offers a number of important advantages over currently available products and systems. The device and method of the present invention embodies a simple and reliable design that permits utilization and deployment not previously available. The device and method is designed to work with a wide variety of modular attachments in a manner not offered by alternative systems. For instance, the modular beverage container of the present invention includes a main body portion, a cap, a heating temperature control assembly, and one or more modules, such as, but not limited to power source modules, storage modules, and/or blender or coffee grinder modules. The top of the heating assembly is attached or connected to the bottom end of the main body portion. In some embodiments, the main body portion includes an at least partially open bottom end such that a portion of the heating temperature control assembly, such as a heated panel or coil(s), come into direct physical contact with the liquid or other contents of the container. This serves to facilitate an efficient and effective heating temperature control system, allowing the liquid contents to be heated or cooled efficiently promptly and in some cases up to a boiling temperature.

One or more modules, such as power source modules, can be connected to the bottom end of the heating assembly, for example, via a cooperative twist and lock connection assembly or other easily removable attachment. In some embodiments, the power source module includes a charger cord that can be used to recharge the power source module. Power source modules are batteries, AC and DC, a 12-volt DC or a 110 volt AC input for providing power to the heating element. As provided above, additional modules may include a storage module with an at least partially open interior allowing for the placement of small items for storage, including, but not limited to tea bags, food items, matches, or other camping, hiking or personal items. Yet another embodiment may include a module or attachment with blending and/or coffee grinding capabilities. In this regard, the attachment or module may include a rotating blade that is capable of grinding, blending or chopping items within the container, such as coffee beans, as an example.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the embodiments.
General Overview:

It should be noted that the descriptions that follow, for example, in terms of a container with heating/cooling assembly and removable power source modules is described for illustrative purposes and the underlying system can apply to any number and multiple types attachable and removable modules. In one embodiment of the present invention, the container with heating/cooling assembly and removable power source modules can be configured using an attachable battery base module. The container with heating/cooling assembly and removable power source modules can be configured to include beverage and liquid heating and cooling modules and can be configured to include boiling water coffee percolator module and blender module using the embodiments.

Detailed Description of the Invention

Figure 1A:
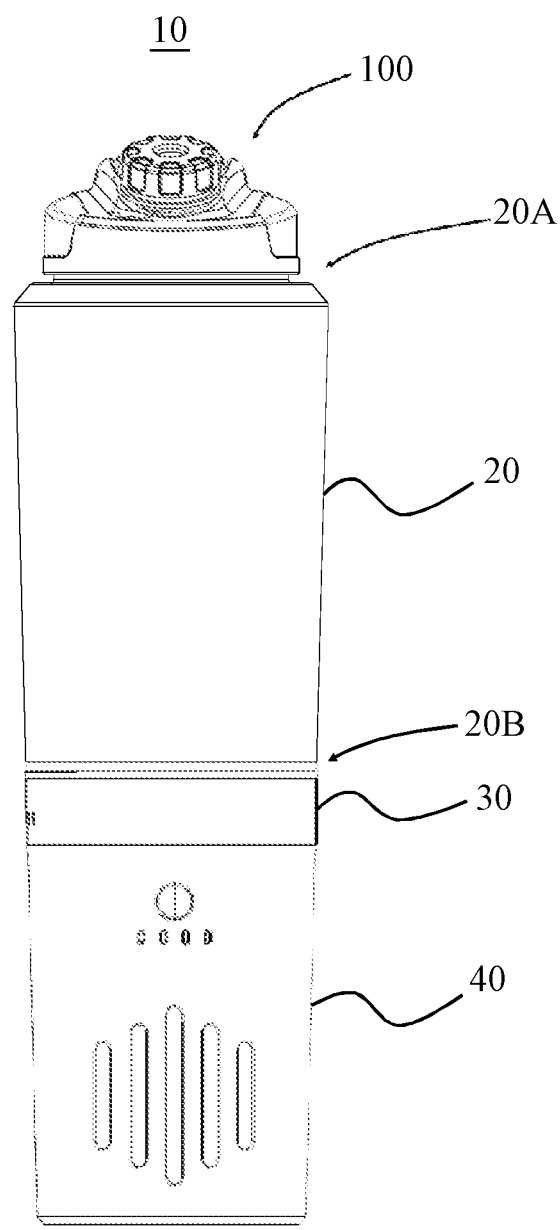
FIG. 1A is a front elevation view of the container as described in accordance with at least one embodiment of the present invention.
Figure 1B:
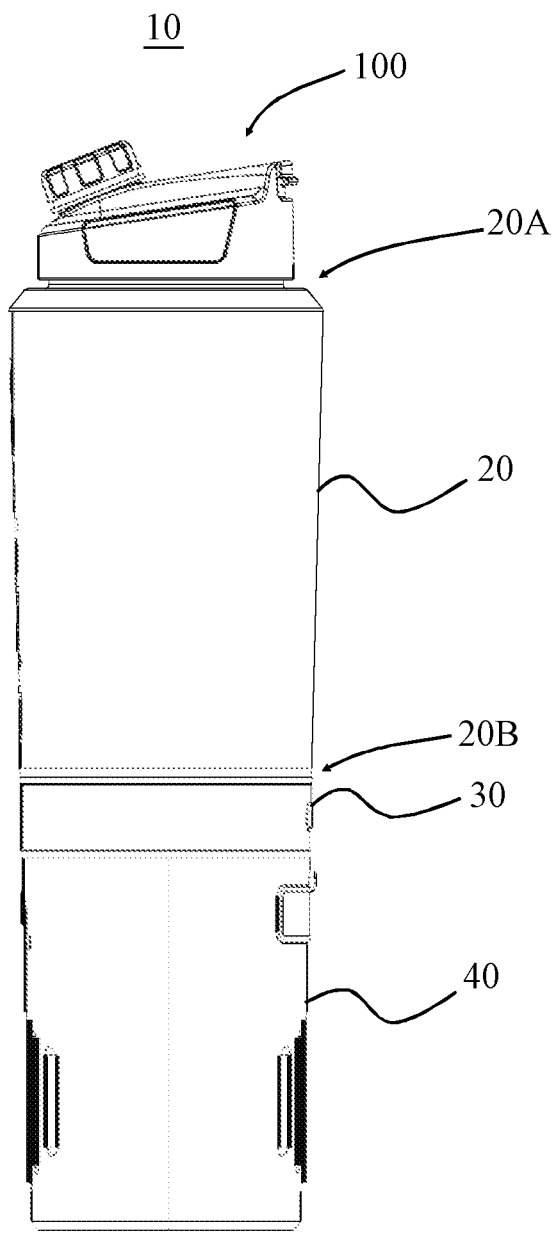
FIG. 1B is a right side elevation view of the container illustrated in FIG. 1A.

As shown in the accompanying drawings, and with particular reference to FIGS. 1A and 1B, the present invention is directed to a beverage container, generally referenced as 10. In particular, as described herein, the beverage container 10 of at least one embodiment is structured and configured to effectively and efficiently control the temperature of a beverage, liquid, fluid or other contents therein. For instance, the beverage container 10 of at least one embodiment includes a heating assembly 30 that is adapted to heat the contents of the container 10 to a predetermined or selected temperature range, and in some cases, at or above a boiling point (e.g., at least 212 degrees Fahrenheit). In some embodiments, the beverage container 10 and/or the heating assembly 30 thereof includes a plurality (e.g., three (3)) heating modes which, when selected, will function to maintain the temperature of the beverage or contents of the container 10 at corresponding predefined, user preselected or preset temperatures.

Accordingly, still referring to FIGS. 1A and 1B, the container 10 of at least one embodiment includes a main body portion, referenced as 20, and a heating/cooling assembly, referenced as 30. As shown, a cap 100 can be secured or connected to a top portion or top end 20A of the main body portion 20, with the heating assembly 30 connected or attached to the bottom end 20B. In this manner, the main body portion 20 is adapted to retain an amount of fluid or other contents therein, while the cap 100 can be used to selectively control the dispensing of the fluid therefrom.

The heating assembly 30 is structured and configured to provide controlled heat to the contents of the container 10 in order to control the temperature thereof, such as, for example, by heating the fluid or other contents to a selected temperature or temperature range. In some instances, the heating assembly 30 is powerful enough and/or specifically adapted to heat the fluid or other contents of the container 10 to a temperature at or above a boiling point. This allows a user to selectively boil the contents of the container 10 for an amount of time, if desired. As also shown in FIGS. 1A and 1B, one or more additional modules, generally referenced as 40, can be secured or selectively removable connected to container 10, such as, to the bottom of the heating assembly 30, for example, via a cooperatively constructed connection assembly, including, but in no way limited a twist and lock type of connection assembly.

The one or more modules 40, as shown in FIGS. 1A and 1B, can include a battery module, which includes one or more batteries (e.g. rechargeable lithium ion batteries, replaceable batteries, etc.) that function to provide power or electricity to the heating assembly 30. Other embodiments described and illustrated herein, may include modules 50, 60 with a power or electrical cable for connection to an external power source, such as an AC or DC power source. In this regard, the beverage container 10 may be connected to an external power source (e.g., electrical outlet in a home, office, or vehicle) in order to provide necessary power or electrical connections to the heating assembly 30. In this manner, the additional, auxiliary or attachment module(s) 40 may be electrically interconnected to the heating assembly 30 in order to implement the present invention in the intended manner.

Other embodiments may also include storage module (not illustrated) which can provide storage space, for example, within an at least partially enclosed pocket or other like compartment. In this manner, a user may store keys, money, a wallet, food, tea and/or other items as desired. Moreover, the main body portion 20 of the container 10 is shown in FIGS. 2A, 2B, 2C and 2D. For instance, as shown in the cut-away view of FIG. 2C, the body 20 of at least one embodiment includes a double wall construction comprising an inner wall 21A and an outer wall 21B. The inner wall 21A and outer wall 21B are spaced apart from one another to define an area or gap there between, at least along a portion of the body 20. In at least one embodiment, the inner wall 21A and outer wall 21B are sealed to one another proximate the top end 20A and bottom end 20B of the body 20 in order to seal the area or gap there between.

In some embodiments, the area between the inner wall 21A and outer wall 21B is vacuum sealed and/or includes an insulating material in order to reduce or restrict the dissipation of heat from the fluid or contents within the container 20 and through the body 20 or wall(s) 21A, 21B thereof.

In at least one embodiment, both the inner wall 21A and the outer wall 21B are constructed of a metallic or Stainless Steel material, and in other embodiments or implementations, the inner wall 21A may be constructed of a metal or metallic material, whereas the outer wall 21B may be constructed of a plastic material. However, it should be noted that other materials for the inner and outer walls, as well as other portions and components of the container 10 are contemplated within the full spirit and scope of the present invention.

Figure 2A:
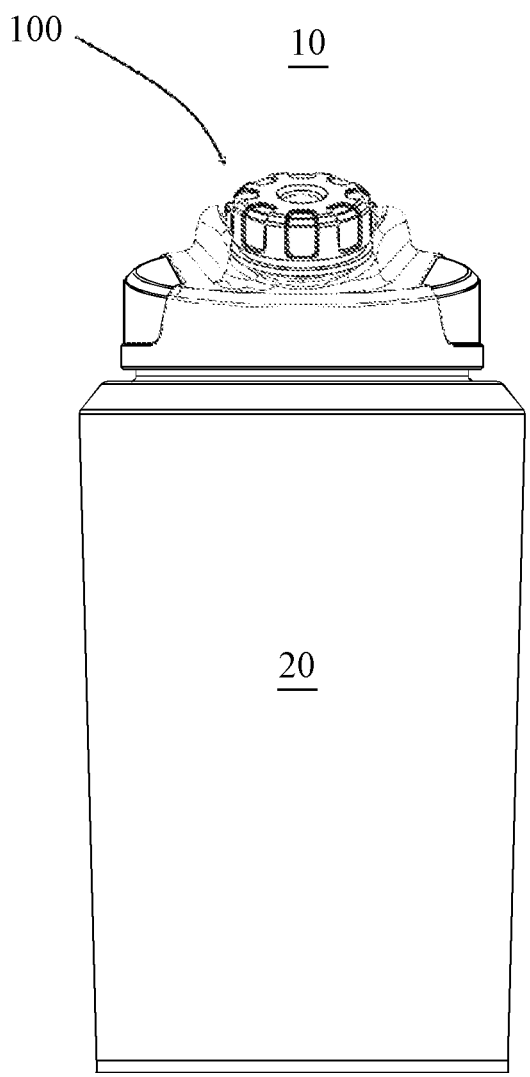
FIG. 2A is a front elevation view of the main body portion and cap as disclosed in accordance with at least one embodiment of the present invention.
Figure 2B:
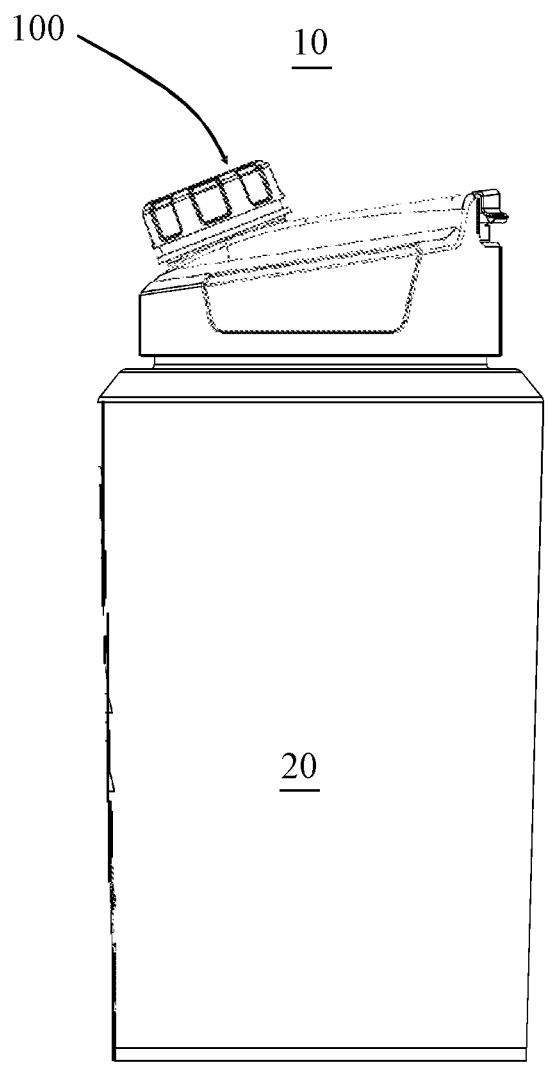
FIG. 2B is a right side elevation view of the main body portion and cap illustrated in FIG. 2A.
Figure 2C:
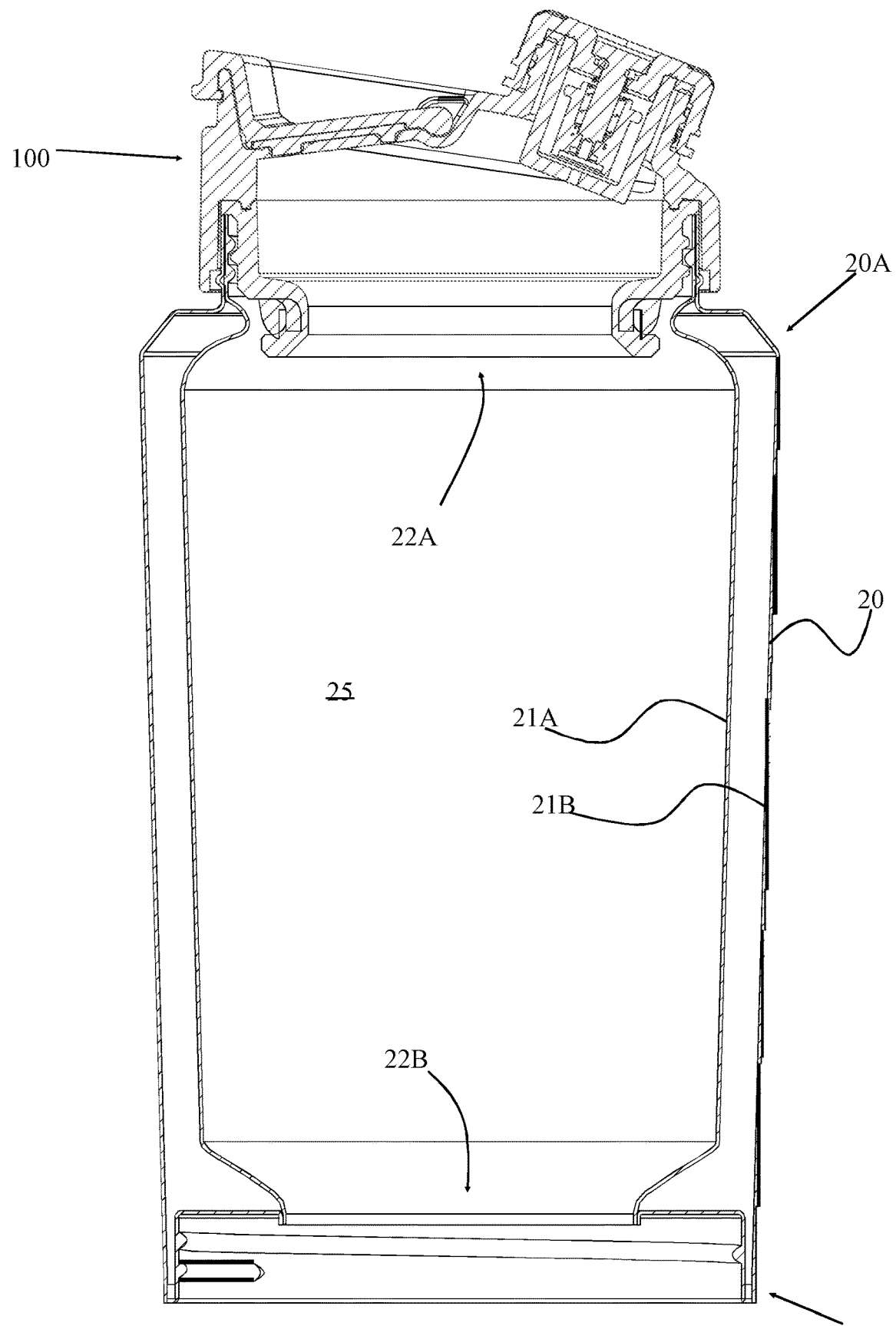
FIG. 2C is a right side elevation cut-away view of the main body portion and cap illustrated in FIGS. 2A and 2B.
Figure 2D:
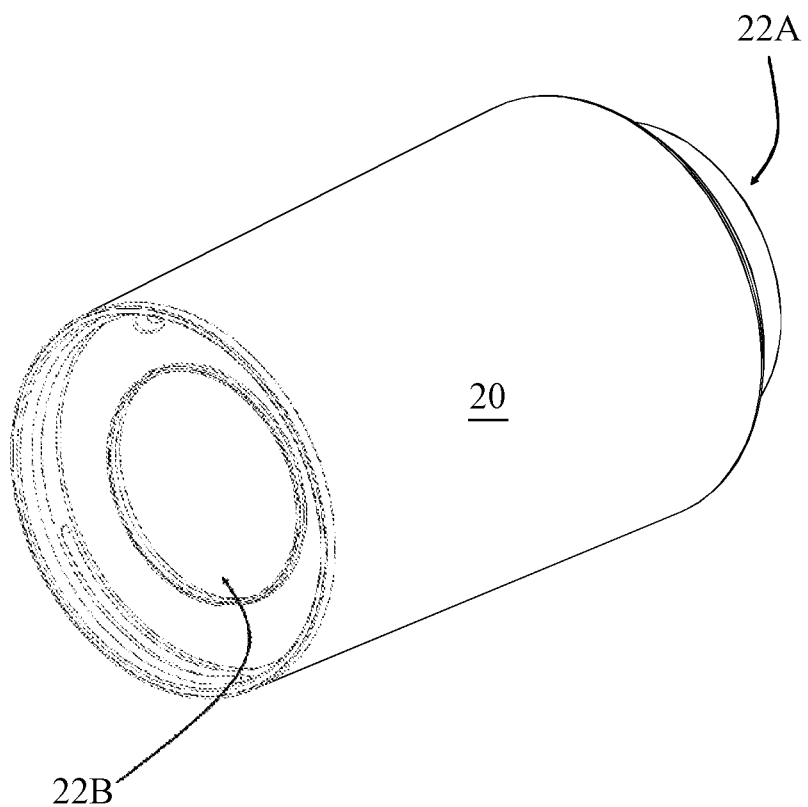
FIG. 2D is a bottom perspective view of the main body portion as disclosed in accordance with at least one embodiment of the present invention.

Furthermore, the body 20 of at least one embodiment includes an at least partially open top 22A through which the fluid (or other contents of the container) can be filled or dispensed. A lid 100 can be secured or removable connected to the open top 22A of the body 20, as illustrated, for example, and configured for allowing consumption of the contents directly from the container 10. Additionally, as shown in FIGS. 2C and 2D, in at least one embodiment, the body 20 includes an at least partially open bottom 22B. As described herein, the heating assembly 30 of at least one embodiment is attached (e.g., either removably or fixedly) to the body 20 of the container 10. In this manner, the heating assembly 30, and in particular, the heating element thereof, may be directly exposed to the interior portion 25 of the container 10 (e.g., where the fluid or other contents are contained), and therefore, the heating assembly 30 or heating/cooling element thereof may be disposed in direct contact with the fluid or other contents of the container 10, for instance, through the at least partially open bottom end 22B. The direct contact between the contents of the container 10, such as water, fluid, etc., further facilitates the container 10 to quickly, effectively and efficiently increase the temperature of the fluid or other contents to a desired temperate or temperature range.

The at least partially open bottom 22B and/or direct and physical contact between the contents of the container 10 and the heating assembly 30 or heating element 35 thereof also facilitates the container 10 in heating the fluid or other contents to or above a boiling point temperature, which, in the case of water is 212 degrees Fahrenheit. As an example, at least a portion of the heating element 35, such as at least a portion of the heating panel(s), etc., is exposed and in direct physical contact with the contents of the container 10, such as the water or other fluid, liquid, etc. This facilitates a fast and efficient heating system that can heat the contents to high temperate, up to and including a boiling point, such as 212° F. Moreover, with reference now to FIGS. 3A through 3F, a heating assembly 30 of at least one embodiment is illustrated. In particular, the heating assembly 30 includes an at least partially exposed heating element 35 that is adapted to increase in temperature upon application of electricity or power, for example, from a power source, including a battery pack or electrical cable.

As shown, the heating element 35 is exposed on the top of the heating assembly 30, such that, when the heating assembly 30 is attached or secured to the main body portion 20 of the container 10, the heating element 30 is aligned with or otherwise disposed at least partially within the open bottom 22B. In this manner, any contents, including water, fluid, beverage, soup, etc., disposed within the body 20 of the container 10, will be in direct contact with the heating element 35.

Figure 4A:
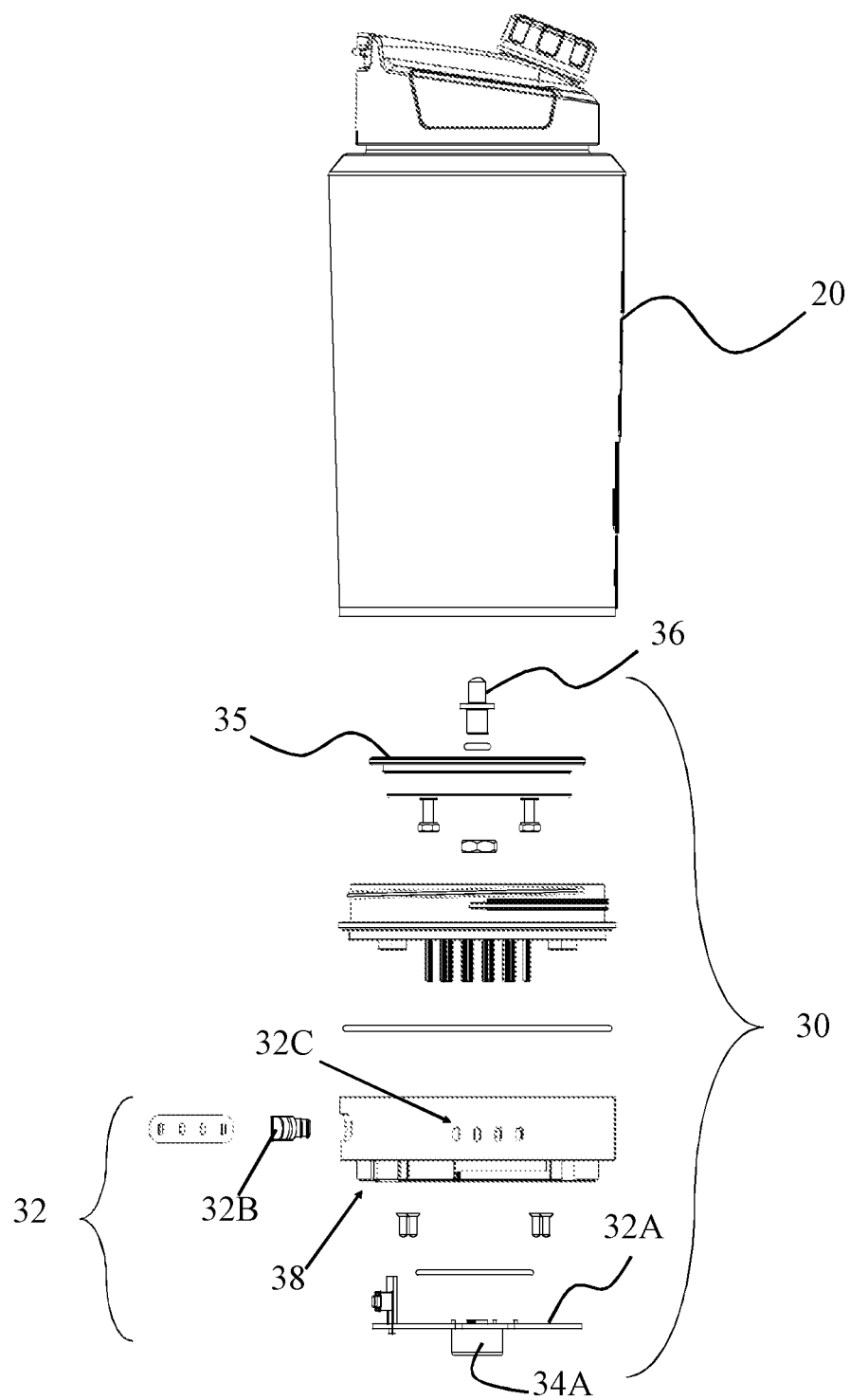
FIG. 4A is an exploded view of the heating assembly and main body portion as disclosed in accordance with at least one embodiment of the present invention.

Furthermore, with reference to FIG. 4A, for example, the heating assembly 30 of at least one embodiment may also include a control assembly, generally referenced as 32, structured to control the heating and/or cooling of the heating elements 35, for example, by supplying or eliminating power or electricity thereto. For instance, the control assembly 32 can include one or more circuit boards, generally referenced as 32A, and/or one or more control buttons or switches 32B structured to select a temperature mode, temperature setting, and/or power the heating assembly on or off, as an example.

Some embodiments can include one or more status LEDs or lights, as generally referenced at 32C, in order to provide a visual representation of the temperature, setting, mode, etc. of the heating assembly 30. As an example, in at least one embodiment, the heating assembly 30, and in particular the control assembly 32 thereof, may include a plurality of heating modes which can be selected by the user, for example, by selecting one or more of the control buttons or switches 32B, for example. In one implementation, the heating assembly 30 includes two or more, for example, three, heating or 'maintain' modes, each of which represent a different preset, predefined or user preselected temperature or temperature range. For example, in at least one embodiment, the different temperature ranges or modes may include: (a) 124° F.-134° F., (b) 135° F.-145° F., (c) 160° F.-170° F., and (d) 194° F.-204° F. In some embodiments, the different temperatures may include, for example: (a) 104° F., (b) 140° F., (c) 176° F., and (d) boil or 212° F.

For instance, a user may select one of the temperatures or temperature ranges by pressing one or more of the control buttons 32B on the heating assembly 30, e.g., either a short tap or a long press. In operation, when the temperature of the contents of the container 10 falls below the preset, predefined or user preselected temperature, the heating element 35 will be activated until the temperature of the contents is raised to the preset, predefined or user preselected temperature. This cycle will continue so long as the heating assembly 30 remains activated and in a selected temperature mode. As provided above, in at least one embodiment, the heating assembly 30 can include a 'boil' mode in which the temperature of the contents is raised to a boiling temperature (e.g. 212F). This is accomplished at least in part because of the direct contact between the heating element 35 and the contents of the container 10, as well as the amount of power and electricity that is supplied thereto.

Furthermore, and with reference still to FIGS. 3A through 3D and 3F, at least one embodiment of the present invention further includes a temperature sensor 36 connected, attached or exposed on the top end of the heating assembly 30. As shown, the temperature sensor 36 may be in the form of a node or probe that extends at least partially from the top of the heating assembly 30. In some embodiments, the heating element(s) 35 may be disposed at least partially around an inner circumferential portion of the heating assembly 30 with the temperature sensor 36 extending upward from the center thereof, although other configurations are certainly contemplated within the full spirit and scope of the present invention.

Furthermore, it should be noted that the temperature sensor 36 or probe may extend at least partially into the main body of the container 10 in a manner such that it comes into direct physical contact with the contents of the container 10, such as a heated liquid. This allows the temperature sensor 36 or probe to obtain accurate and/or precise temperature readings of the contents. For instance, as described herein, when the temperature of the contents is reduced or falls below a certain selected temperature range, the heating element 30 may be activated to raise the temperature. When the temperature sensor 36 or probe detects the temperature of the contents as being within the selected range or approximately at the selected temperate, then the heating elements 30 of some embodiments may turn off or be reduced in temperature. This cycle will continue at least while a temperature or temperature range is selected or activated on the container 10 or heating assembly 30.

Figure 4B:
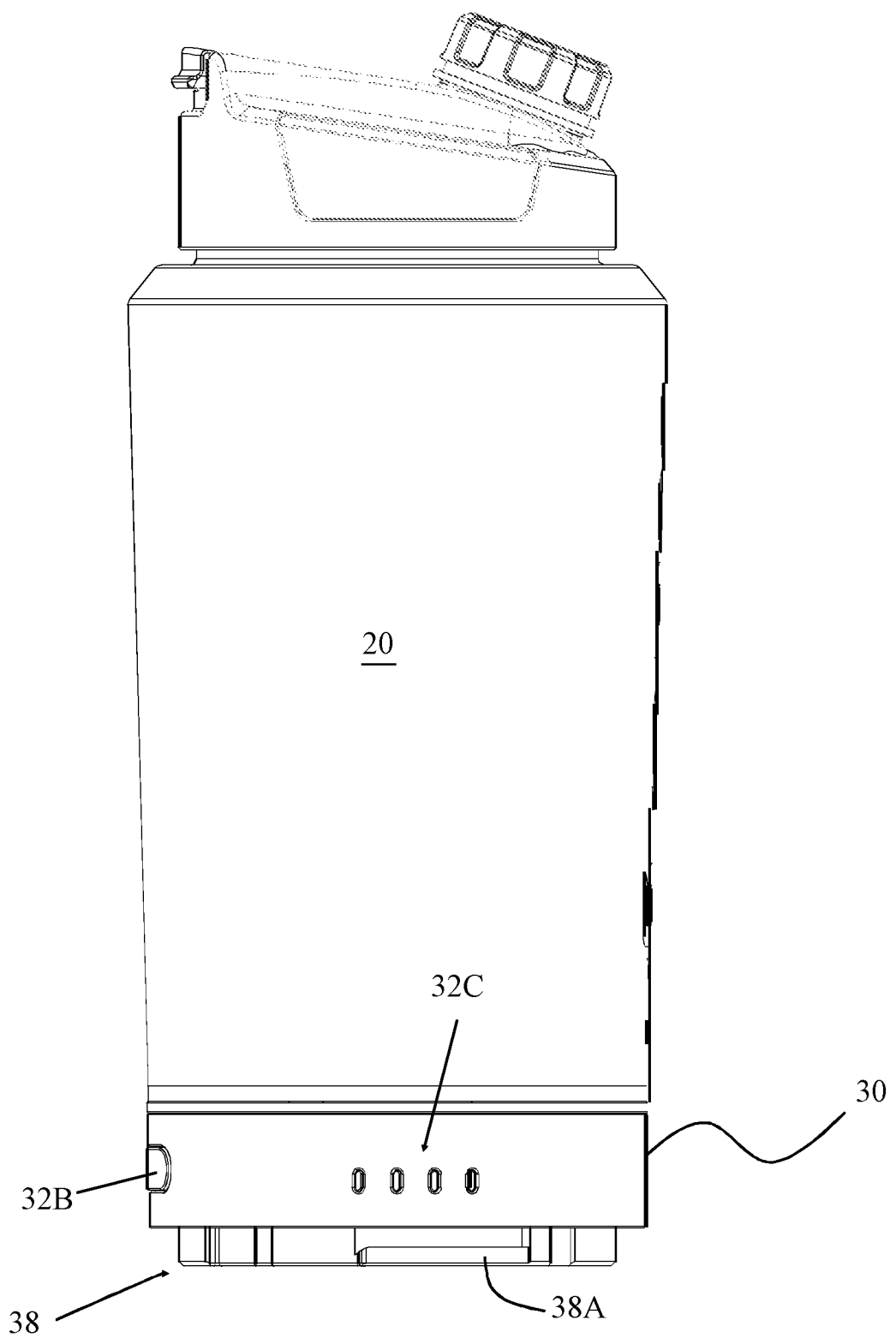
FIG. 4B is a left side elevation view of the main body portion, heating assembly and cap as disclosed in accordance with at least one embodiment of the present invention.
Figure 4C:
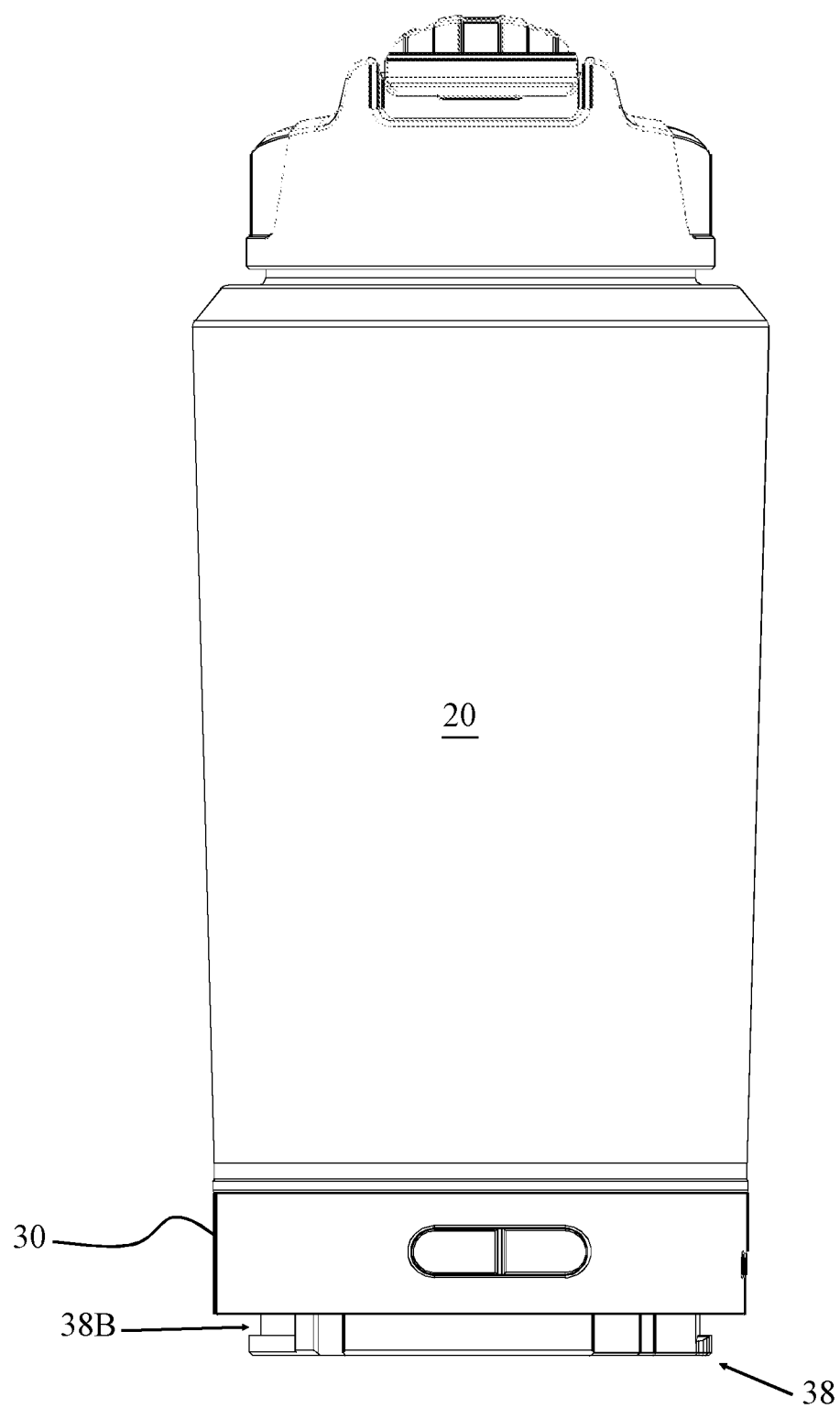
FIG. 4C is a rear elevation view of the embodiment illustrated in FIG. 4B.
Figure 4D:
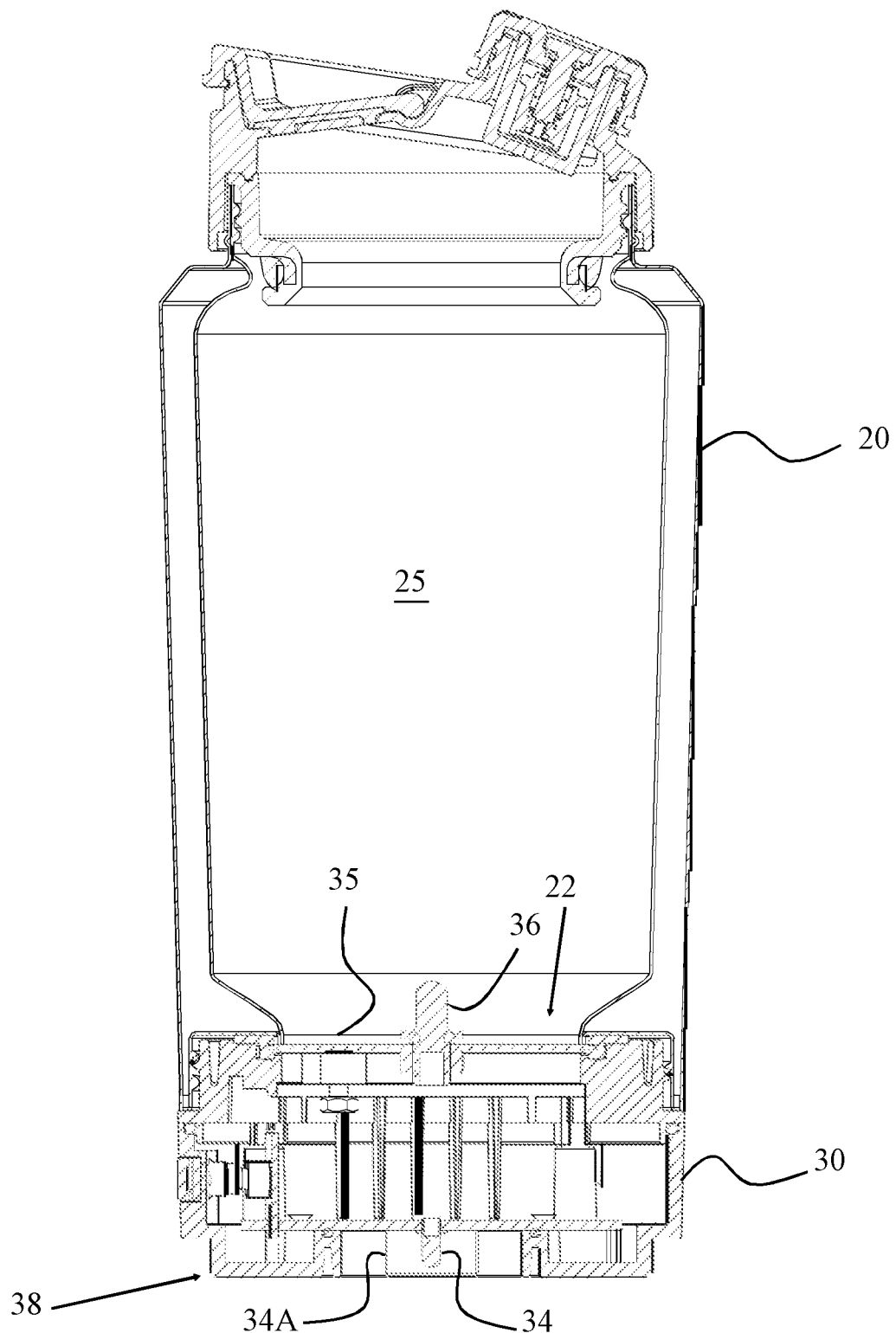
FIG. 4D is a cut away view of the embodiment illustrated in FIGS. 4B and 4C.

FIGS. 4B through 4D illustrate the heating assembly secured to the bottom end of the main body portion 20 of the container 10. In some embodiments, the heating assembly 30 may be fixedly attached or connected to the main body portion 20 in that it may not intended to be easily or readily removed. In other embodiments, the heating assembly 30 can be removably attached to the main body portion 20, for example, via cooperative threaded components or other attachment assemblies that provide a liquid tight seal. In such an embodiment, removing the heating assembly 30 can expose the open bottom 22B of the main body portion 20, which can provide access to the interior of the container 10 thereby. This can help with the cleaning of the interior portion of the container 10.

Figure 3A:
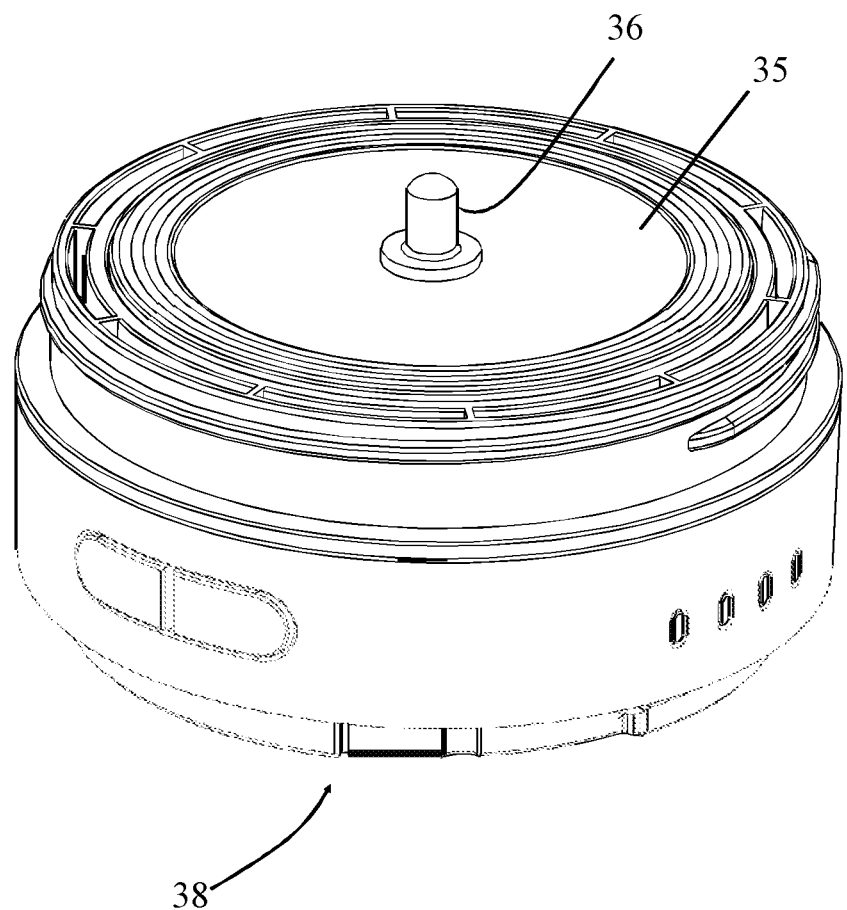
FIG. 3A is a perspective view of the heating assembly as disclosed in accordance with at least one embodiment of the present invention.
Figure 3B:
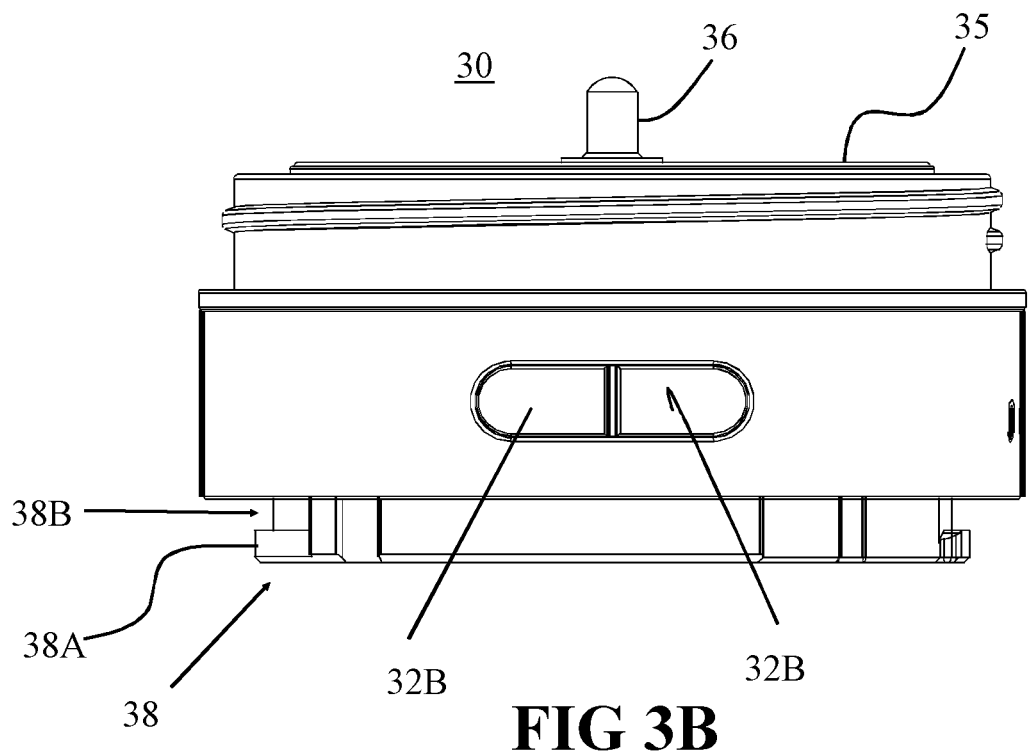
FIG. 3B is a front elevation view of the heating assembly as disclosed in accordance with at least one embodiment of the present invention.
Figure 3C:
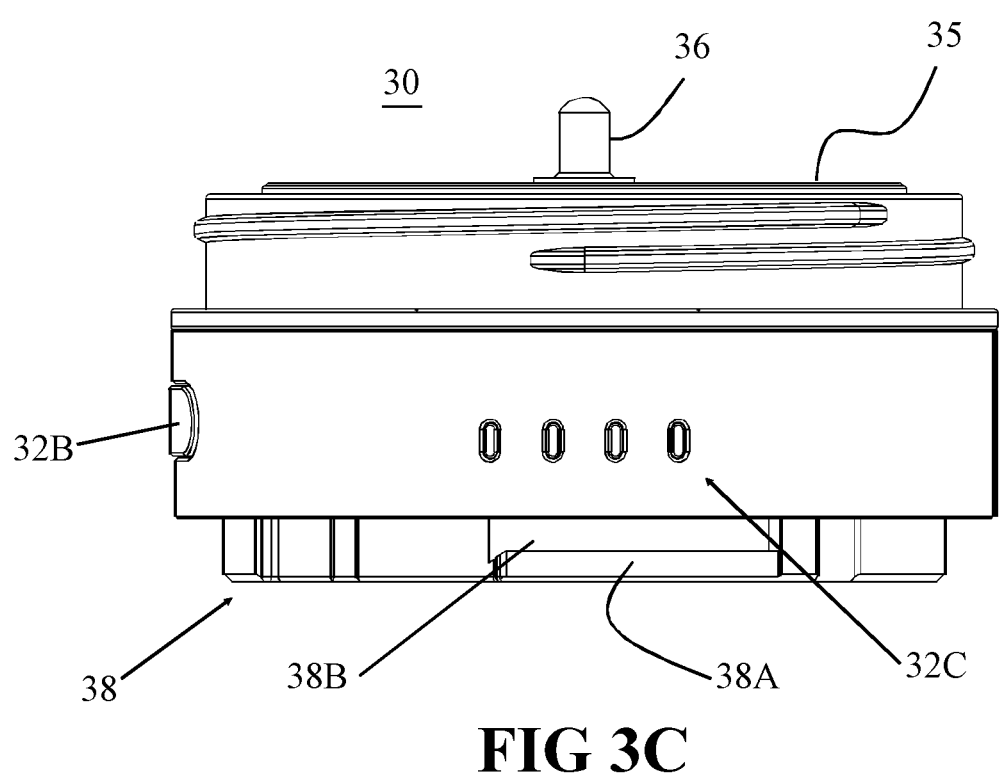
FIG. 3C is a right side elevation view of the heating assembly illustrated in FIG. 3B.
Figure 3D:
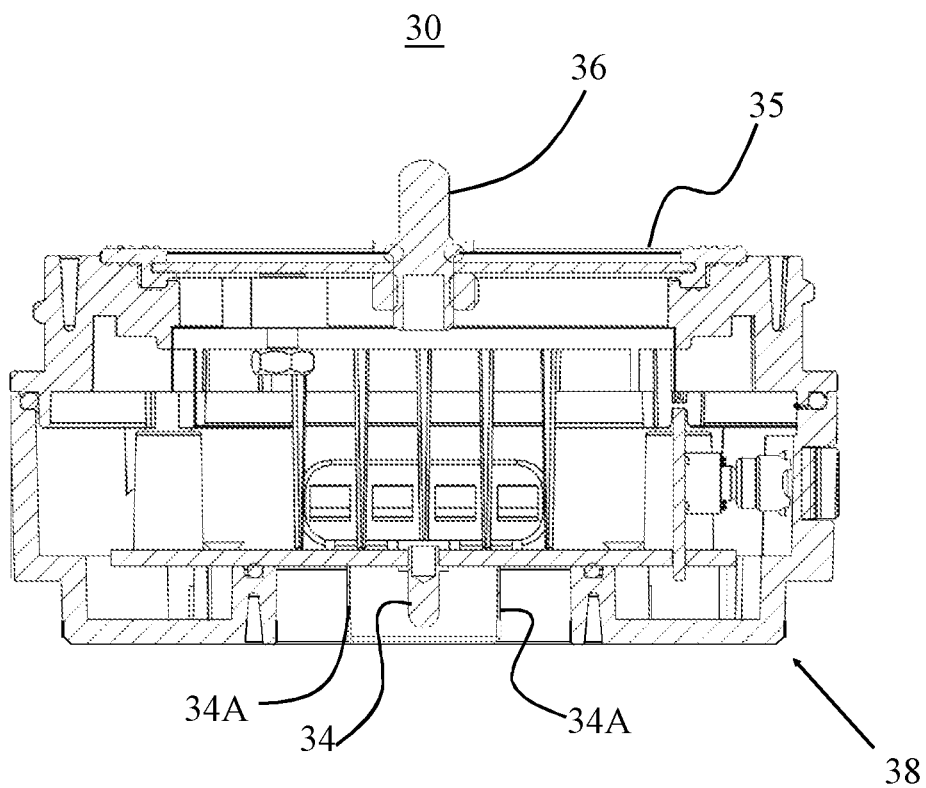
FIG. 3D is a cut away view of the heating assembly illustrated in FIGS. 3B and 3C.
Figure 3E:
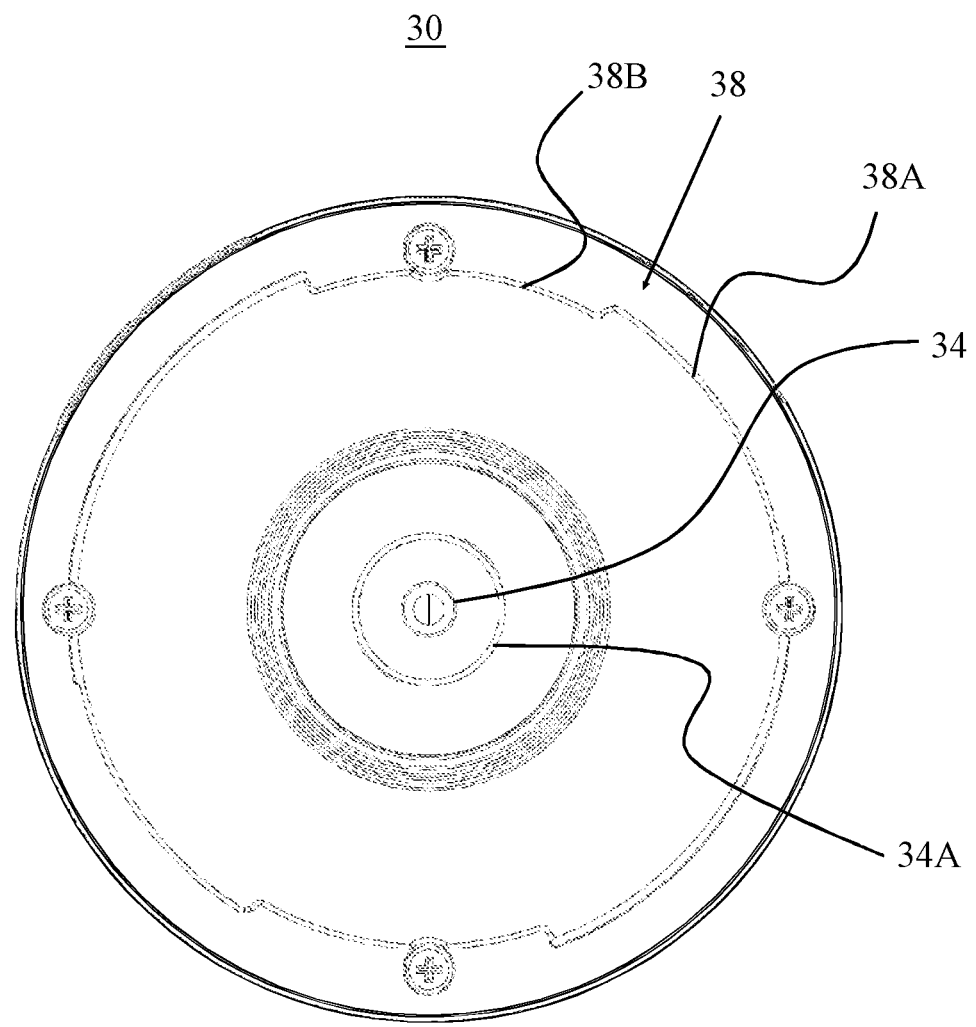
FIG. 3E is a bottom view of the heating assembly illustrated in FIGS. 3B and 3C.
Figure 3F:
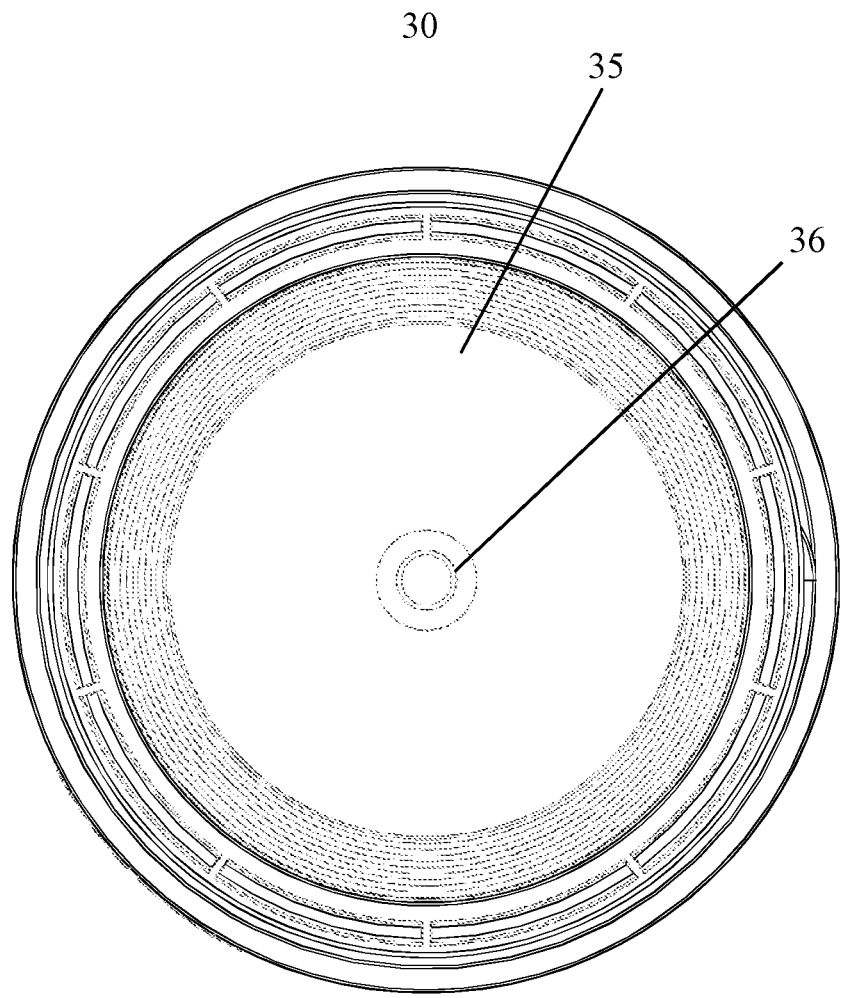
FIG. 3F is a top view of the heating assembly illustrated in FIGS. 3B and 3C.

Furthermore, with reference to FIGS. 3E, 4A, and 4D, the heating assembly 30 includes one or more electrical connections, such as or prongs 34 and ring 34A, configured to electrically connect with a power source module 40, 50, 60 such as a battery pack module or AC/DC power module, for example. Particularly, the electrical connections 34, 34A of at least one embodiment are structured to electrically connect with a separate power source module 40, 50, 60 as described herein, and are capable of transferring power or electricity from the power source module 40, 50, 60 to the heating assembly 30 or the heating element 35, thereof, for example, as controlled by the control assembly 32. In the embodiment shown, the electrical connections of the heating assembly 30 may include a prong or probe 34 that extends downward and an outer ring 34A that at least partially or completely encircles or surrounds the prong 34. The prong 34 and ring 34A may both be constructed of a metal or metallic material configured to facilitate an electrical connection.

One of the connections, such as prong 34 may be a positive terminal, while the other connection 34A may be a negative terminal, although the polarity of the terminals 34, 34A may be reversed. In any event, as described herein, the prong 34 will be engaged by a corresponding peg, pegs or other electrical connection(s) of a corresponding module 40, 50, 60 and the ring 34A will be engaged by another peg, pegs or other electrical connection(s). This design or configuration allows the additional module, e.g., a power source module 40, 50, 60 to electrically connect to the heating assembly 30, while also allowing the heating assembly 30 and/or module 40, 50 60 to twist or rotate relative to one another without the electrical connections being dislodged or losing contact. Furthermore, a connection assembly 38 is also included in at least one embodiment of the heating assembly 30 of the present invention. The connection assembly 38 is structured to facilitate selective interconnection between the heating assembly 30 and the power source or additional module 40.

As illustrated, the connection assembly 38 of at least one embodiment may include a twist and lock mechanism such that the bottom end of the heating assembly 30 can cooperatively interconnect with the top end of the additional or power source module 40, 50, 60 by engaging the heating assembly 30 and the additional or power source module 40, 50, 60 and twisting the heating assembly 30 (or the connected main body portion 20), for example, a half or quarter revolution. In this manner, the connection assembly 38 of at least one exemplary embodiment may include one or more ledges 38A, grooves 38B, etc. that are structured to cooperatively interconnect with similarly shaped corresponding ledges or grooves on the top end or top portion of the additional or power source module.

Accordingly, twisting, locking or otherwise connecting the heating assembly 30 to the additional or power source module 40, 50, 60 allows the main body 20, the heating assembly 30, and the additional or power source module 40, 50, 60 to be raised, lowered and/or otherwise transported as a single connected unit. Other connection assemblies, including, snaps, hooks, recesses, grooves, etc. can be used in accordance with the various embodiments of the present invention. It should also be noted that, in at least one embodiment, the main body portion 20 and the heating assembly 30 can be easily disconnected from the additional or power source module(s) 40, 50, 60. In this regard, a user can keep the power source module 40, 50, 60 sitting on a table, in a cup holder, etc. while the main body portion 20 and the heating assembly 30 can be raised and lowered as a unit for drinking purposes. Each time the user sets the main body portion 20 and the heating assembly 30 down, he or she can set it upon the power source module 40, 50, 60 for continued heating and/or operation thereby.

Figure 5A:
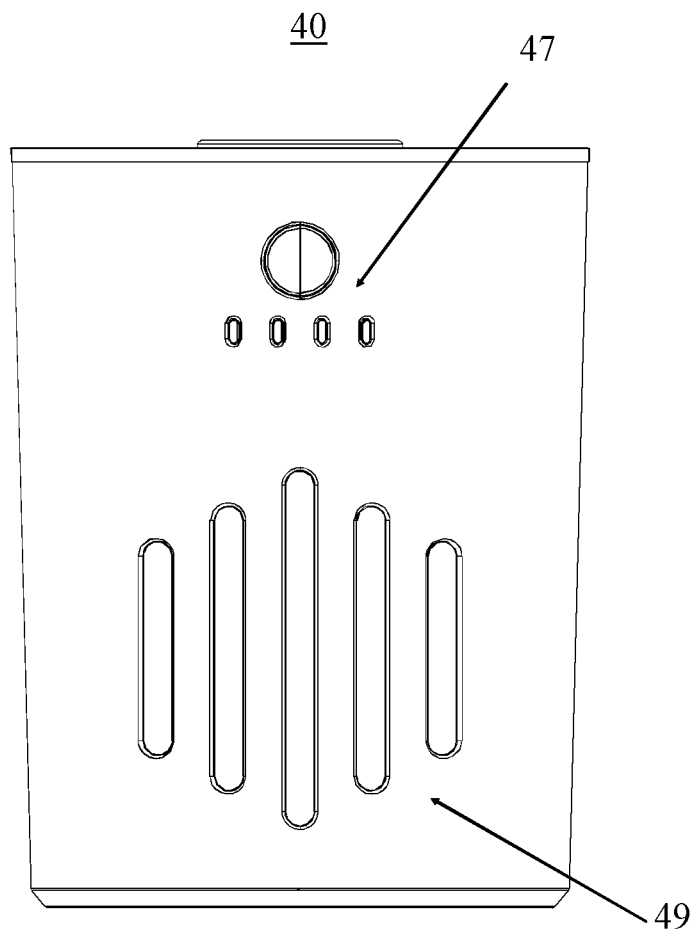
FIG. 5A is a front elevation view of the battery module as disclosed in accordance with at least one embodiment of the present invention.
Figure 5B:
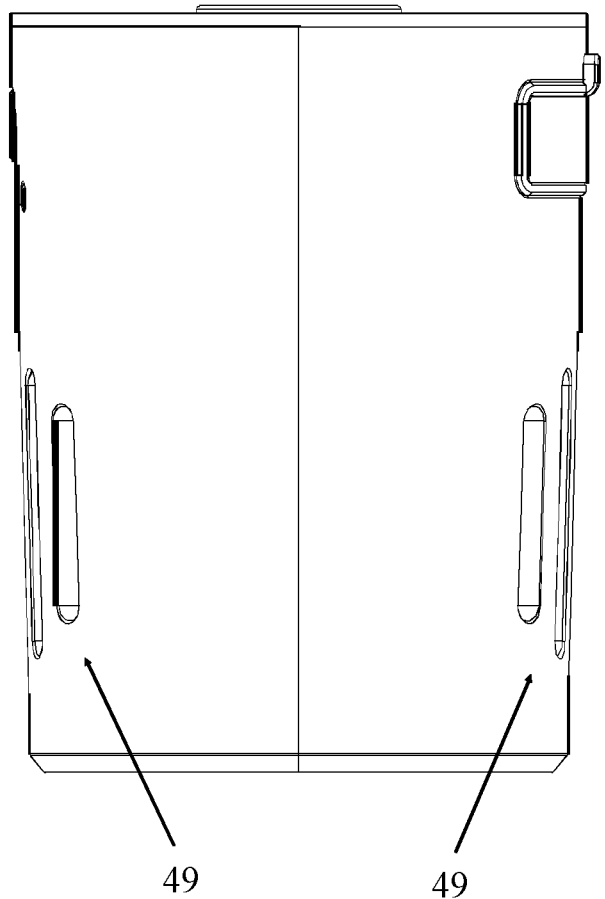
FIG. 5B is a right side elevation view of the battery module as disclosed in accordance with at least one embodiment of the present invention.
Figure 5C:
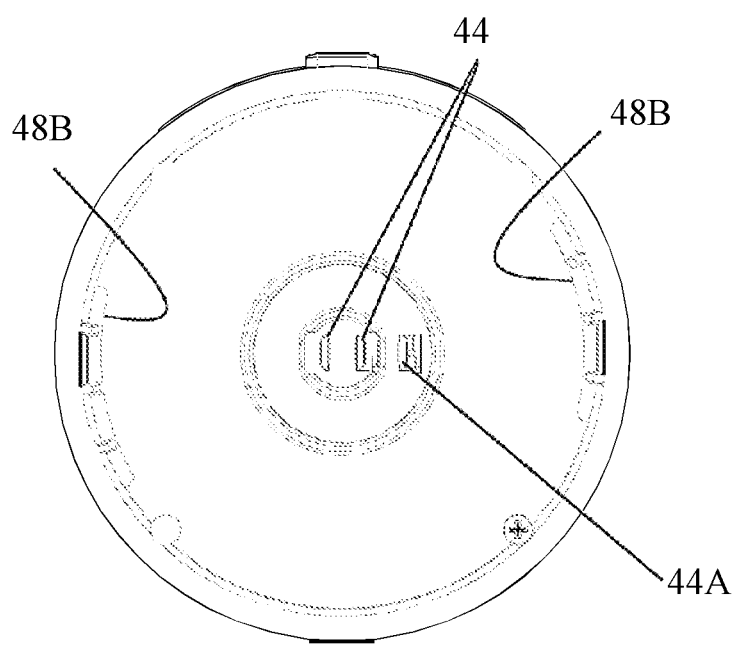
FIG. 5C is a top view of the battery module as disclosed in accordance with at least one embodiment of the present invention.
Figure 5D:
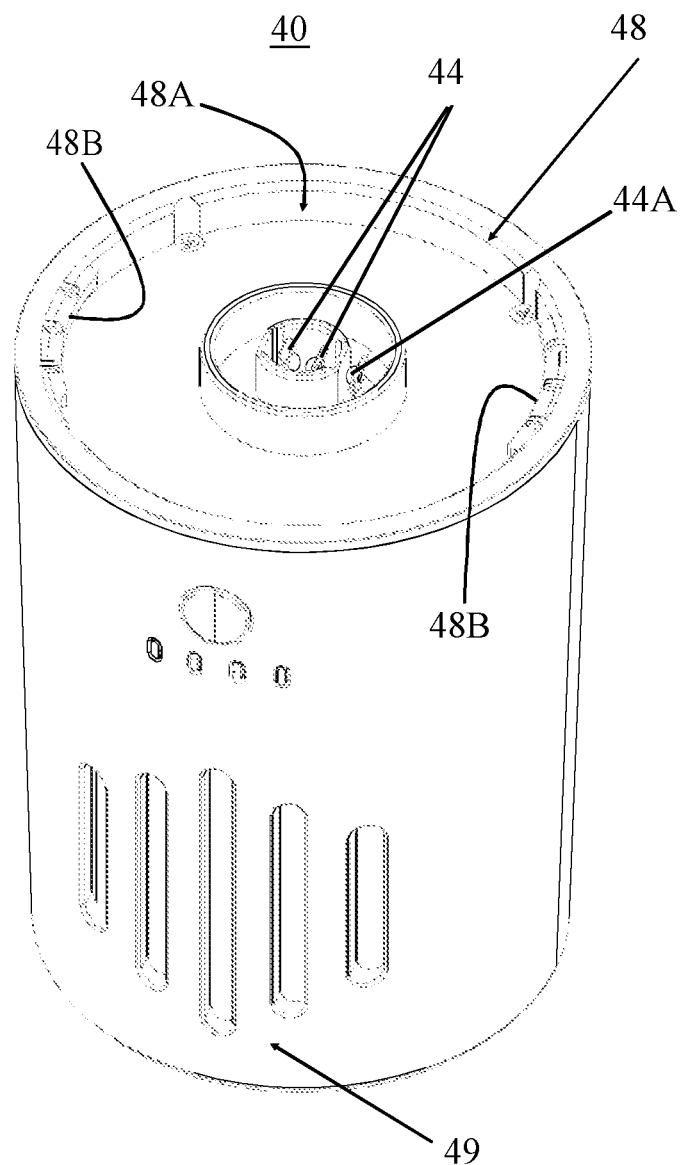
FIG. 5D is a perspective view of the battery module as disclosed in accordance with at least one embodiment of the present invention.
Figure 5E:
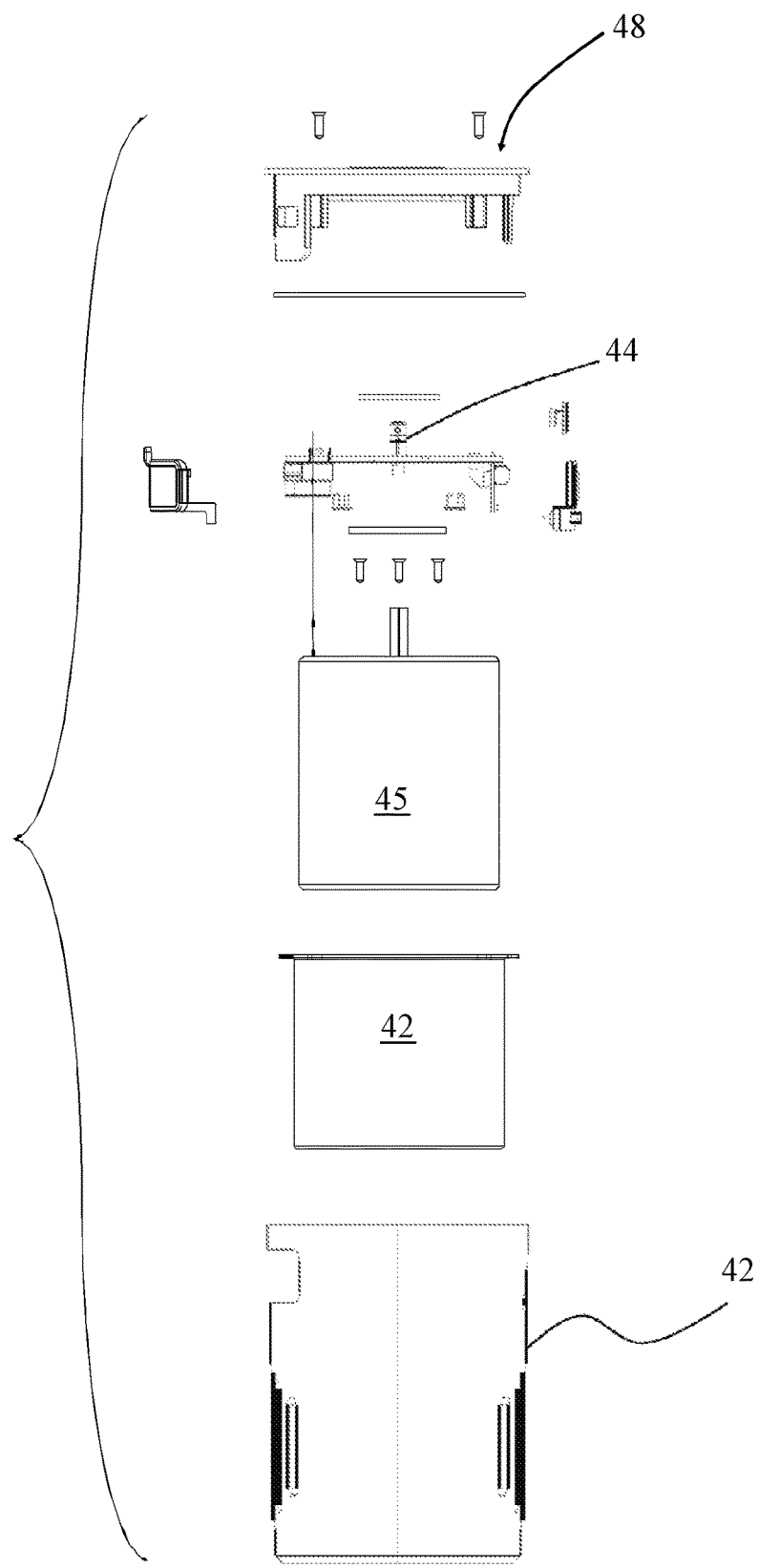
FIG. 5E is an exploded view of the battery module as disclosed in accordance with at least one embodiment of the present invention.
Figure 5F:
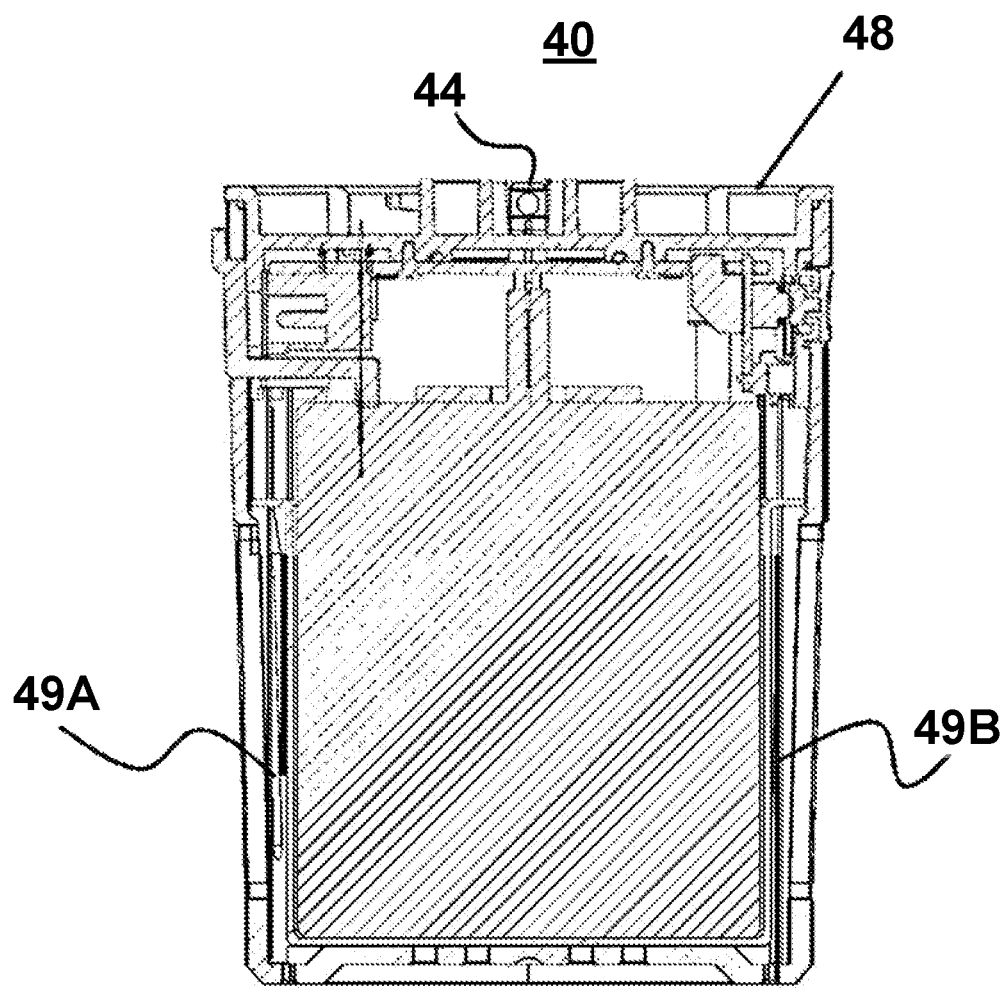
FIG. 5F is a cut away view of the battery module as disclosed in accordance with at least one embodiment of the present invention.

Accordingly, in some embodiments, the heating assembly 30 may be electrically connected to the additional or power source module without engaging the connection assemblies or otherwise without locking the heating assembly 30 to the additional or power source module. Other embodiments may require the connections assemblies to be locked or engaged in order to ensure or provide an electrical connection there between. With reference now to FIGS. 5A through 5F, one embodiment of the additional or attachment module 40, such as a power source module, is illustrated. In this embodiment, the module 40 includes a battery pack in that it incorporates at least one, and in most cases, a plurality of batteries, such as rechargeable batteries. In such a case, the module 40 can be plugged into an external power source, such as an AC or DC power outlet to recharge the batteries. In any event, with reference to FIGS. 5A though 5D, the module 40 includes a connection end 48 which is structured to interconnect with the connection assembly 38 of the heating assembly 30. For instance, as shown in FIG. 5D, the connection end 48 of the module 40 may include one or more recesses 48A with one or more peripheral flanges 48B. With the connection assembly 38 of the heating assembly 30 disposed at least partially within the recess 48A, the one or more flanges 48B will engage or connect with the heating assembly 30, for example, upon twisting the connection assembly 38 relative to the module 40.

For instance, in some embodiments, the one or more flanges 48 may slide within one or more grooves 38B and/or engage one or protrusions or ledges 38A of the connection assembly 38. As provided above, other connection assemblies can be implemented within the full spirit and scope of the present invention. Furthermore, as shown in the top view of FIG. 5C, the module 40 includes at least one electrical connection 44, 44A configured to receive or otherwise electrically connect with the electrical connection 34, 34A of the heating assembly 30. In the embodiment illustrated, the connection 44 of the module 40 includes at least two prongs 44 or two electrical connections within which the electrical connection 34 or prong(s) of the heating assembly 30 can be disposed. An outer peg or electrical connection 44A of at least one embodiment is structured to engage or contact ring 34A. Upon doing so, the electrical connections 34, 34A and 44, 44A of the heating assembly 30 and module 40, respectively, will electrically interconnect with one another thereby allowing the power or electricity from the module 40 to flow or transfer to the heating assembly 30.

Also, this design allows the heating assembly 30 and/or module 40 to spin, twist or rotate (for example partially or 360 degrees) relative to one another without the electrical contacts being disconnected. This is accomplished via the ring 34A and the outer contact 44A. With reference now to the exploded view of FIG. 5E, the module 40 of at least one embodiment includes a plurality of batteries 45, disposed within a housing 42 and electrically connected to connection 44. In at least one embodiment, the module 40 may include at least four (4) batteries, and in some embodiments eight (8) or more batteries. The module 40 and batteries 45 thereof, provide high current capable of providing enough electricity to the heating assembly 30 for the heating assembly 30 to boil water and/or otherwise operate in the intended manner, as described herein.

In one exemplary embodiment, the module 40 may include eight (8) lithium rechargeable batteries (e.g., ICR18650 batteries) with approximately 2600 mAh each, although other batteries with different capabilities and specifications are contemplated within the various embodiments of the present invention. Moreover, in one embodiment, four (4) batteries may be connected in series, with at least two (2) connected in parallel. In one exemplary embodiment, the beginning current may be approximately 15 A, with a working current between 11 A and 14 A.

One or more LEDs or status lights 47 may be included and visible external to the module 40 in order to visually reference or determined the current battery level or electrical charge remaining on the battery pack or module 40. It should also be noted that certain embodiments of the present invention may also include a cooling assembly structured to facilitate the effective dissipation of heat that may be generated by the battery pack or module 40. For instance, the cooling assembly of at least one embodiment may include one or a plurality of ventilation holes, generally referenced as 49, disposed on at least some portions of the housing. The ventilation holes may be arranged on one or more sides and/or bottom surfaces of the housing.

Figure 5G:
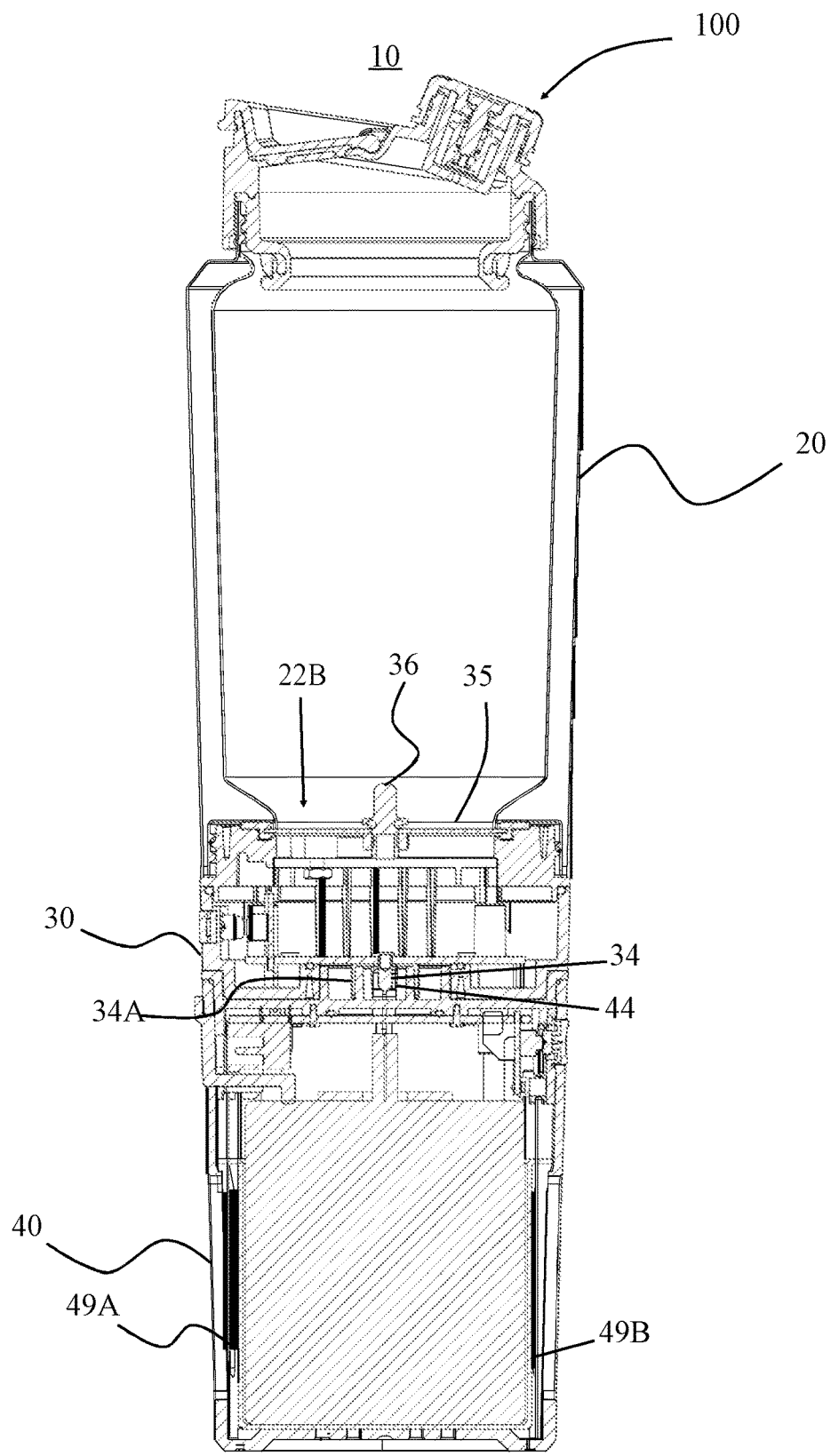
FIG. 5G is a cut away view of the container as disclosed in accordance with at least one embodiment of the present invention, including the main body portion, heating assembly, battery module and cap.

Furthermore, it should be noted that it takes a tremendous amount of energy to boil water, which can create a significant amount of heat, for example, in the battery module 40 or other modules 50, 60, described herein. Accordingly, additional components or features of the cooling assembly, which may be implemented in the battery module 30 or other modules disclosed herein, may also include one or more heat sinks, generally referenced as 49A and 49B, disposed at least partially within or otherwise connected to the module 40, 50 or 60. For instance, with reference to FIGS. 5F and 5G, in some cases, the heat sink(s) 49A, 49B, may be disposed along one or more side surfaces of the module, such as along or proximate one or more ventilation holes 49, in order to facilitate in the dissipation of heat and to prevent potential overheating of the module or otherwise in order to prevent or minimize the module being overly hot to the touch. The heat sink(s) 49A, 49B of certain embodiments may include one more sheets or panels, whether flat, corrugated or otherwise, of metal configured to dissipate the heat.

Other embodiments may also include one or more heat sinks disposed along the bottom surface of the module (not shown). FIGS. 6A through 6F illustrate another embodiment of an additional or power source module 50. In this embodiment, a connection 51 is provided for connecting the module 50 to an external power source, such as an AC electrical outlet, for example, via an electrical or power cable (not shown). The external power source can then provide the power though the corresponding cable to the module 50, which in turn is electrically connected to the heating assembly 30. For instance, the module 50 illustrated in FIGS. 6A through 6F can be selectively connected or disconnected with the heating assembly 30 in the same manner as the module 40 described above and illustrated in FIGS. 5A through 5F.

Figure 6A:
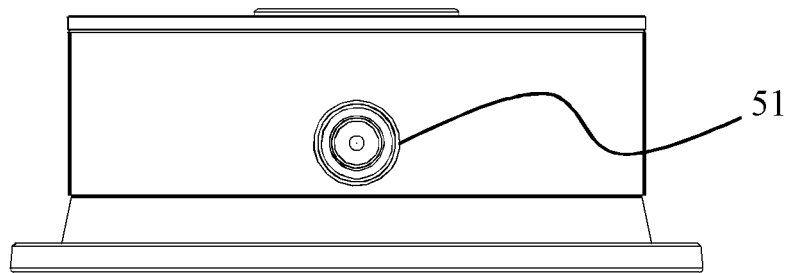
FIG. 6A is an elevation view of an exemplary power source module as disclosed in accordance with at least one embodiment of the present invention.
Figure 6B:
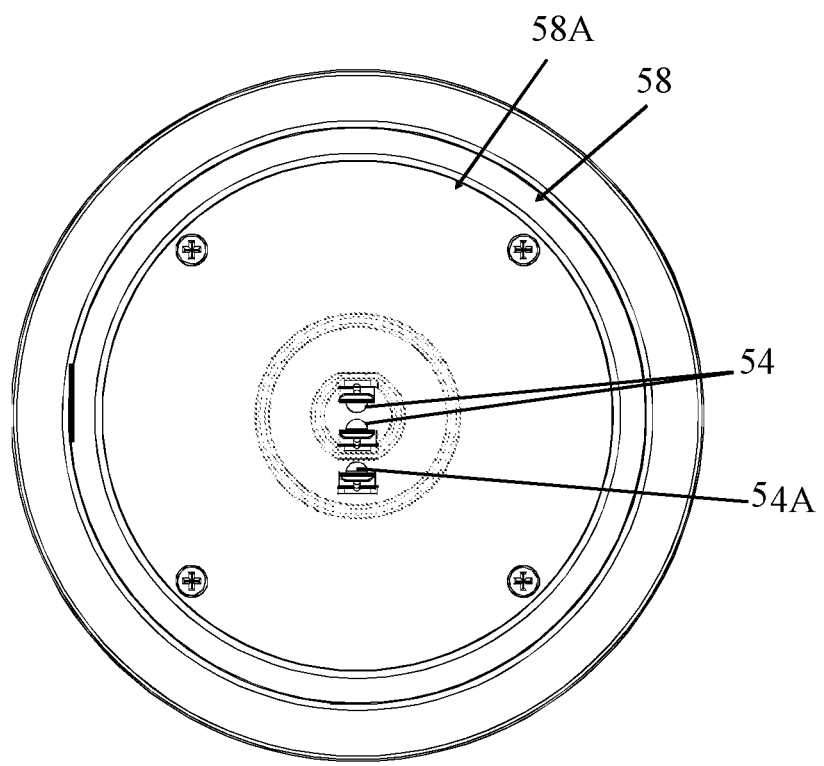
FIG. 6B is a top view of the exemplary power source module illustrated in FIG. 6A.
Figure 6C:
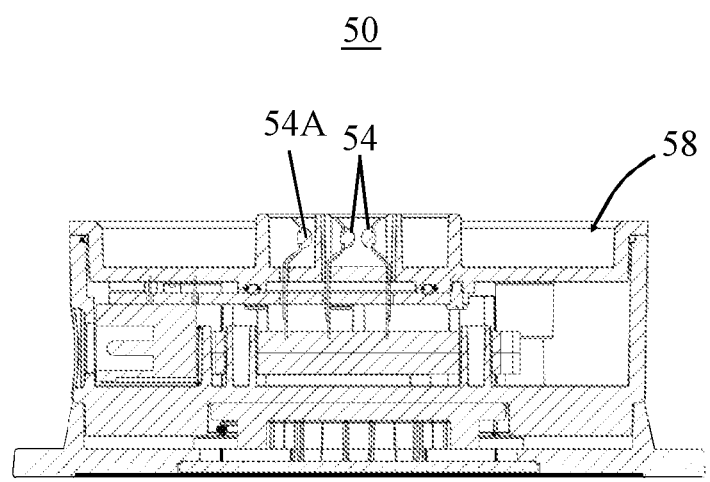
FIG. 6C is a cut away view of the exemplary power source module illustrated in FIG. 6A.
Figure 6D:
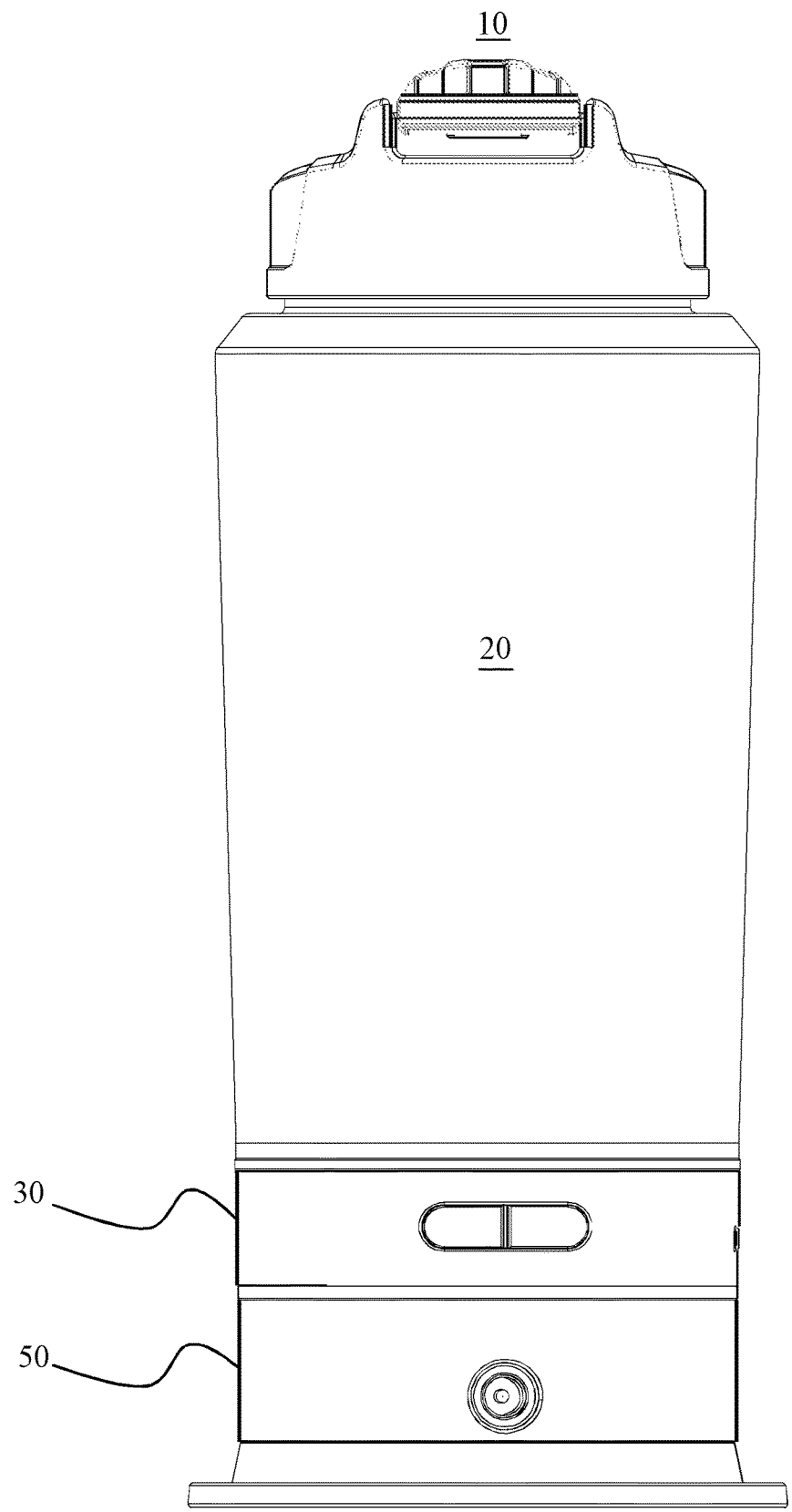
FIG. 6D is a front elevation view of the container as disclosed in accordance with at least one embodiment of the present invention, including the main body portion, heating assembly, exemplary power source module and cap.
Figure 6E:
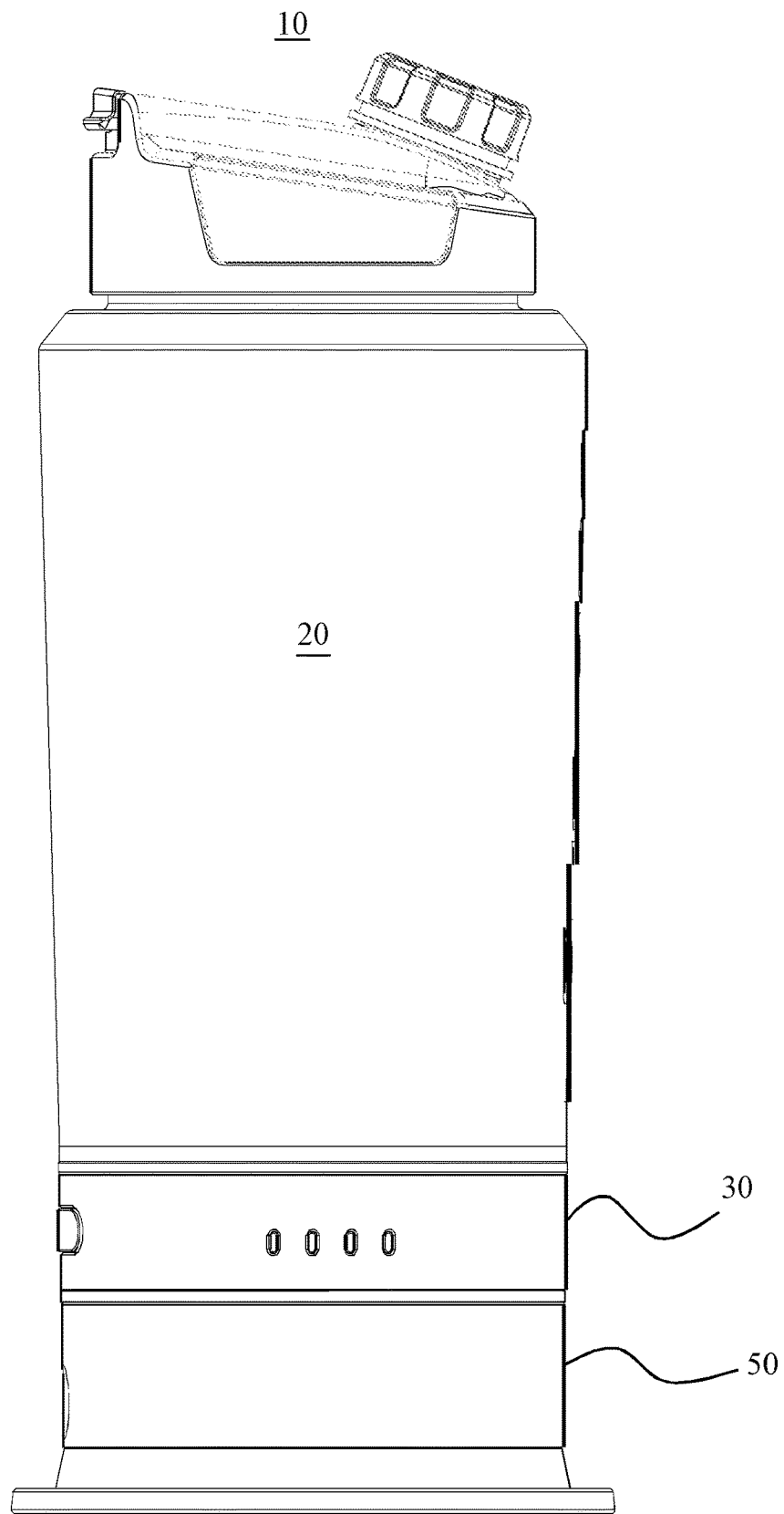
FIG. 6E is a left side elevation view of the embodiment illustrated in FIG. 6D.
Figure 6F:
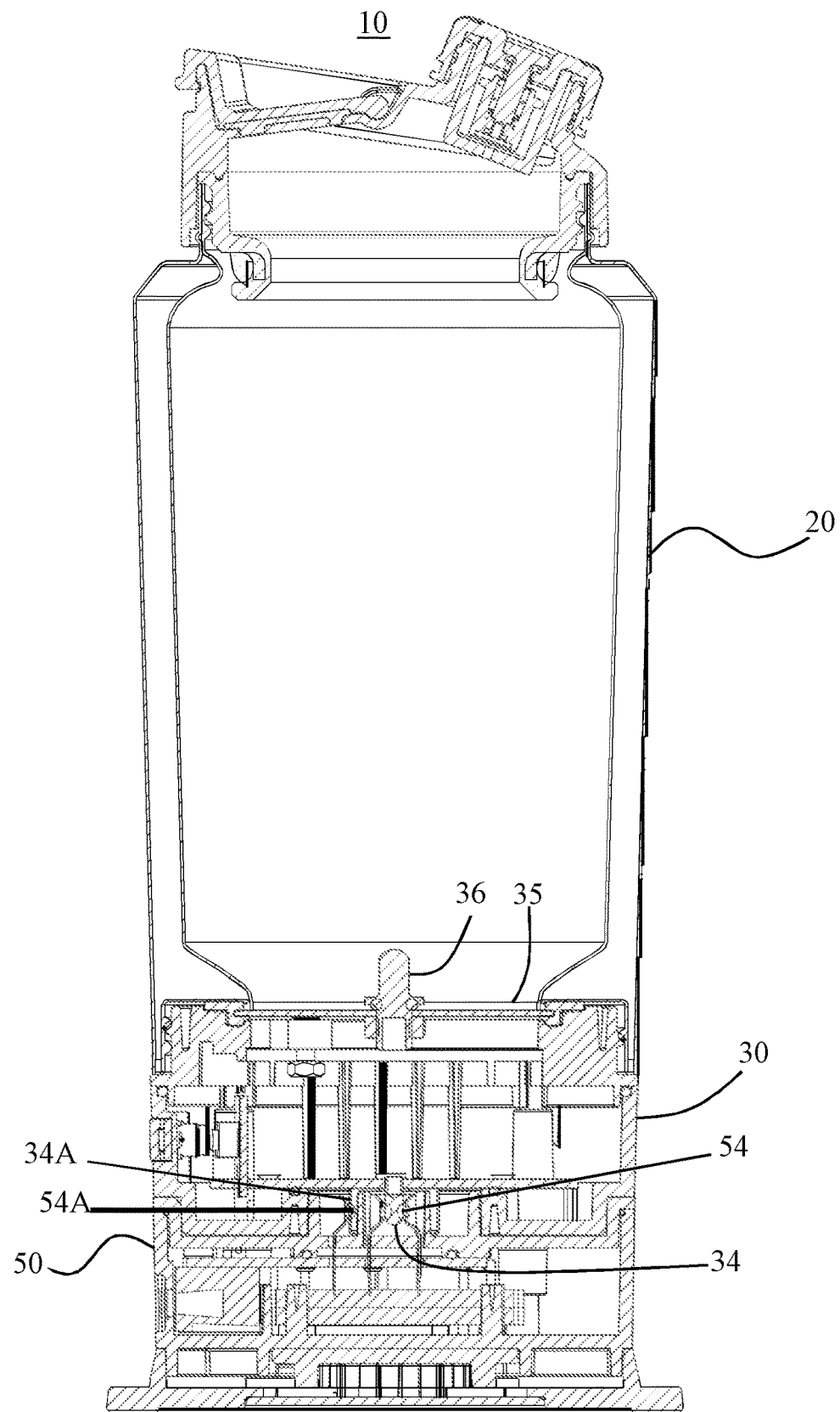
FIG. 6F is a left side cut away view of the embodiment illustrated in FIG. 6D.

For example, the module 50 of at least one embodiment includes a connection end 58 which is structured to interconnect with or otherwise at least partially receive the connection assembly 38 of the heating assembly 30. For instance, connection end 58 of the module 50 may include recesses 58A within which the connection assembly 38 or a portion of the heating assembly 30 may sit or reside. In at least one embodiment, as illustrated in FIG. 6B, the recess 58A of the module 50 may not include any flanges (such as flanges 48B of the battery module 40). In such a case, the heating assembly 30 and/or container 10 is able to be easily lifted out of the module 50 such that the module 50 may remain seated on a support surface such as a desk top or counter top. This allows a user to lift the container off of the module 50, for example, in order to drink out of the container or pour contents from the container, and subsequently seat the container back upon the module 50 in order to resume heating.

Accordingly, in some embodiments, the container, heating assembly 30 and/or module 50 may include a memory chip or memory capabilities such that the container and/or heating assembly 30 is lifted off of the module 50, and then subsequently return to the module 50 such that an electrical connection is reestablished between the heating assembly 30 and the module 50, the previous settings (e.g., the previously selected temperature range) does not need to be re-entered by the user.

Other embodiments may include one or more flanges (not shown in FIG. 6B) such that the module 50 may lock within the heating assembly 30, in a similar manner as the battery module 40 discussed herein. Furthermore, as shown in the top view of FIG. 6B, the module 60 includes at least one electrical connection 54, 54A configured to receive or otherwise electrically connect with the electrical connection 34, 34A of the heating assembly 30. In the embodiment illustrated, the connections 54 of the module 50 include at least two prongs or electrical connections within which the electrical connection 34 or prong(s) of the heating assembly 30 can be disposed. An outer peg or electrical connection 54A of at least one embodiment is structured to engage or contact ring 34A. Upon doing so, the electrical connections 34, 54 of the heating assembly 30 and module 50, respectively, will electrically interconnect with one another thereby allowing the power or electricity from the module 50 to flow or transfer to the heating assembly 30. Also, as described above with regard to the module 40, this design allows the heating assembly 30 and/or module 50 to spin, twist or rotate (for example partially or 360 degrees) relative to one another without the electrical contacts being disconnected.

FIGS. 7A through 7F illustrate yet another embodiment of an additional or power source module 60. In this embodiment, a connection 61 is provided for connecting the module 50 to an external power source, such as a vehicle DC electrical outlet, for example, via an electrical or power cable (not shown). The external power source can then provide the power though a corresponding cable to the module 60, which in turn is electrically connected to the heating assembly 30. For instance, the module 60 illustrated in FIGS. 7A through 7F can be selectively connected or disconnected with the heating assembly 30 in the same manner as the module 40 described above and illustrated in FIGS. 5A through 5F. For example, the module 60 of at least one embodiment includes a connection end 68 which is structured to interconnect with the connection assembly 38 of the heating assembly 30. For instance, connection end 68 of the module 60 may include recesses 68A with one or more peripheral flanges 68B. With the connection assembly 38 of the heating assembly 30 disposed at least partially within the recess 68A, the one or more flanges 68B will engage or connect with the heating assembly 30, for example, upon twisting the connection assembly 38 relative to the module 50.

Figure 7A:
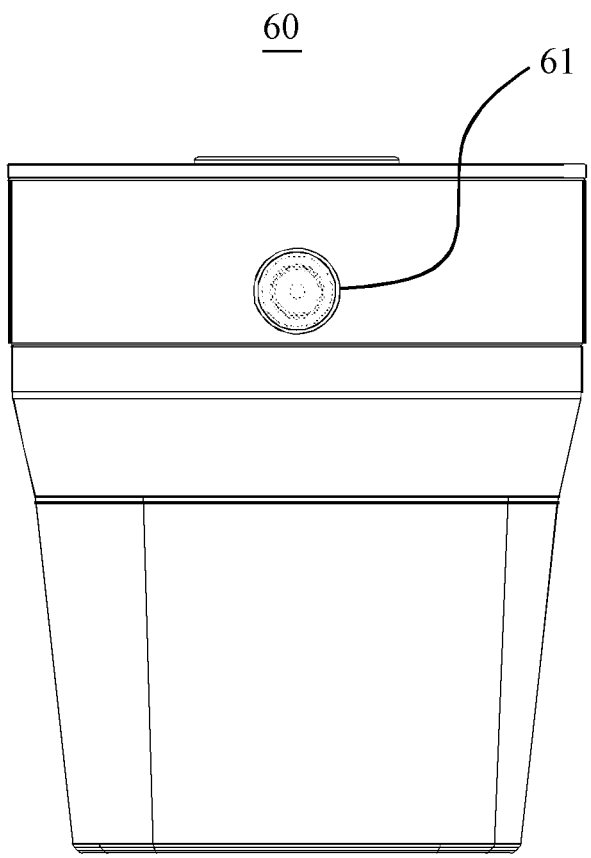
FIG. 7A is an elevation view of another exemplary power source module as disclosed in accordance with at least one embodiment of the present invention.
Figure 7B:
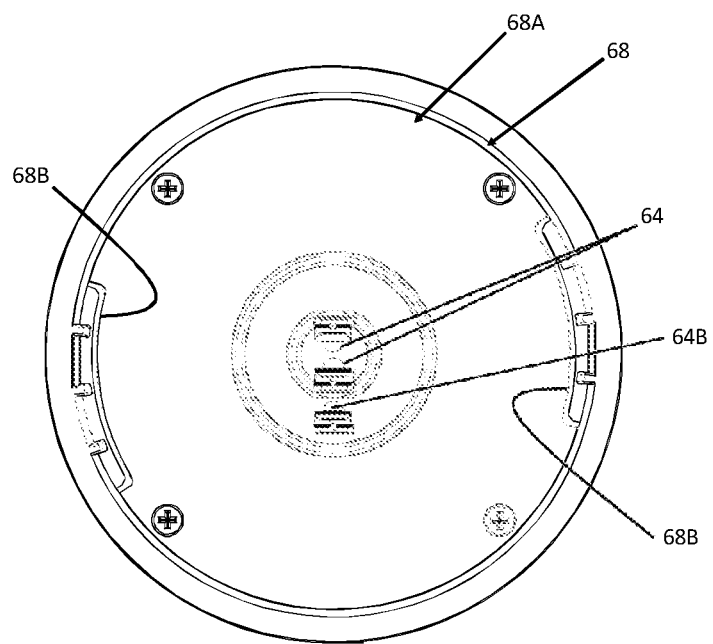
FIG. 7B is a top view of the exemplary power source module illustrated in FIG. 7A.
Figure 7C:
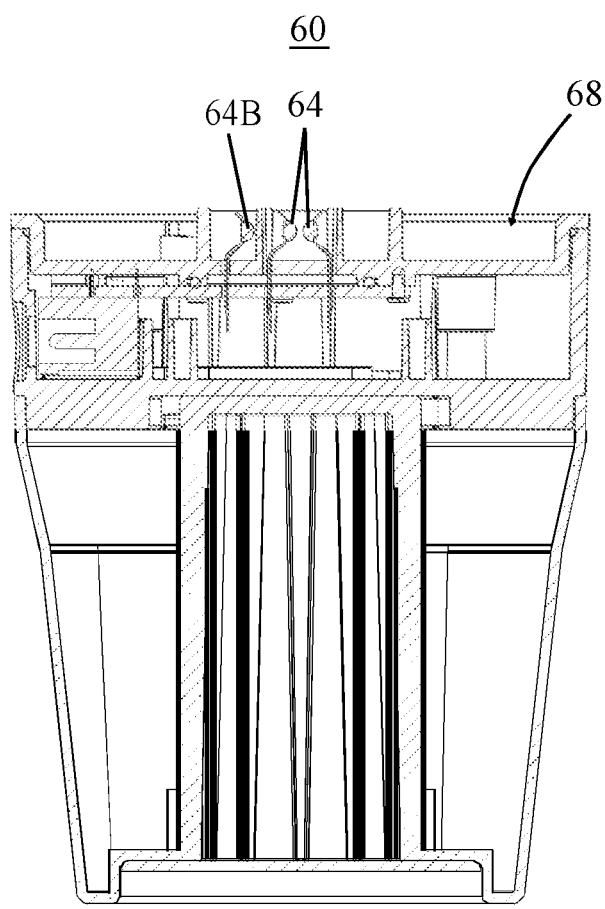
FIG. 7C is a cut away view of the exemplary power source module illustrated in FIG. 7A.
Figure 7D:
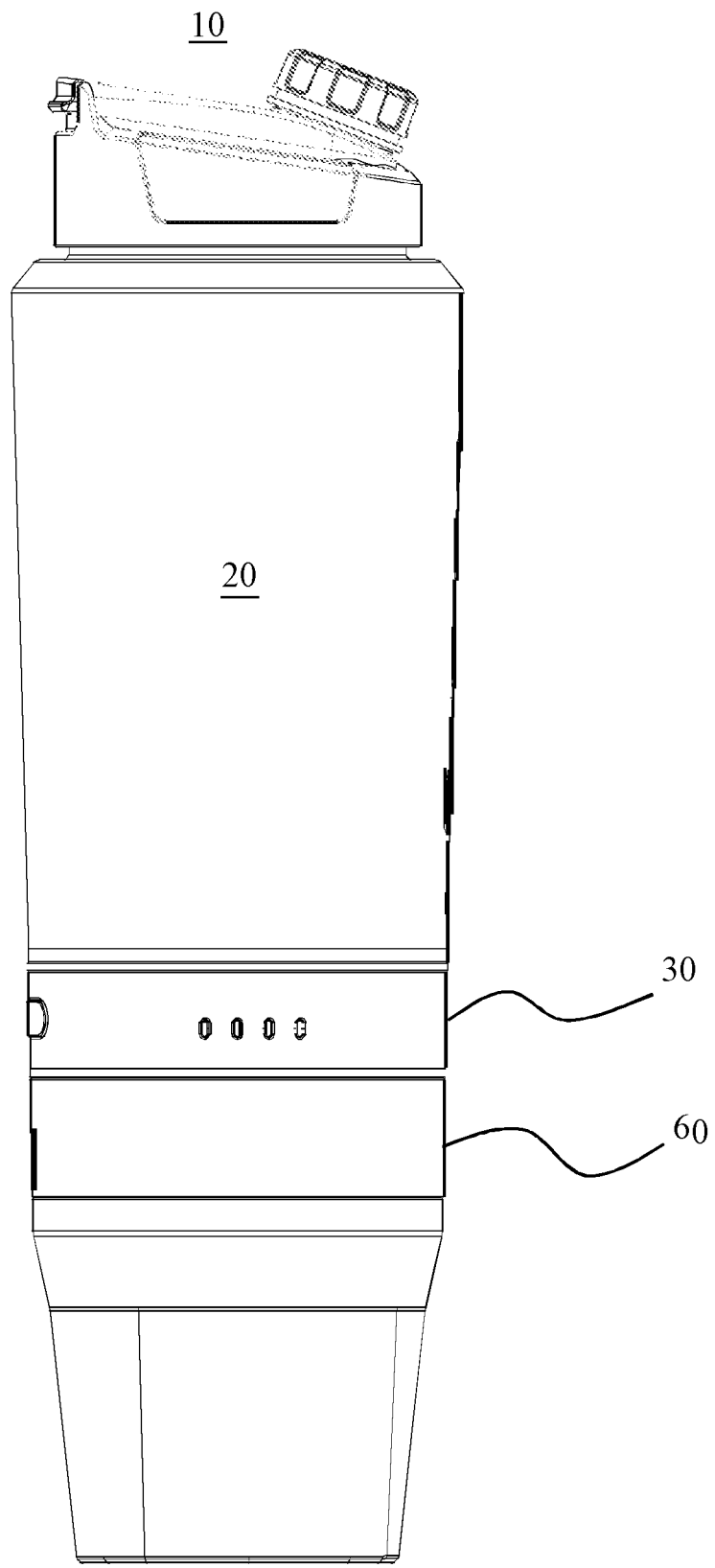
FIG. 7D is a left side elevation view of the container as disclosed in accordance with at least one embodiment of the present invention, including the main body portion, heating assembly, exemplary power source module and cap.
Figure 7E:
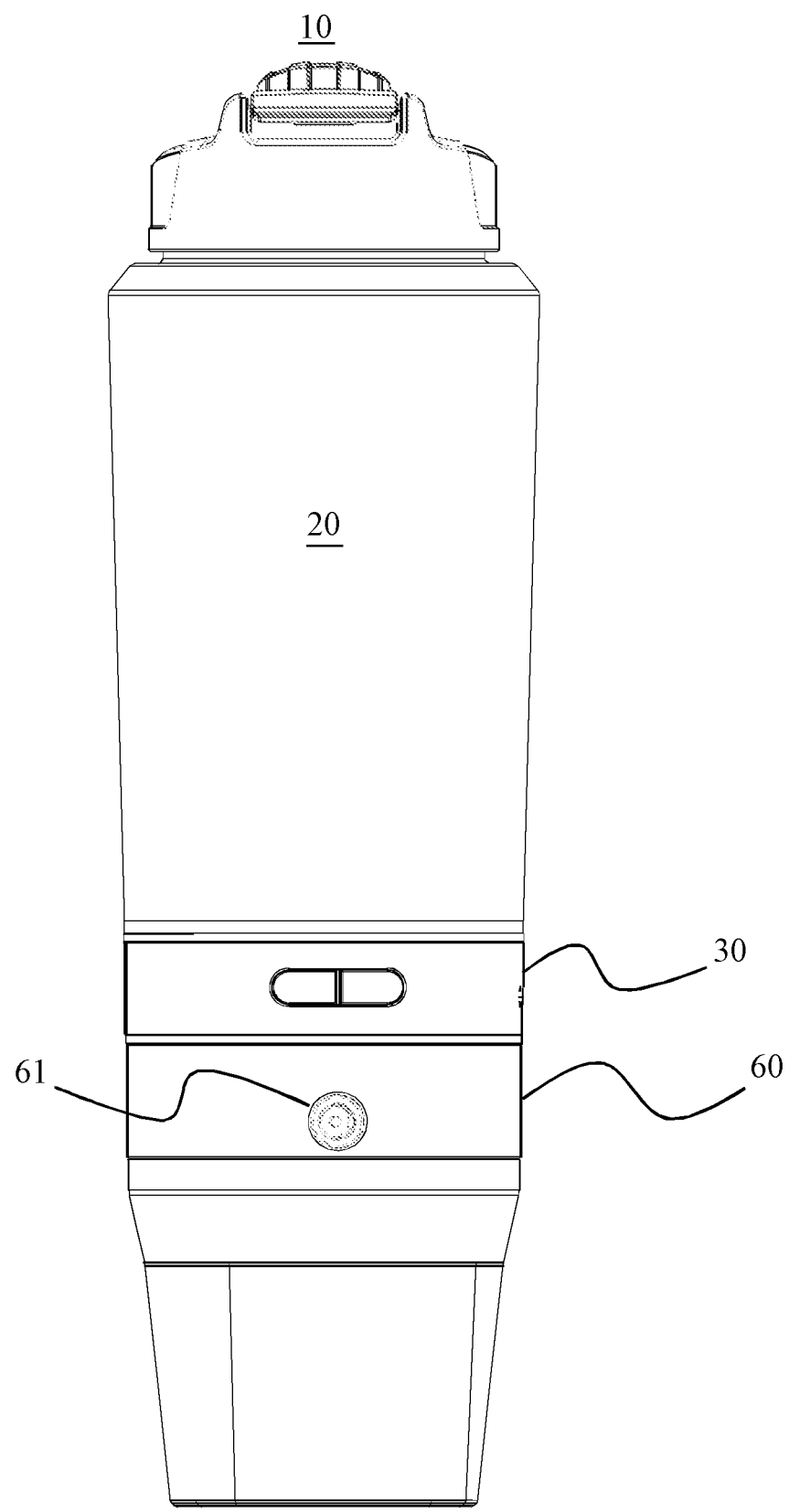
FIG. 7E is a rear elevation view of the embodiment illustrated in FIG. 7D.
Figure 7F:
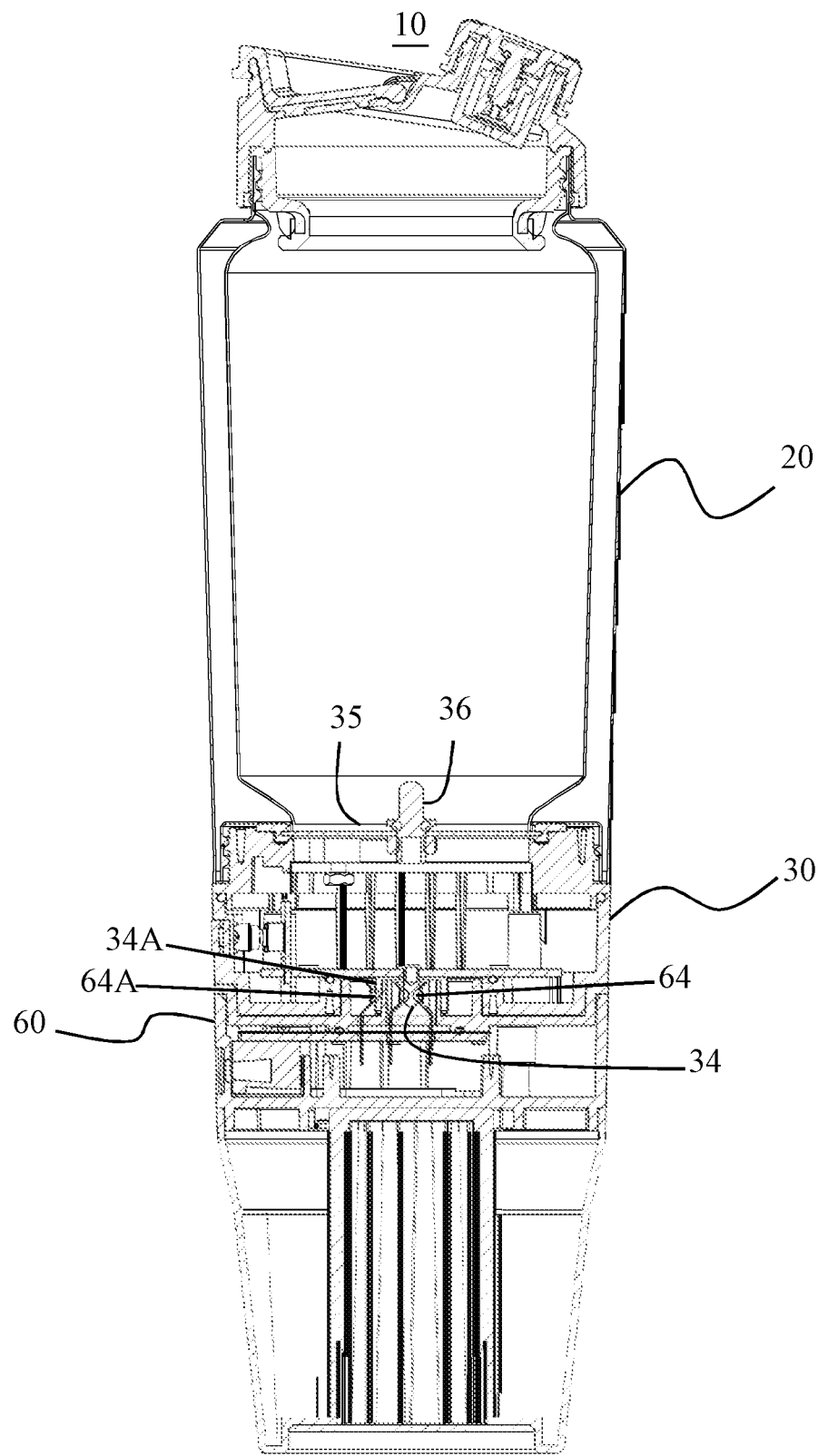
FIG. 7F is a left side cut away view of the embodiment illustrated in FIG. 7D.
Figure 8A:
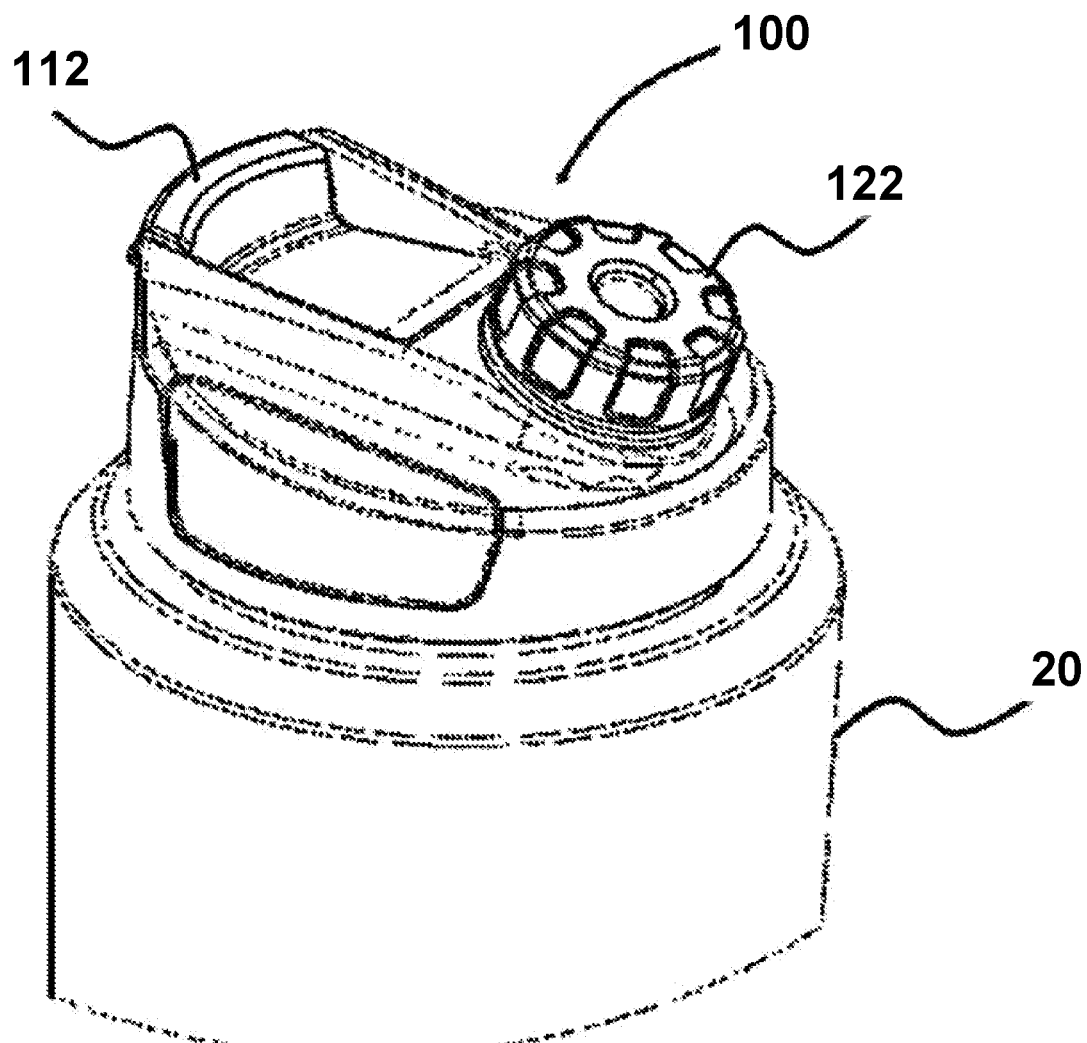
FIG. 8A is a partial perspective view of the cap and body portion of at least one embodiment of the present invention.
Figure 8B:
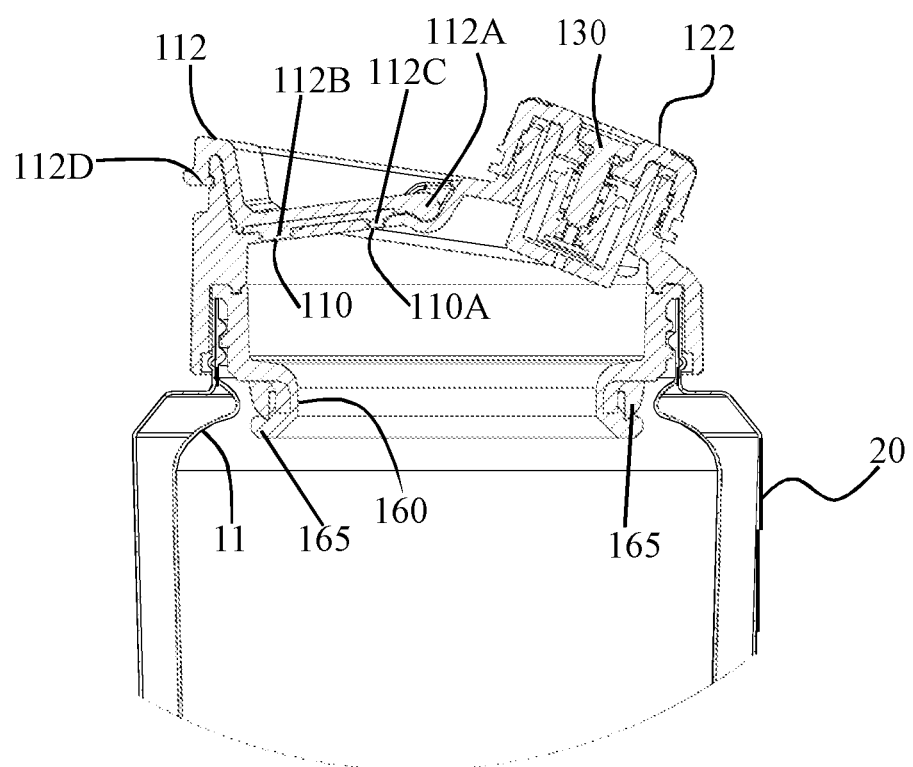
FIG. 8B is a cut away view of the embodiment illustrated in FIG. 8A.

Furthermore, as shown in the top view of FIG. 7B, the module 60 includes at least one electrical connection 64, 64A configured to receive or otherwise electrically connect with the electrical connection 34, 34A of the heating assembly 30. In the embodiment illustrated, the connection 64 of the module 60 includes at least two prongs within which the electrical connection 34 or prong(s) of the heating assembly 30 can be disposed. An outer peg or electrical connection 64A of at least one embodiment is structured to engage or contact ring 34A. Upon doing so, the electrical connections 34, 64 of the heating assembly 30 and module 60, respectively, will electrically interconnect with one another thereby allowing the power or electricity from the module 60 to flow or transfer to the heating assembly 30. Also, this design allows the heating assembly 30 and/or module 60 to spin, twist or rotate (for example partially or 360 degrees) relative to one another without the electrical contacts being disconnected.

In addition, the module 60 illustrated in FIG. 7A though 7F includes a specifically configured base or housing that can fit within a cup holder, for example, those commonly found in the cabin of a car or other vehicle. In use, the module 50 may sit within the cup holder while the cable is connected to the vehicle's power source, such as through the DC power supply cable.

If desired, the user can selectively disconnect the main body portion 20 and the heating assembly 30 from the module 60, for example, via the twist and lock (or other) connection assembly. This can allow the user to drink from the container 10 while the module 60 remains seated within the cup holder or upon a table, counter, etc. Setting the heating assembly 30 back upon the module 60 will reconnect the electrical connections 34, 64, resuming heating operations.

Accordingly, in some embodiments, the heating assembly 30, and the connection assembly 38 thereof, need not be locked into place with the module 40, 50, 60 for the module 40, 50, 60 to operate and/or otherwise to deliver power or electricity from the module 40, 50, 60 to the heating assembly 30.

Furthermore, in some embodiments, the container 10 includes a memory component in order to store the selected settings or modes. For example, when the main body portion 20 is removed from the module 40, 50 60 and then returned to the module 40, 50 60, when it is returned to the module 40, 50, 60 and reconnected, the heating assembly 30 will remember the prior selected settings or modes (e.g., temperature range(s)) and continue to heat the contents of the container 10 according to those settings or modes.

Referring now to FIGS. 8A through 11B, the present invention also includes a novel cap, generally referenced as 100. In particular, the cap 100 of at least one embodiment is configured to be removably attached or connected to the main body portion 20 of the container, for example, via cooperative threaded components or other like attachment assemblies. One or more gaskets may be provided on the cap 100 or on the main body portion 20 of the container 10, for example, on a threaded neck portion thereof, in order to provide a liquid tight seal between the cap 100 and the body 20. In any event, the cap 100 of at least one embodiment may include dual dispensing openings 110, 120 in that the cap 100 may include at least two separate openings 110, 120, each of which are structured and configured to allow independent dispensing of fluid from the container 10.

The first opening in at least one embodiment may often be used to drink hot liquids from the container 10 although liquids of any temperature can be dispensed or consumed through either of the two or more openings 110, 120. For instance, one of the at least two separate openings, such as a first opening 110, includes a pivoting closure device 112 allowing for the corresponding opening 110 to be selectively opened or closed. The closure device 112 may pivot upon the cap 100 at pivot point 112A in order to selectively open and close the opening 110. The closure device 112 may include a stopper or plug 112B that fits at least partially within the opening 110 in order to provide a liquid tight seal when closed.

Furthermore, an inlet hole 110A may be included in order to facilitate the pouring or consuming of liquid from the container. The inlet hole 110A allows air to enter the container 10 such that the liquid can freely flow out of the container 10 through opening 110. In this manner, the closure device 112 may also include a stopper or plug 112C that correspondingly fits within the inlet hole 110A when the closure device is pivoted into the closed position, as shown in the cut-away view of FIG. 8B. In addition, the closure device 112 of at least one embodiment may include a lip 112D on an outer end thereof for engagement into a corresponding groove on an outwardly facing surface of the cap 100.

When the closure device 112 is closed, the lip 112D will engage within the groove providing a tight engaging fit. Pulling on the closure device 112 with force sufficient to remove the lip 112D from the groove will allow the closure device 112 to be pivoted upward to open the opening 110. The cap 100 may also include another or second opening 120, which, as provided above, may be useful for pouring liquid, such as a cold liquid, from the container 10. The second opening 120 also includes a closure device 122. The closure device 122 of at least one embodiment may include threaded components 124 that cooperate with threaded components 102 on an extended neck portion 101 of the cap 100.

Figure 9A:
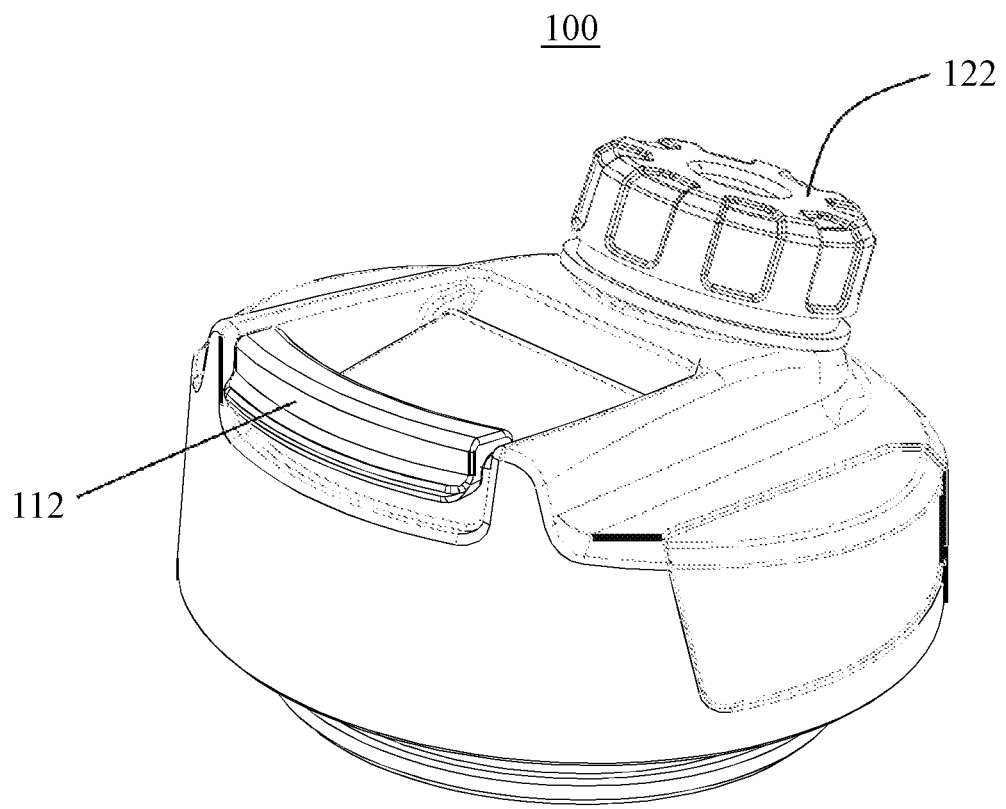
FIG. 9A is a perspective view of the cap of at least one embodiment of the present invention.
Figure 9B:
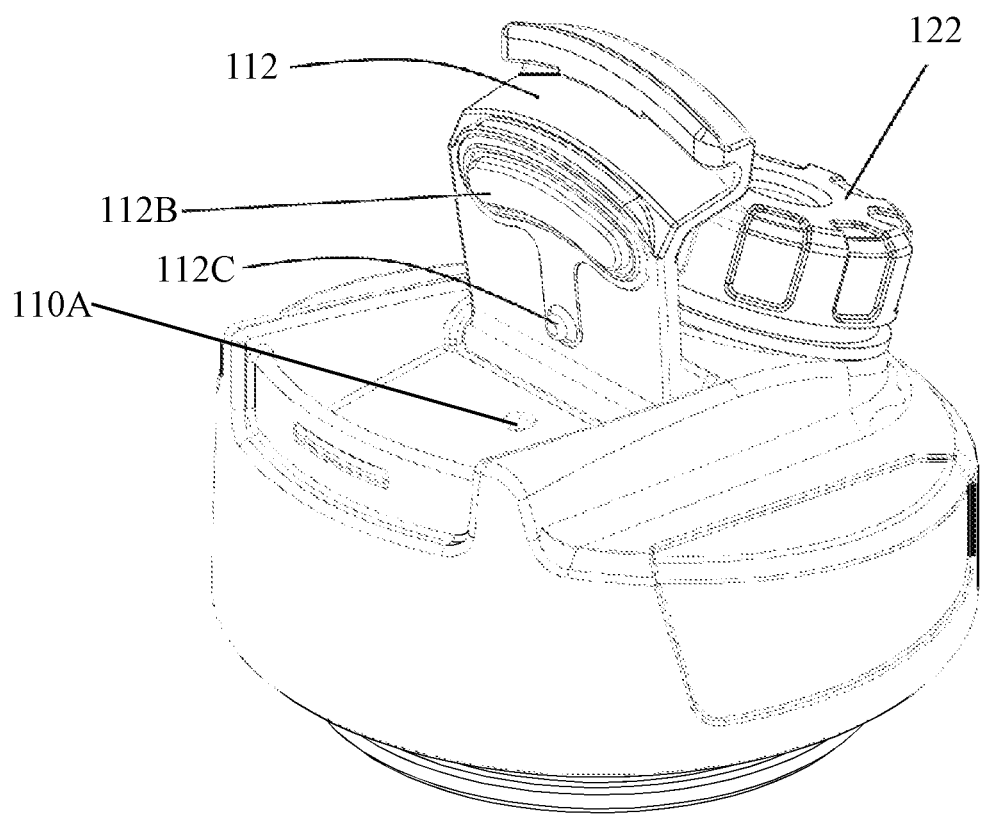
FIG. 9B is another perspective view of the cap illustrated in FIG. 9A.
Figure 9C:
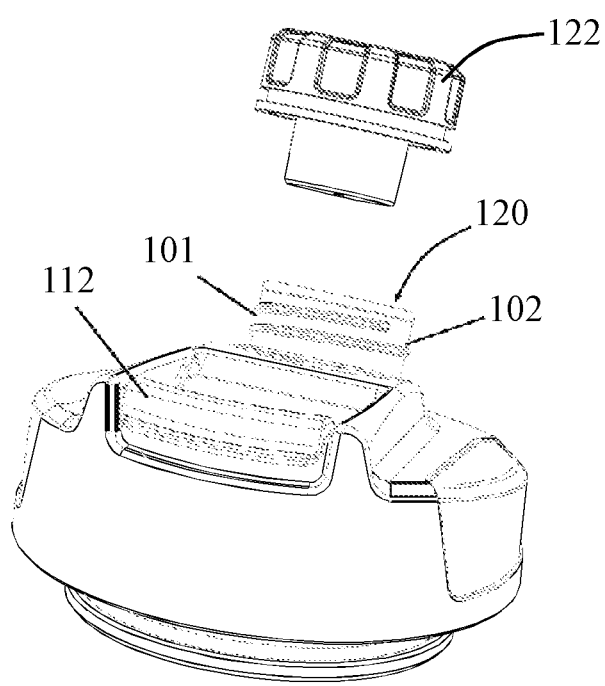
FIG. 9C is a perspective and partially exploded view of the cap illustrated in FIGS. 9A and 9B.
Figure 11A:
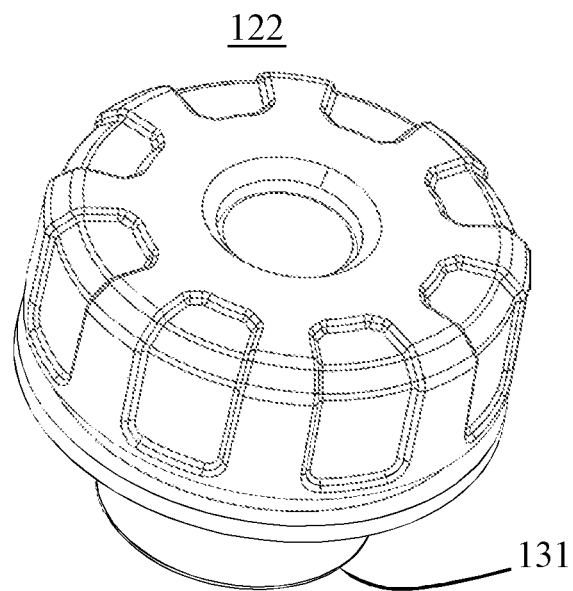
FIG. 11A is a top perspective view of the second closure device as disclosed in accordance with at least one embodiment of the present invention.
Figure 11B:
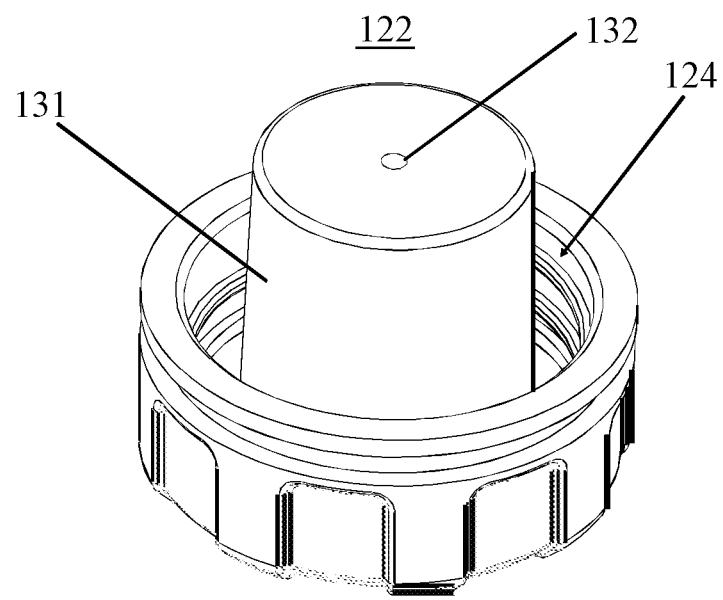
FIG. 11B is a bottom perspective view of the closure device illustrated in FIG. 11A.

Particularly, with reference to FIGS. 11B and 9C, the closure device 120 of one embodiment includes threaded components 120 on an inside surface thereof that fit with the threaded components 102 on the outside surface of neck portion 101. In this regard, in order to open and/or close opening 120, the closure 122 can be screwed off and/or on, respectively. Additional features of the closure device 122 of at least one embodiment include a pressure release valve, generally referenced as 130 in the cut away view of FIG. 8B. In particular, the pressure release valve 130 is structured to allow vapor and/or steam to escape from the inside of the container, for example, via hole or aperture 132 and through valve 130.

Moreover, at least one embodiment of the cap 100 may also a tether (not shown) which can be secured around the circumference of the cap 100 or container 10, and one or more of the closure devices, such as the screw cap closure device 122. In this manner, when the screw cap closure device 122 is removed from the corresponding opening 120, the tether can be used to retain the closure device 122 connected to the cap 100 or container 10 such that it cannot be lost or misplaced. As an example, the tether can be constructed of a flexible rubber, plastic or other like material and secured to the closure device 122 and the cap 100 or container 10.

Figure 10:
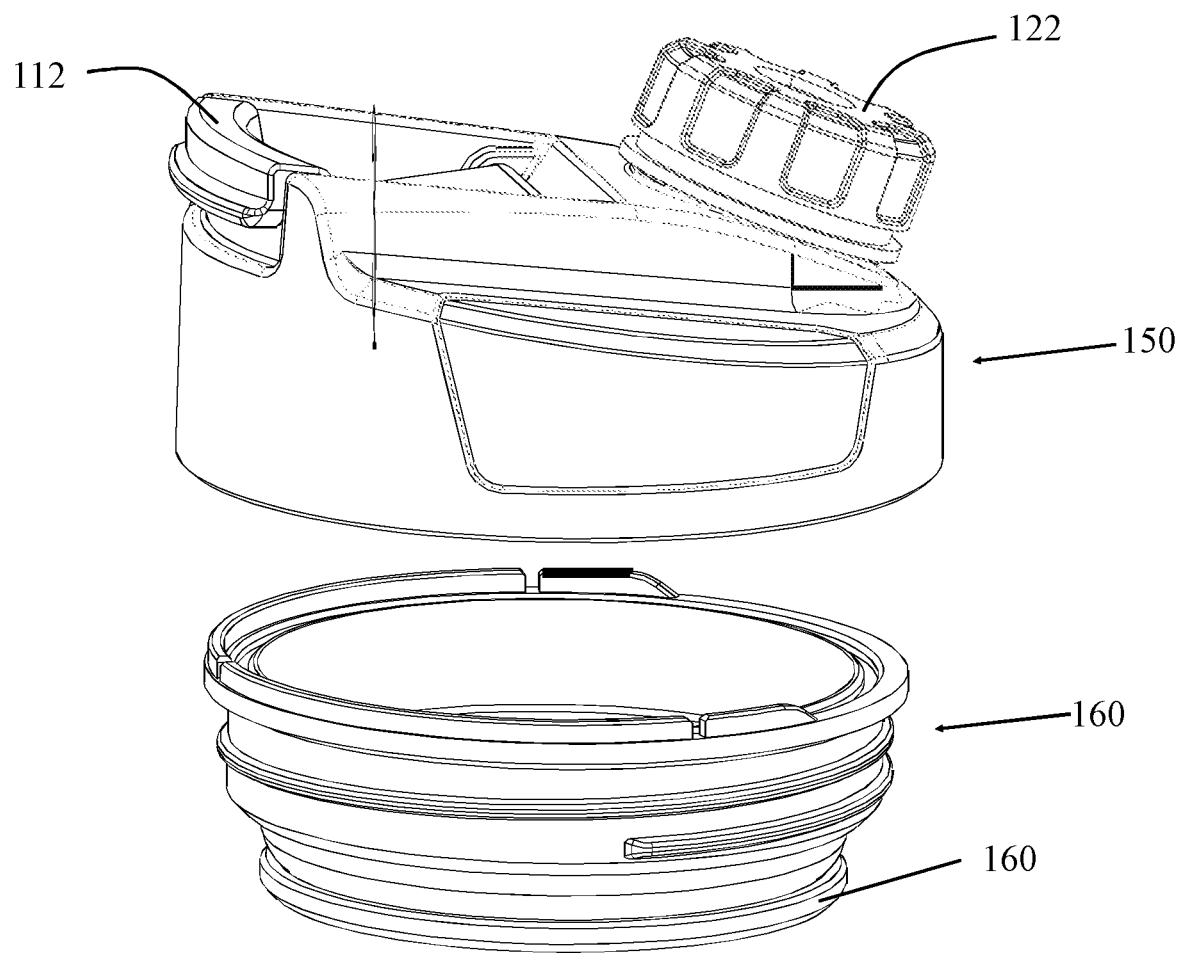
FIG. 10 is a partially exploded view of the cap as disclosed in accordance with at least one embodiment of the present invention.

It should also be noted that the tether of at least one embodiment can also be used as a handle for carrying the container or securing the container to an external item, if desired. As shown in FIG. 10, at least one embodiment of the cap 100 includes two portions, a main top portion 150 and an inner connection portion 160. The inner connection portion 160 is connected to the inside of the main top portion 150 and includes a threaded component or base rim 165 that cooperates with the neck portion 11 of the main body portion 20 of the container 10. In this manner, the inner connection portion 160 of the cap 100 can be selectively removable coupled or attached to the neck 11 of the main body portion 20 of the container 10 in order to open and closed the top end 22A thereof.

Figure 12A:
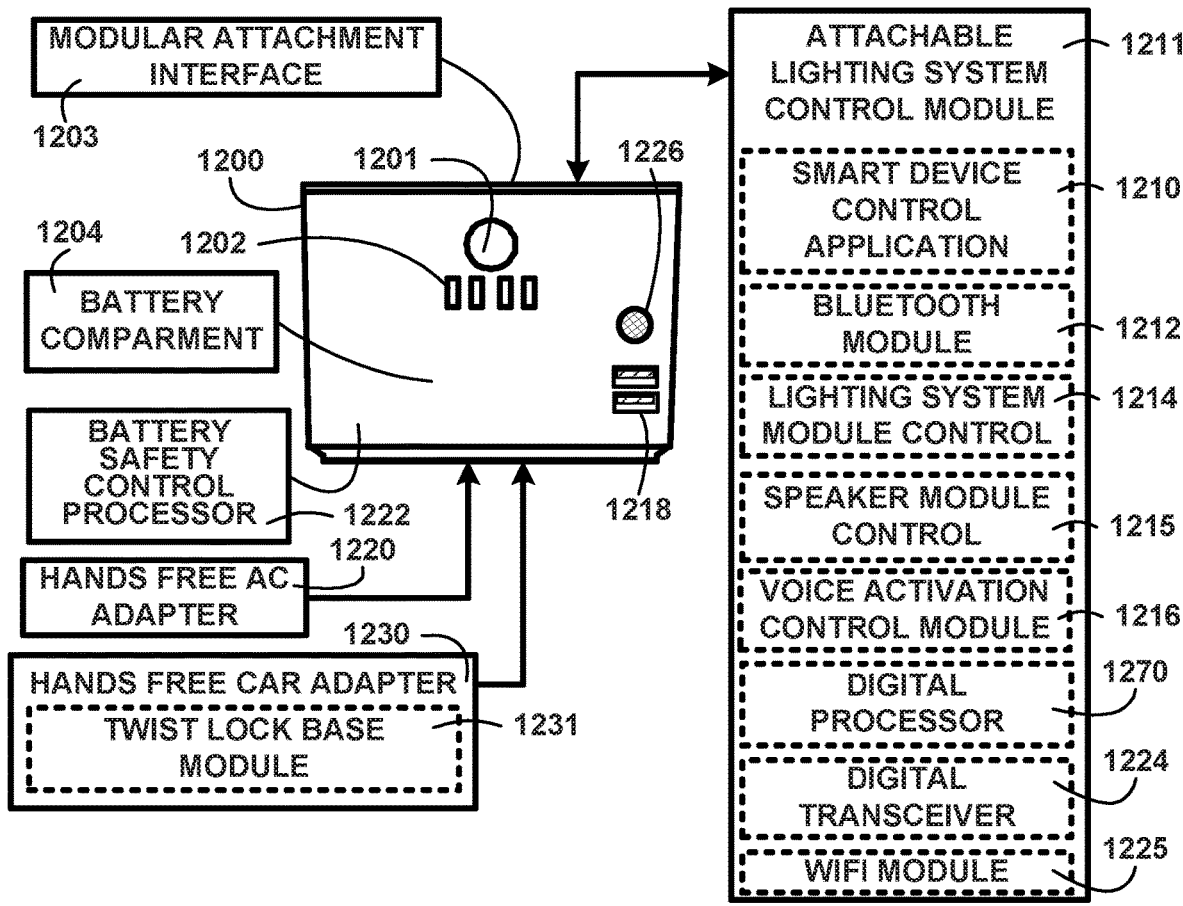
FIG. 12A shows for illustrative purposes only an example of an attachable battery base module of one embodiment.

Attachable Battery Base Module:

FIG. 12A shows for illustrative purposes only an example of an attachable battery base module of one embodiment. FIG. 12A shows an attachable battery base module 1200 including an on/off button 1201, status indicator lights 1202, modular attachment interface 1203, and battery compartment 1204. The attachable battery base module 1200 further includes at least one digital processor including for example a PCBA for battery safety control processor 1222. Modular attachments including an attachable lighting system control module 1211 can be powered using the attachable battery base module 1200. The attachable lighting system control module 1211 includes at least one digital transceiver 1224, a WIFI module 1225, a microphone 1226, at least one digital processor 1270, at least one digital transceiver 1224 for processing communications between a user smart device control application 1210, Bluetooth module 1212, voice activation control module 1216 for communicating with a user smart device, WIFI and Bluetooth technology devices. The microphone 1226 is used with a voice activation control module 1216 to receive the user voice commands. The attachable battery base module 1200 powers attachments for example for beverage preparation and temperature control module, audio speakers, a lighting system 1214, hot water portable sprayer and other attachments. The temperature control module includes a temperature maintenance mode, wherein a user can select a desired temperature, the temperature maintenance mode will heat (or cool) to that temperature and then maintain the desired temperature. The battery compartment 1204 houses rechargeable batteries that can be recharged.

Modular attachments including the attachable lighting system control module 1211 can be powered using a hands free ac adapter 1220 and in a vehicle using a hands free car adapter 1230. When used for beverages the attachments include a twist lock base module 1231 to prevent the beverage module from tipping over. Hands free as used herein means a bottle can be lifted out of power charging adapter for drinking without raising wire and adapter. The bottle can also be twist locked in place for rough rides. The audio speakers and lighting system can be powered by attaching the audio speaker module and/or the lighting system module to the attachable battery base module 1200 of one embodiment.

Figure 12B:
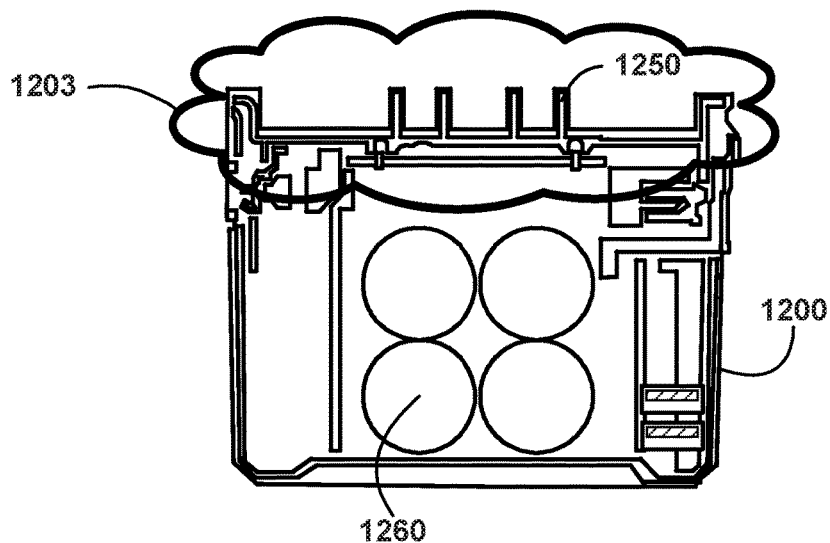
FIG. 12B shows for illustrative purposes only an example of an attachable battery base module cross section of one embodiment.

Attachable Battery Base Module Cross Section:

FIG. 12B shows for illustrative purposes only an example of an attachable battery base module cross section of one embodiment. FIG. 12B shows the attachable battery base module 1200 cross section with modular attachment interface 1203 shows multiples of a power transfer buss bar 1250 used for transferring power from a battery 1260 to one of the attachments. The attachable battery base module 1200 includes in one embodiment at least 8 ICR18650 batteries, 2600 mAh each configured for 4 in series and then 4 in parallel. The attachable battery base module 1200 in other embodiments can include integrated solar cells to charge batteries and/or operate attachable modules. The attachable battery base module 1200 in other embodiments can include at least one battery with the capacity to boil water, heat and/or cool a liquid to a preset, predefined or user preselected temperature. A beginning current is 15 A and working current is from 14A drop to 11A gradually. The current is capable of boiling water of one embodiment.

Figure 13A:
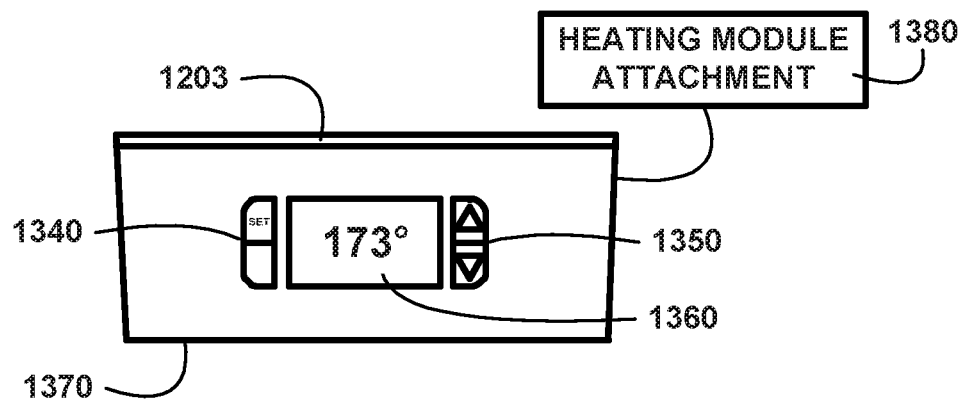
FIG. 13A shows for illustrative purposes only an example of a heating module attachment of one embodiment.

Heating Module Attachment:

FIG. 13A shows for illustrative purposes only an example of a heating module attachment of one embodiment. FIG. 13A shows a heating module attachment 1380 including a modular attachment interface 1203, settings control buttons 1340, battery attachment interface 1370, temperature setting buttons 1350 and a temperature LCD display 1360 used for viewing the current and programmed temperature set by a user.

A user can select a desired temperature and the heating module attachment 1380 will auto maintain at that temperature. The user can make a temperature selection using the temperature LCD display 1360. The user can also select a battery save mode that will allow temperature variations of 6 degrees to prolong battery life.

The heating module attachment 1380 includes a control module for maintaining where it will keep liquid at a user selected temperature range including a boiling temperature. In another embodiment the heating module attachment 1380 has a feature wherein the user can set a desired temperature wherein the heating module attachment 1380 will maintain the user set desired temperature when that temperature is reached. The attachable battery base module 1200 of FIG. 12A can maintain a beverage heat for up to 20 hours with battery. The heating module attachment 1380 transfers heat to a heating plate that is in direct contact with the water. The user can make a temperature selection using the temperature LCD display 1360 scrolling the user temperature setting as a user make changes and/or selections. The user can also select a battery save mode that will allow temperature variations of 6 degrees to prolong battery life of one embodiment.

Figure 13B:
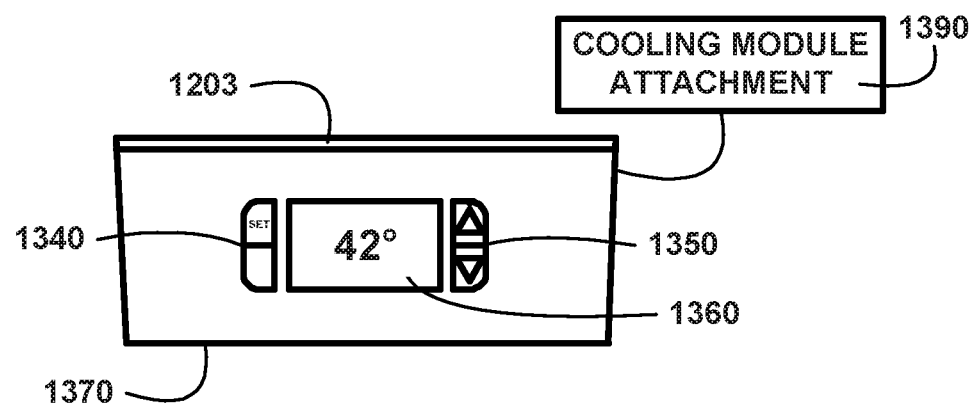
FIG. 13B shows for illustrative purposes only an example of a cooling module attachment of one embodiment.

Cooling Module Attachment:

FIG. 13B shows for illustrative purposes only an example of a cooling module attachment of one embodiment. FIG. 13B shows a cooling module attachment 1390 including the modular attachment interface 1203, settings control buttons 1340, battery attachment interface 1370, temperature setting buttons 1350 and temperature LCD display 1360. In another embodiment the cooling module attachment 1390 has a feature wherein the user can set a desired temperature wherein the cooling module attachment 1390 will maintain the user set desired temperature when that temperature is reached. In one embodiment cooling a liquid including a beverage can be performed using a TEC, Thermal Energy Converter chip and heatsink powered using the attachable battery base module 1200 of FIG. 12A of one embodiment.

Figure 14:
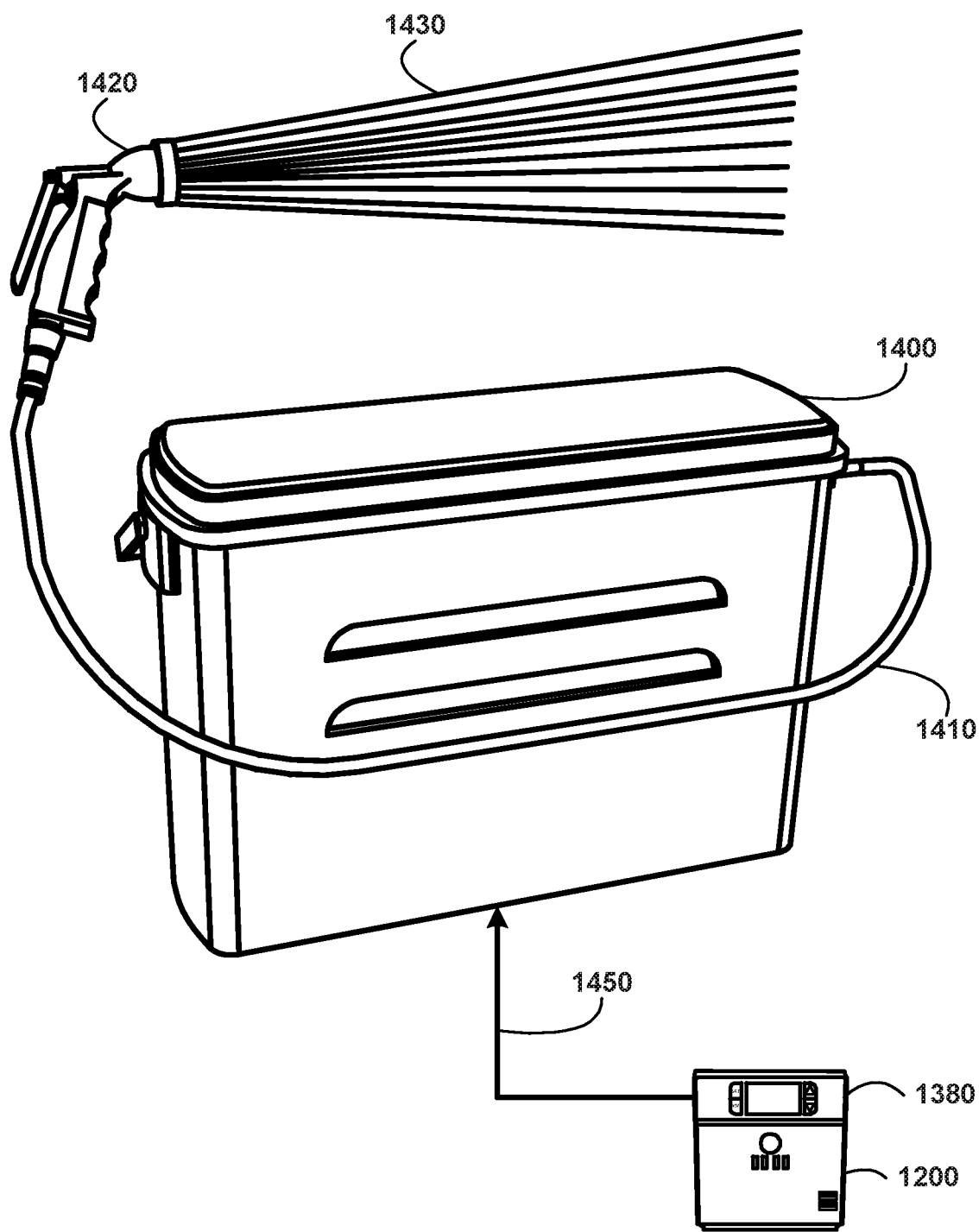
FIG. 14 shows for illustrative purposes only an example of a spray attachment module coupled with heater module and battery module of one embodiment.

Spray Attachment Module Coupled with Heater Module and Battery Module:

FIG. 14 shows for illustrative purposes only an example of a spray attachment module coupled with heater module and battery module of one embodiment. FIG. 14 shows a spray attachment module 1400 including a spray discharge hose 1410, spray gun 1420 and water spraying 1430 from the spray gun 1420. The heating module attachment 1380, attachable battery base module 1200 and heated water coupling hose connection 1450 is used to create a source of hot water for the spray attachment module 1400. The spray attachment module 1400 can be used for example while camping for cleaning and bathing. The spray attachment module 1400 can include a pressure pump to pressurize contents.

The heating module attachment 1380 is coupled to the spray attachment module 1400 and is configured to produce hot water for cleaning and bathing. The heating module attachment 1380, attachable battery base module 1200 and heated water coupling hose connection 1450 may be attached externally or internally with the sprayer attachment module 1400 of one embodiment.

Figure 15:
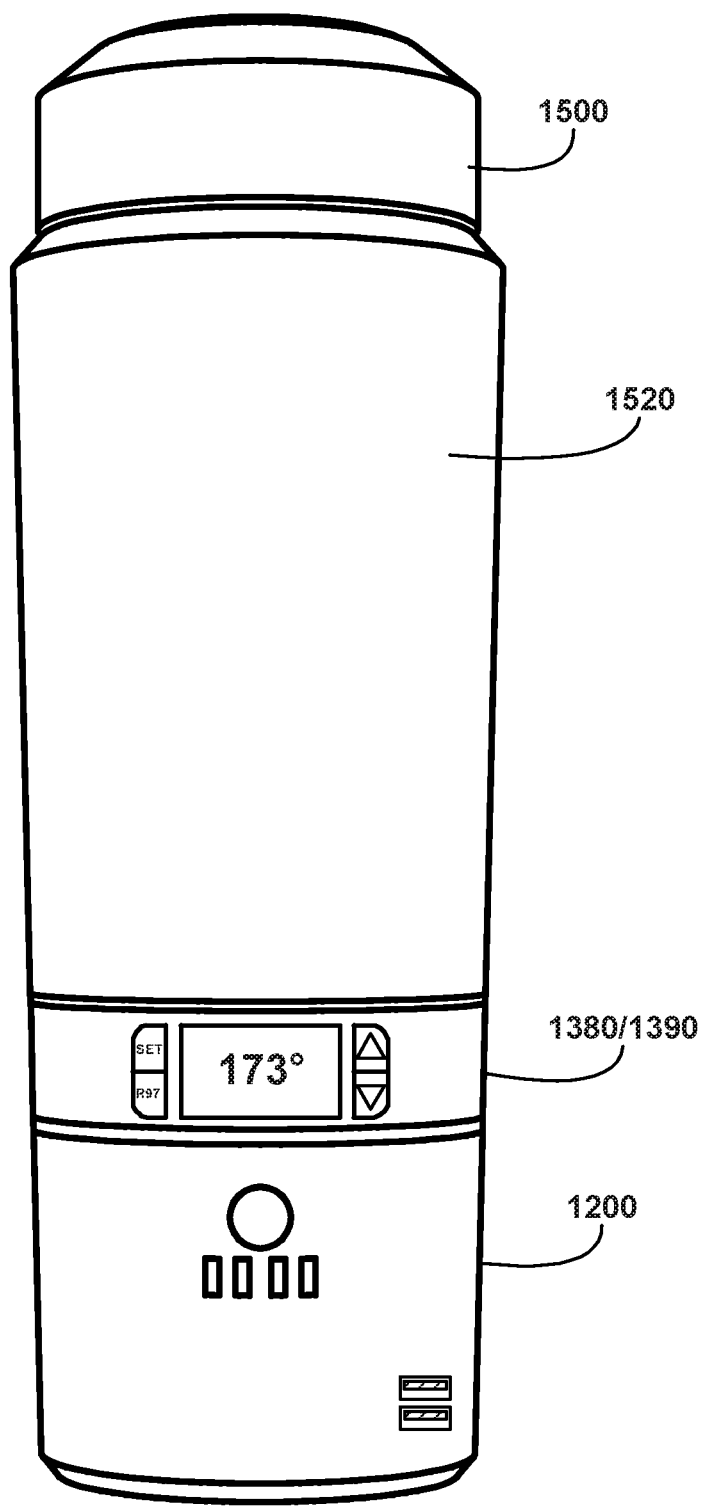
FIG. 15 shows for illustrative purposes only an example of a beverage cup module couple with heater or cooler module of one embodiment.

Beverage Cup Module Couple with Heater or Cooler Module:

FIG. 15 shows for illustrative purposes only an example of a beverage cup module couple with heater or cooler module of one embodiment. FIG. 15 shows a beverage liquid cup attachment 1520, pour/sip cap cover 1500, heating or cooling module attachment 1380/1390 and the attachable battery base module 1200. The beverage liquid cup attachment 1520 can be used for either hot or cold beverages. The heating module attachment 1380 of FIG. 13A can heat and keep a hot beverage at a user set temperature. The cooling module attachment 1390 of FIG. 13B can be used to cool a beverage and keep the beverage cool at a user set temperature of one embodiment.

Figure 16A:
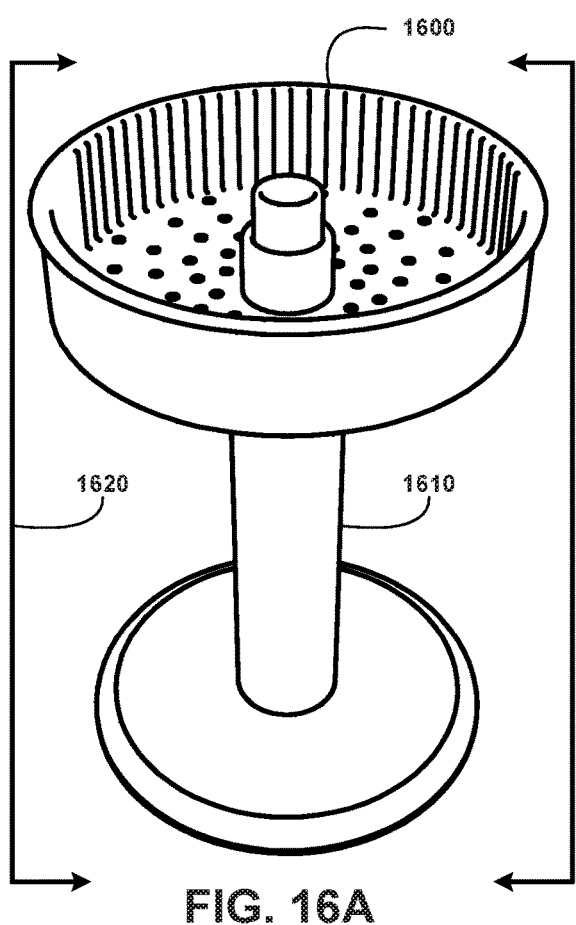
FIG. 16A shows for illustrative purposes only an example of a percolator module of one embodiment.

Percolator Module:

FIG. 16A shows for illustrative purposes only an example of a percolator module of one embodiment. FIG. 16A shows a percolator attachment 1600 including a hot liquid conveying tube 1610 and cross section indicator 1620 of one embodiment.

Figure 16B:
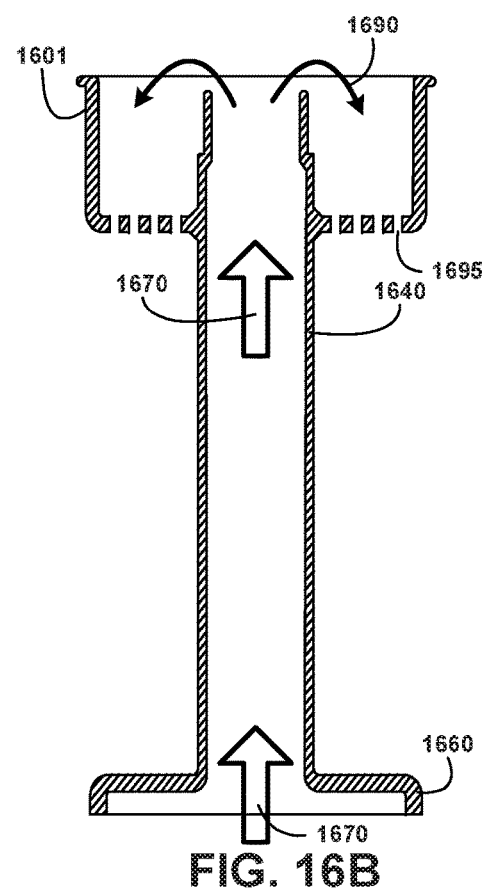
FIG. 16B shows for illustrative purposes only an example of a percolator module of one embodiment.

Percolator Module Installed in Liquid Chamber Module:

FIG. 16B shows for illustrative purposes only an example of a percolator module of one embodiment. FIG. 16B shows a percolator cross section 1601 and percolator base cross section 1660. The user can for example percolate coffee using the percolator attachment 1600. The boiling water is conveyed through a hot liquid conveying tube cross section 1640 by a liquid heated to a boil convection flow 1670 and discharges into the percolator and for example passes through coffee grounds and drips through a plurality of a percolator drip hole 1695 where a boiling water flow into coffee grounds for a coffee beverage collected in a retention vessel 1690 of one embodiment.

Figure 17A:
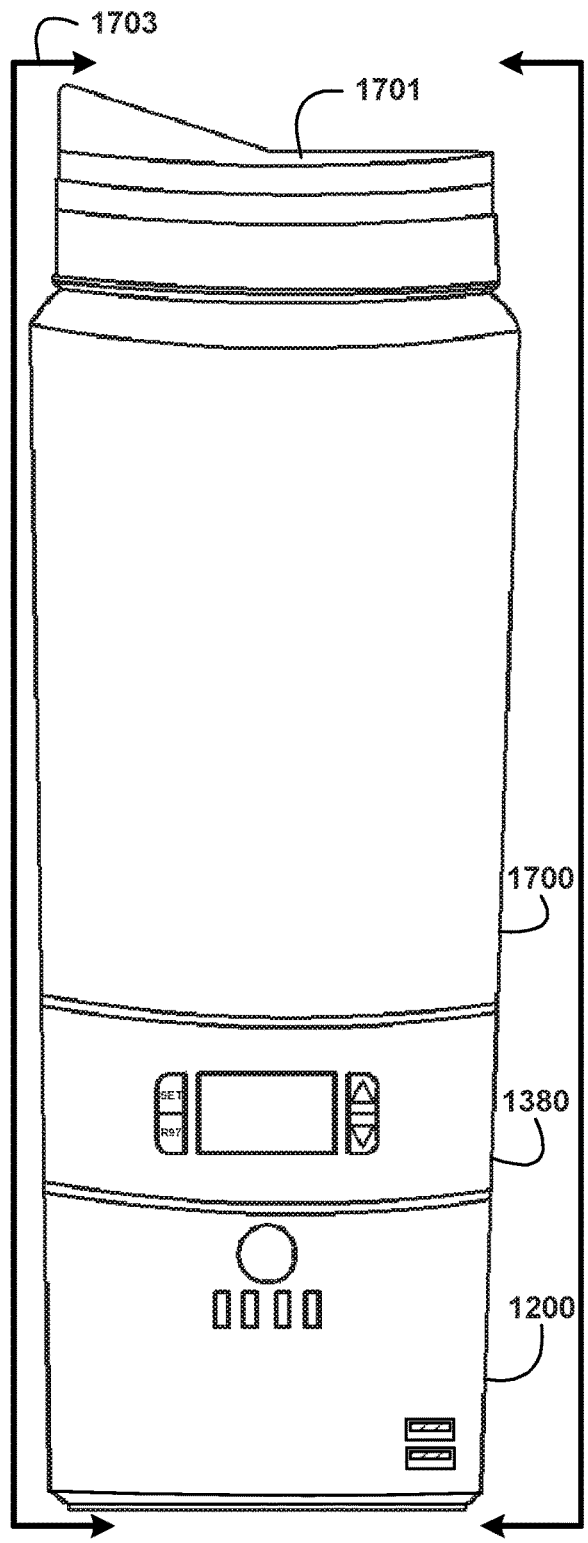
FIG. 17A shows for illustrative purposes only an example of a percolator module assembly of one embodiment.

Percolator Module Assembly:

FIG. 17A shows for illustrative purposes only an example of a percolator module assembly of one embodiment. FIG. 17A shows a percolator module assembly 1700 including a pour cap 1701, heating module attachment 1380 and the attachable battery base module 1200. The percolator is compact and can be carried in for example a backpack while percolating of one embodiment. A cross section indicator arrow 1703 shows the cross section area as illustrated in FIG. 17B.

Figure 17B:
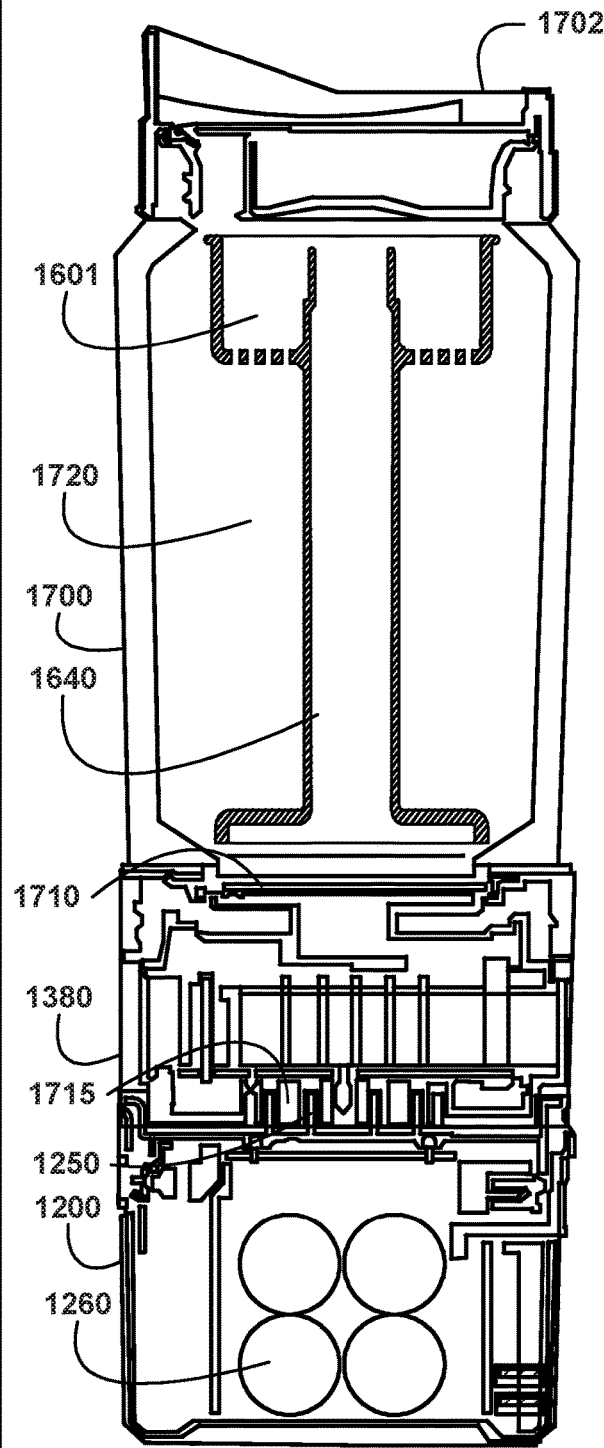
FIG. 17B shows for illustrative purposes only an example of a percolator module assembly cross section of one embodiment.

Percolator Module Assembly Cross Section:

FIG. 17B shows for illustrative purposes only an example of a percolator module assembly cross section of one embodiment. FIG. 17B shows the percolator cross section 1601, a pour cap cross section 1702, a cross section of the heating module attachment 1380, attachable battery base module 1200, percolator module assembly 1700, hot liquid conveying tube cross section 1640, and a hot percolated liquid chamber 1720. The percolator base cross section 1660 of FIG. 16B base of the sets above a heat transfer plate 1710 configured to reach a temperature to boil water through a heating module power connection 1715 providing energy through at least one power transfer buss bar 1250 supplied with power from the battery 1260 module of one embodiment.

Figure 18:
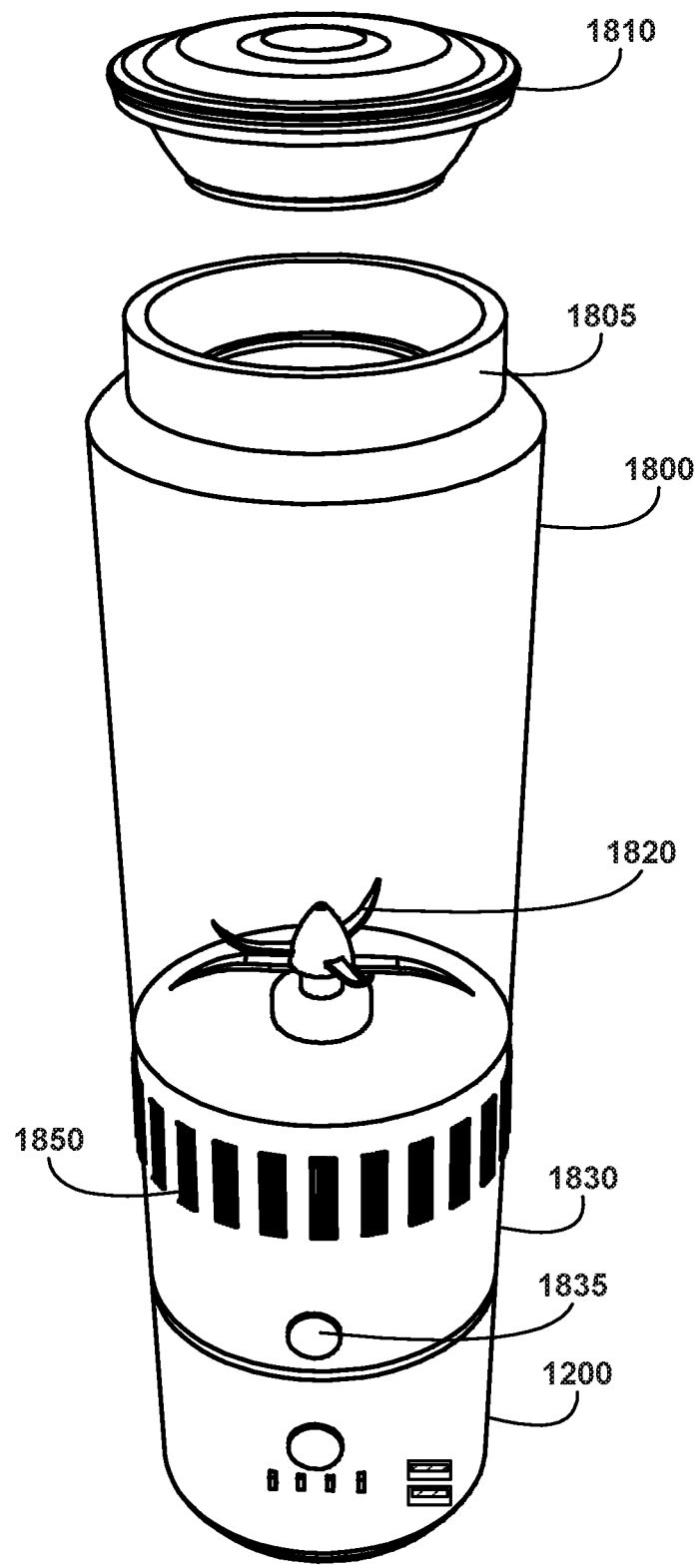
FIG. 18 shows for illustrative purposes only an example of a blender attachment coupled to battery module of one embodiment.

Blender Attachment Coupled to Battery Module:

FIG. 18 shows for illustrative purposes only an example of a blender attachment coupled to battery module of one embodiment. FIG. 18 shows a blender attachment module assembly 1800 including a blender liquid vessel 1805, a blender attachment cap 1810, blender blade assembly 1820 and a blender motor assembly 1830. The blender motor assembly 1830 includes a plurality of blender hand grip ribs 1850 and a blender on/off speed dial or activation button 1835 for setting a speed for blending various beverages or food produces. The attachable battery base module 1200 provides sufficient power to crush ice and can grind coffee beans using the blender attachment module assembly 1800 of one embodiment.

Figure 19A:
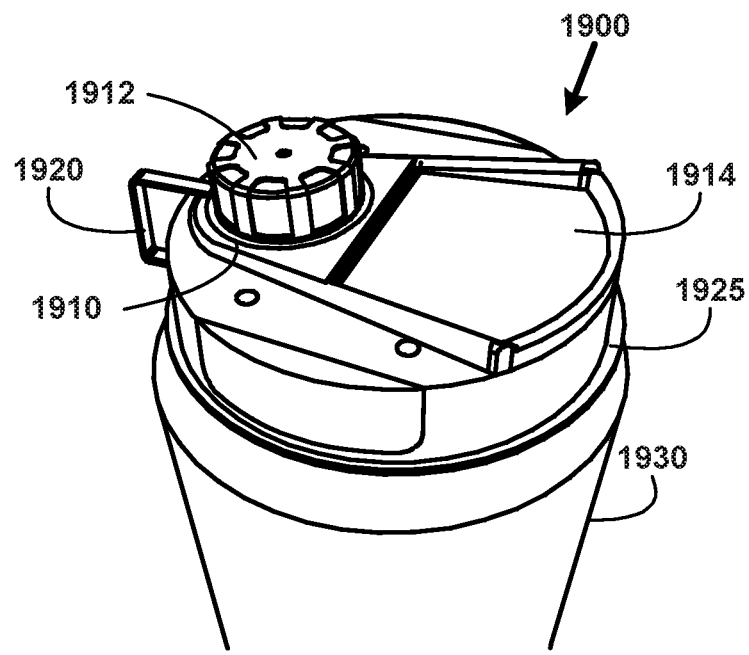
FIG. 19A shows for illustrative purposes only an example of a cap pour spout closed of one embodiment.

Cap Pour Spout Closed:

FIG. 19A shows for illustrative purposes only an example of a cap pour spout closed of one embodiment. FIG. 19A shows a pour/sip cap 1900 with a pour cap closed 1912 coupled to a liquid chamber 1930 using a pour cap retention strap 1920, pour cap retention strap ring 1910 and a pour/sip cap retention strap ring 1925. The pour cap is angled and a sip cap with an elevated hot drink slot that is sealable. A sip cap closed 1914 is shown wherein a user may open the sip cap and drink directly from the liquid chamber 1930 of one embodiment.

Figure 19B:
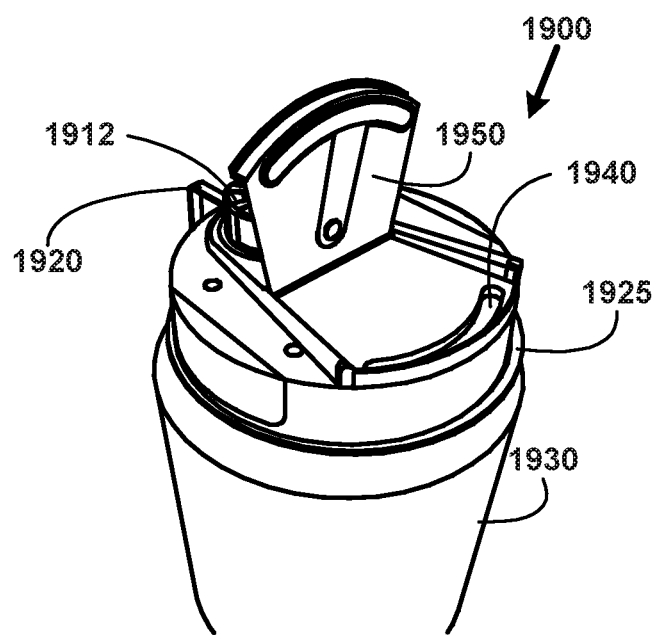
FIG. 19B shows for illustrative purposes only an example of a cap sip spout opened of one embodiment.

Cap Sip Spout Opened:

FIG. 19B shows for illustrative purposes only an example of a cap sip spout opened of one embodiment. FIG. 19B shows the pour/sip cap 1900 with the pour cap closed 1912 and secured using the pour cap retention strap 1920 and pour/sip cap retention strap ring 1925 to the liquid chamber 1930. FIG. 19B shows a sip cap opened 1950 exposing a sipping opening 1940 allowing a beverage to flow from the liquid chamber 1930. The sip cap opened 1950 shows the seal of the sipping opening 1940 on the sip cap that keeps liquid from passing through the sipping opening 1940 when the sip cap is closed of one embodiment.

Figure 20A:
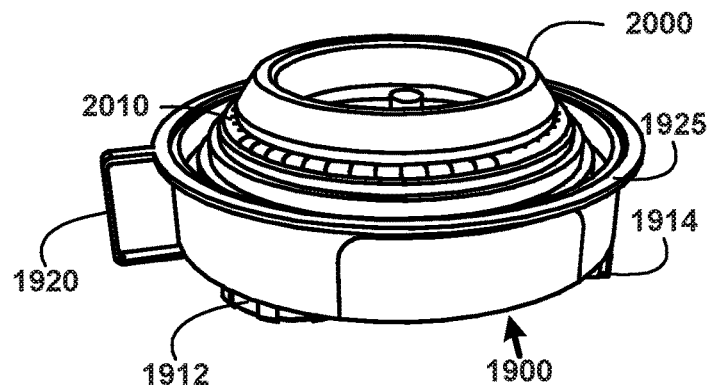
FIG. 20A shows for illustrative purposes only an example of a two part cap assembly reverse view of one embodiment.

Two Part Cap Assembly Reverse View:

FIG. 20A shows for illustrative purposes only an example of a two part cap assembly reverse view of one embodiment. FIG. 20A shows the pour/sip cap 1900 with the pour cap closed 1912 and sip cap closed 1914. The pour cap retention strap 1920 and pour/sip cap retention strap ring 1925 prevent the pour cap from falling when detached by the user. A pour/sip cap sealing ring 2010 prevents liquid from escaping from the liquid chamber 1930 of FIG. 19A when the pour/sip cap attachment interface 2000 is secured attached of one embodiment.

Figure 20B:
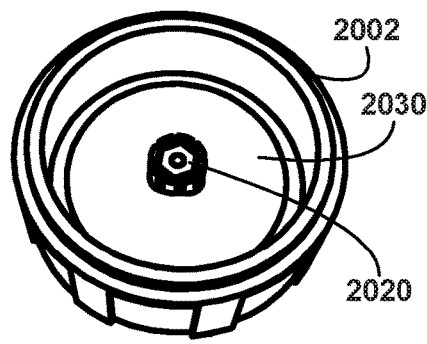
FIG. 20B shows for illustrative purposes only an example of a steam pressure valve module of one embodiment.

Steam Pressure Valve Module:

FIG. 20B shows for illustrative purposes only an example of a steam pressure valve module of one embodiment. FIG. 20B shows a pour cap 2002 reversed and exposing a steam pressure release actuator 2030 and steam pressure release actuator coupling 2030. For example when boiling water for example steam may build up pressure in the liquid chamber 1930 of FIG. 19A. The pressure will push against the steam pressure release actuator 2030 and cause the opening of a valve of the steam pressure release actuator coupling 2030 to allow the steam to escape and reduce the pressure build-up of one embodiment.

Figure 20C:
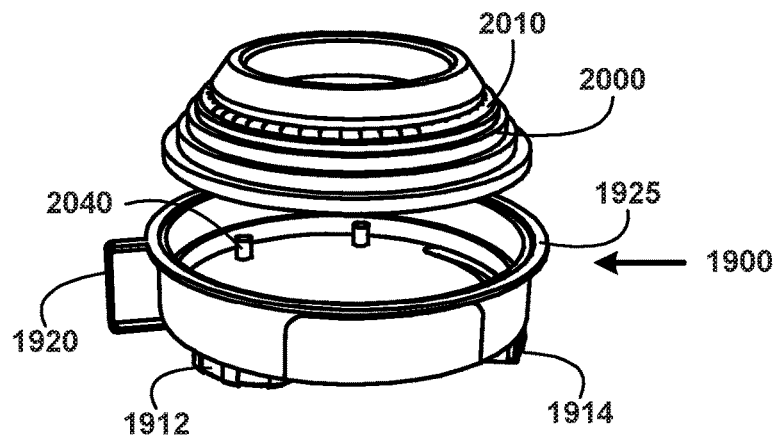
FIG. 20C shows for illustrative purposes only an example of a two part cap attachment module of one embodiment.

Two Part Cap Attachment Module:

FIG. 20C shows for illustrative purposes only an example of a two part cap attachment module of one embodiment. FIG. 20C shows the pour/sip cap 1900 with the pour cap closed 1912 and sip cap closed 1914, also the pour cap retention strap 1920 and pour/sip cap retention strap ring 1925. FIG. 20C shows the pour/sip cap attachment interface 2000 and pour/sip cap sealing ring 2010 detached from the pour/sip cap 1900 to expose a pour/sip cap-pour/sip cap attachment interface coupling screw tab 2040. The two parts of the cap attachment are couple using screws of one embodiment.

Figure 20D:
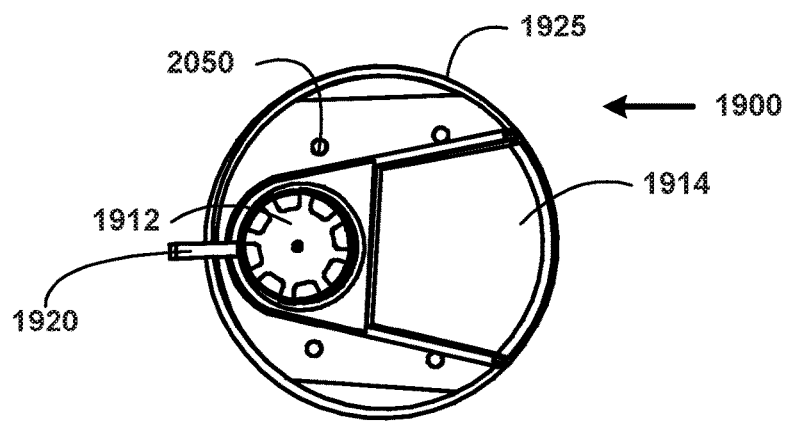
FIG. 20D shows for illustrative purposes only an example of a double cap module top view of one embodiment.

Double Cap Module Top View:

FIG. 20D shows for illustrative purposes only an example of a double cap module top view of one embodiment. FIG. 20D shows the pour/sip cap 1900, pour cap closed 1912, sip cap closed 1914, pour cap retention strap 1920, and pour/sip cap retention strap ring 1925. FIG. 20D shows also shows pour/sip cap-pour/sip cap attachment interface coupling screw 2050 wherein 4 screws are used to secure the two part cap attachment module together for use of one embodiment.

Figure 21A:
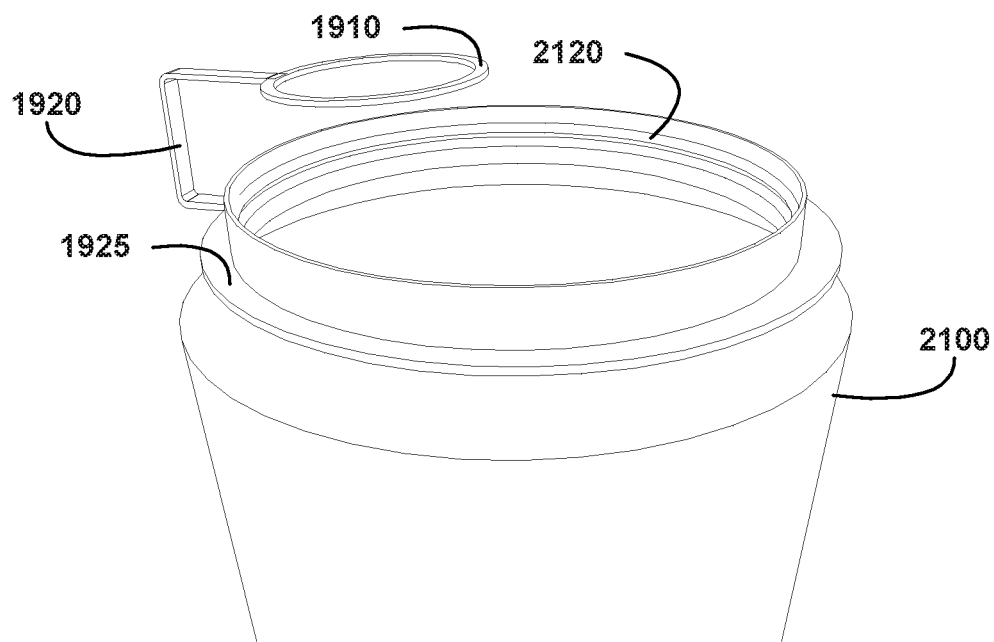
FIG. 21A shows for illustrative purposes only an example of a liquid chamber module attachment interface of one embodiment.

Liquid Chamber Module Attachment Interface:

FIG. 21A shows for illustrative purposes only an example of a liquid chamber module attachment interface of one embodiment. FIG. 21A shows the pour cap retention strap 1920, pour cap retention strap ring 1910 and pour/sip cap retention strap ring 1925. A metal beverage chamber 2100 includes a metal beverage chamber attachment interface 2120 for use in coupling to other attachments of one embodiment.

Figure 21B:
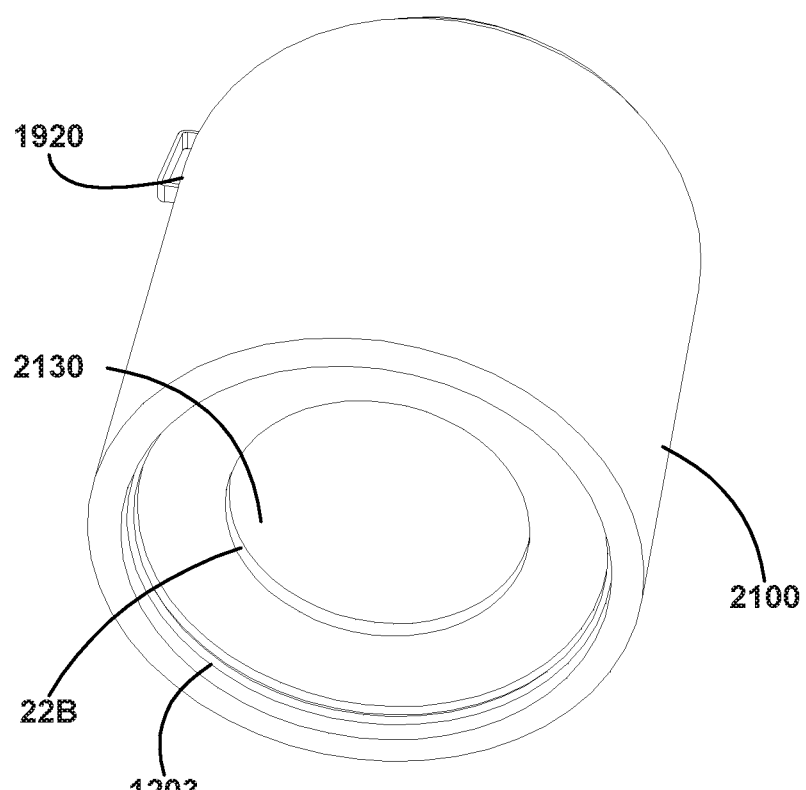
FIG. 21B shows for illustrative purposes only an example of a liquid chamber module contact point with heater/cooling module of one embodiment.

Liquid Chamber Module Contact Point with Heater/Cooling Module:

FIG. 21B shows for illustrative purposes only an example of a liquid chamber module contact point with heater/cooling module of one embodiment. FIG. 21B shows the pour cap retention strap 1920, the metal beverage chamber 2100 with a partially open bottom 22B and modular attachment interface 1203. The partially open bottom 22B exposes a metal beverage chamber thermal contact surface 2130. Heating and cooling thermal transfer to a liquid in the metal beverage chamber 2100 is heated or cooled using the metal beverage chamber thermal contact surface 2130 in direct contact with the heat transfer plate 1710 of FIG. 17A which transfer heat from the heating module attachment 1380 of FIG. 13A or cold temperature transfers from the cooling module attachment 1390 of FIG. of 13B of one embodiment.

Figure 22:
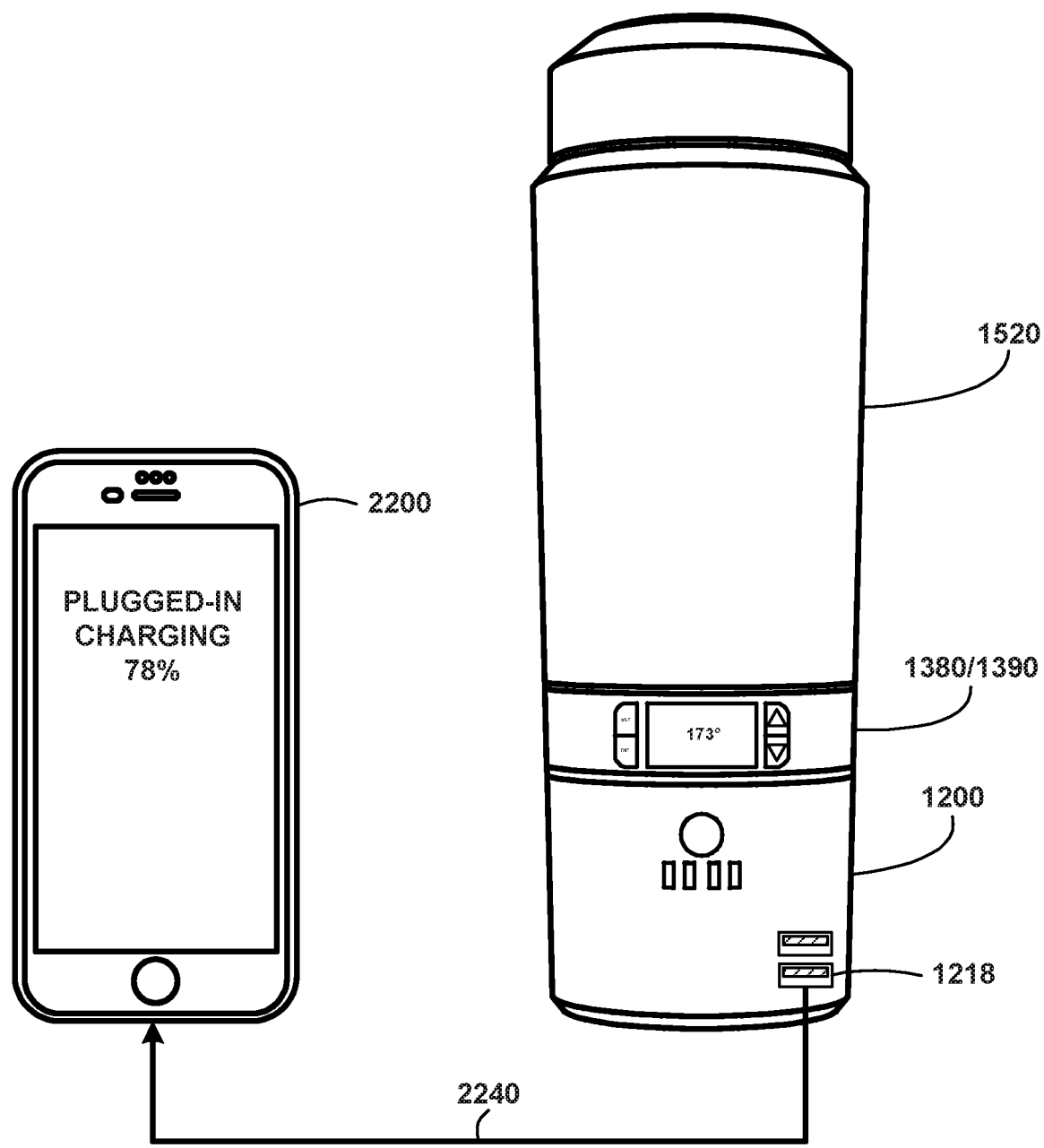
FIG. 22 shows for illustrative purposes only an example of a smart device charging operation of one embodiment.

Smart Device Charging Operation:

FIG. 22 shows for illustrative purposes only an example of a smart device charging operation of one embodiment. FIG. 22B shows the beverage liquid chamber attachment 20, heating or cooling module attachment 1380/1390 and attachable battery base module 1200 with USB outlet 1218. While enjoying their cup of for example coffee the user can couple the user smart device 2200 using a USB charging cable coupled to attachable battery base module USB outlet 2240 to recharge the user smart device 2200 of one embodiment.

Figure 23:
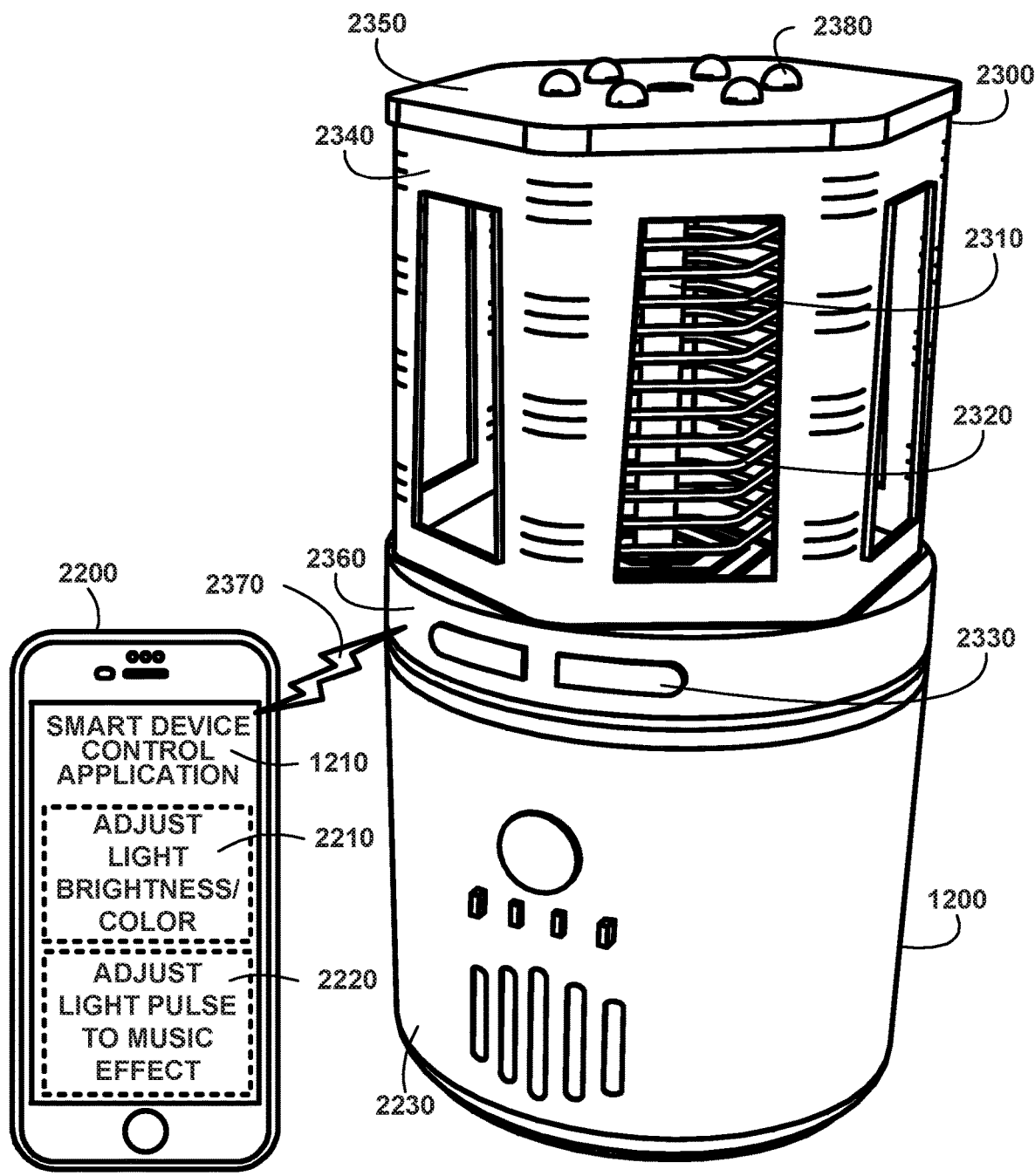
FIG. 23 shows for illustrative purposes only an example of a lighting system module of one embodiment.

Lighting System Module Operation:

FIG. 23 shows for illustrative purposes only an example of a lighting system module of one embodiment. FIG. 23 shows the attachable battery base module 1200 with an attachable lighting system 2300 coupled to the attachable battery base module 1200 using the attachable connector 2360. A user can use the attachable lighting system 2300 coupled to the attachable battery base module 1200 for lighting with a bulb 2310 in the center and protection against inspects for example mosquitoes. The bulb 2310 is a UV light for attracting insects. It is surrounded by a grid of charged wires referred to herein as zapper elements 2320 that zaps insects in the center and provides protection against for example mosquitoes. The attachable lighting system 2300 includes a plurality of zapper elements 2320 that kills inspects flying close to the light. The attachable lighting system 2300 includes translucent colored housing elements 2340 and 2450. FIG. 23 shows on the top translucent colored housing element 2450 a plurality of dome lights 2380. The plurality of dome lights 2380 on the top are multi colored LEDS for traditional lantern style lighting and also pulsing in color to the music. The domes have stepped lenses to radiate light sideways for lantern use. The attachable lighting system 2300 includes on/off buttons 2330 of one embodiment.

Figure 24:
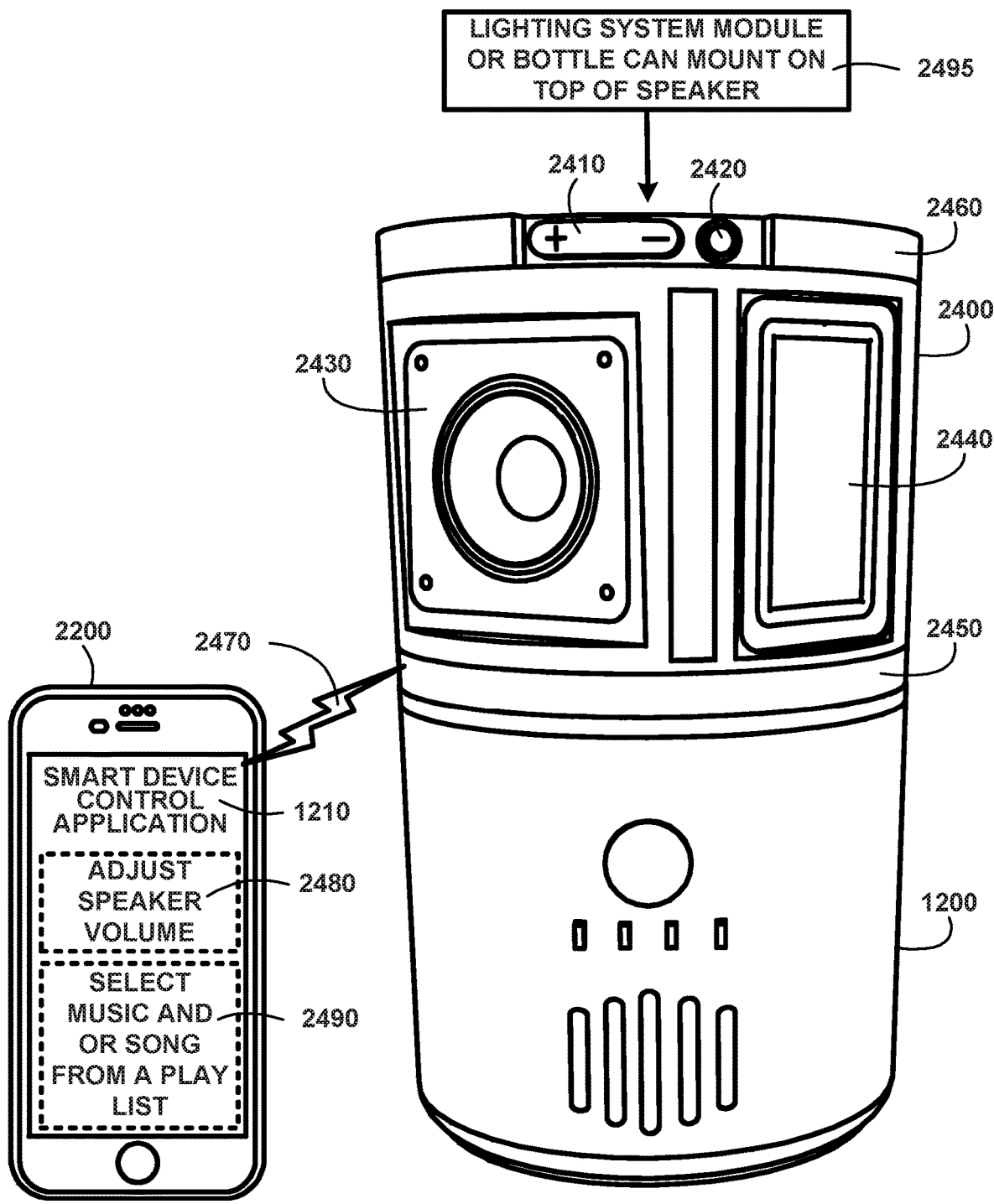
FIG. 24 shows for illustrative purposes only an example of a speaker system module of one embodiment.

Speaker System Module Operation:

FIG. 24 shows for illustrative purposes only an example of a speaker system module of one embodiment. FIG. 23C shows the attachable battery base module 1200 with a speaker system module 2400 attached on the top of the attachable battery base module 1200 using a bottom attachable connector 2450. The speaker system module 2400 can mount directly to top of the attachable battery base module 1200 and also has a top power connector 2460 so alternatively the beverage liquid chamber attachment 20 herein also referred to as the bottle or light system module 2300 of FIG. 23 can mount to top of speaker. The speaker system module 2400 includes two speakers 2430 and two passive radiators 2440. An on/off button 2420 turns on or off the speakers and the volume can be controlled by a volume control 2410 of one embodiment.

The foregoing has described the principles, embodiments and modes of operation of the embodiments. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A portable blender, comprising:
   a blender attachment module assembly including
      a blender liquid vessel;
      a blender attachment cap removably coupled to a top portion of the blender liquid vessel, the blender attachment cap comprises at least one threaded portion configured to provide a liquid tight seal;
      a rotating blade coupled to a bottom portion of the blender liquid vessel and configured to selectively grinding, blend and chop items within the blender liquid vessel;
      a blender motor assembly coupled to the rotating blade and configured to rotate the rotating blade, the blender motor assembly comprises a plurality of blender hand grip ribs and a blender on/off speed dial coupled to the blender motor assembly and configured to set a speed to blend; and
   an attachable battery base module removably coupled to the blender motor assembly is configured to provide sufficient power to crush ice and can grind coffee beans, the attachable battery base module comprising an on/off button, status indicator lights, modular attachment interface including multiple power transfer buss bars for transferring power from the attachable battery base module to the blender motor assembly, a battery compartment housing at least one removable rechargeable battery, and at least one digital processor including a printed circuit board assembly (PCBA) configured to provide a battery safety control processor.

2. The portable blender of claim 1, wherein the rotating blade is configured to grind, blend, and chop coffee beans and ice.

3. The portable blender of claim 1, wherein the at least one rechargeable battery of the attachable battery base module consists of at least one lithium ion rechargeable battery.

* * * * *